United States Patent
Kimle et al.

(10) Patent No.: US 11,225,424 B2
(45) Date of Patent: Jan. 18, 2022

(54) MICROORGANISM BASED RECIRCULATING AQUACULTURE SYSTEM

(71) Applicant: Gross-Wen Technologies, Inc., Ames, IA (US)

(72) Inventors: Jackson Kimle, Ames, IA (US); Matthew Ellis, Ames, IA (US); Martin Gross, Boone, IA (US); Zhiyou Wen, Ames, IA (US); Xuefei Zhao, Ames, IA (US)

(73) Assignee: GROSS-WEN TECHNOLOGIES, INC., Ames, IA (US)

( * ) Notice: Subject to any disclaimer, the term of this patent is extended or adjusted under 35 U.S.C. 154(b) by 0 days.

(21) Appl. No.: 16/774,168

(22) Filed: Jan. 28, 2020

(65) Prior Publication Data
US 2020/0239342 A1    Jul. 30, 2020

Related U.S. Application Data

(60) Provisional application No. 62/798,029, filed on Jan. 29, 2019.

(51) Int. Cl.
C02F 3/08 (2006.01)
C02F 3/30 (2006.01)
C02F 3/28 (2006.01)
A01K 63/04 (2006.01)

(52) U.S. Cl.
CPC ............ *C02F 3/087* (2013.01); *A01K 63/045* (2013.01); *C02F 3/2806* (2013.01); *C02F 3/302* (2013.01)

(58) Field of Classification Search
CPC ........ C02F 3/087; C02F 3/302; C02F 3/2806; C02F 3/006; C02F 3/08; C02F 3/322; C02F 2103/20; A01K 63/045; Y02W 10/37; Y02W 10/10

USPC ......... 210/602, 615, 616, 617, 151, 167.22, 210/259, 903, 906, 912
See application file for complete search history.

(56) References Cited

U.S. PATENT DOCUMENTS

| | | | |
|---|---|---|---|
| 3,598,726 A | 8/1971 | Welch | |
| 4,324,068 A | 4/1982 | Anthony | |
| 4,995,980 A * | 2/1991 | Jaubert | C02F 3/10 210/602 |
| 5,647,983 A | 7/1997 | Limcaco | |
| 6,158,386 A | 12/2000 | Limcaco | |
| 6,667,171 B2 | 12/2003 | Bayless et al. | |

(Continued)

FOREIGN PATENT DOCUMENTS

| | | |
|---|---|---|
| CN | 103289887 | 9/2013 |
| WO | 2010011320 | 1/2010 |
| WO | 2010030953 | 1/2010 |

OTHER PUBLICATIONS

International Search Report for International Application No. PCT/US2014/029618 dated Aug. 21, 2014.

(Continued)

*Primary Examiner* — Fred Prince
(74) *Attorney, Agent, or Firm* — Christopher A. Proskey; BrownWinick Law Firm

(57) ABSTRACT

A recirculating aquaculture system comprising a microorganism growing apparatus and a method of using microorganisms to remove a pollutant from a fluid utilized in a recirculating aquaculture system. Furthermore, the microorganisms are harvested and used as a foodstuff fertilizer, biofuels, and bioplastics.

20 Claims, 31 Drawing Sheets

(56) References Cited

U.S. PATENT DOCUMENTS

| | | |
|---|---|---|
| 6,794,184 B1 | 9/2004 | Mohr |
| 8,372,631 B2 | 2/2013 | Shepherd |
| 8,377,687 B2 | 2/2013 | Shepherd |
| 9,932,549 B2 | 4/2018 | Gross et al. |
| 10,085,430 B1 * | 10/2018 | Gonzalez ............... C12M 21/02 |
| 2010/0144017 A1 | 6/2010 | Shepherd |
| 2010/0224574 A1 | 9/2010 | Youngs et al. |
| 2010/0267122 A1 | 10/2010 | Chinnasamy et al. |
| 2011/0070632 A1 | 3/2011 | Katoch et al. |
| 2011/0217764 A1 | 9/2011 | Christenson et al. |
| 2011/0258915 A1 | 10/2011 | Subhadra |
| 2011/0263886 A1 | 10/2011 | Kale |
| 2011/0283608 A1 | 11/2011 | Patel et al. |
| 2011/0312062 A1 | 12/2011 | Nordvik et al. |
| 2012/0152812 A1 * | 6/2012 | Park ..................... C02F 3/1221 210/151 |
| 2012/0252105 A1 | 10/2012 | Ahrens et al. |
| 2014/0273171 A1 | 9/2014 | Gross et al. |
| 2014/0273174 A1 | 9/2014 | Gross et al. |
| 2017/0321182 A1 * | 11/2017 | Hazlebeck ............. C12M 29/04 |

OTHER PUBLICATIONS

Bitog et al., "Application of computational fluid dynamics for modeling and designing photobioreactors for microalgae production: A review," Computers and Electronics in Agriculture (2011), 76: 131-147. Jan. 24, 2011.

Christenson et al. "Rotating Algal Biofilm Reactor and Spool Harvester for Wastewater Treatment with Biofuels By-Products," Biotechnology and Bioengineering, DOI 10.1002/bit.24451 (2012) Wiley Periodicals, Inc. Jan. 20, 2012.

Johnson et al., "Development of an attached microalgal growth system for biofuel production," Applied Microbiology and Biotechnology (2010), 85:525-534 Jul. 7, 2009.

* cited by examiner

MICROORGANISM BASED RECIRCULATING AQUACULTURE SYSTEM

FIELD OF THE DISCLOSURE

This disclosure relates generally to a recirculating aquaculture system comprising a microorganism growing apparatus and a method of using microorganisms to remove a pollutant from a fluid utilized in a recirculating aquaculture system. In one arrangement, the disclosure relates to a method of using microorganisms to remove a pollutant from a fluid by exposing microorganisms to a fluid containing a pollutant, the microorganisms uptake the pollutant, then the microorganisms are exposed to a condition in order to stimulate the microorganisms to release the pollutant. Additionally, the disclosure relates to a method of harvesting the microorganisms and using the microorganisms as a foodstuff for human and animal consumption, a fertilizer, a bioplastic, and/or a biofuel.

BACKGROUND OF THE DISCLOSURE

There is a rising demand for improvements in treatment of fluids utilized in aquaculture systems. Currently, treatment of fluid utilized in aquaculture systems occurs through many different unit processes. The different treatment processes utilized to remove pollutants from the fluid utilized in aquaculture systems are capital intensive and require significant operating cost. Additionally, many different processes are needed in order to remove pollutants including, but not limited to, fecal matter, uneaten food, Nitrogen (N), Phosphorous (P), Potassium (K), Carbon (C), ammonia ($NH_3$), carbon dioxide ($CO_2$), toxic metals, salts, pharmaceuticals, or hormones. Furthermore, the current processes available to remove these pollutants do not provide the opportunity to capture these pollutants, which can be utilized for numerous purposes, but the current processes only remove them.

Aquaculture systems have large volumes of waste discharge which results in a significant challenge as fish producers are required to invest in more capital intensive waste treatment in order to meet tightening discharge requirements. This results in lowering feasibility and profitability of investments in aquaculture systems.

Utilizing a microorganism growing apparatus in connection with a recirculating aquaculture system provides the ability for microorganisms to consume dissolved pollutants and harvest them as a by-product. Since microorganisms such as algae can consume Nitrogen (N), Phosphorous (P), Potassium (K), Carbon (C), ammonia ($NH_3$), carbon dioxide ($CO_2$), toxic metals, salts, pharmaceuticals, and hormones in one process, rather than multiple processes, this simplifies and increases efficiency of aquaculture systems.

For the reasons stated above, and for other reasons which will become apparent to those skilled in the art upon reading and understanding the specification, there is a need in the art for an improved method of removing a pollutant from a fluid utilized in a recirculating aquaculture system.

Thus it is a primary object of the disclosure to provide a method of using microorganisms to remove a pollutant from a fluid utilized in a recirculating aquaculture system that is efficient.

Yet another object of the disclosure is to provide a method of using microorganisms to remove a pollutant from a fluid utilized in a recirculating aquaculture system that is simple in design.

Another object of the disclosure is to provide a method of using microorganisms to remove a pollutant from a fluid utilized in a recirculating aquaculture system that is inexpensive.

Yet another object of the disclosure is to provide a method of using microorganisms to remove a pollutant from a fluid utilized in a recirculating aquaculture system, harvesting the microorganisms, and using the microorganisms as a foodstuff for human consumption.

Another object of the disclosure is to provide a method of using microorganisms to remove a pollutant from a fluid utilized in a recirculating aquaculture system, harvesting the microorganisms, and using the microorganisms as a foodstuff for animal consumption.

Yet another object of the disclosure is to provide a method of using microorganisms to remove a pollutant from a fluid utilized in a recirculating aquaculture system that is capable of meeting current pollutant discharge limits.

Another object of the disclosure is to provide a method of using microorganisms to remove a pollutant from a fluid utilized in a recirculating aquaculture system that has a smaller footprint than other biological systems.

Yet another object of the disclosure is to provide a method of using microorganisms to efficiently and effectively remove a pollutant from effluent.

Another object of the disclosure is to provide a method of using microorganisms to remove a pollutant from a fluid utilized in a recirculating aquaculture system that has a high pollutant removal rate.

Yet another object of the disclosure is to provide a method of using microorganisms to remove a pollutant from a fluid utilized in a recirculating aquaculture system, harvesting the microorganisms, and using the microorganisms as a fertilizer.

Another object of the disclosure is to provide a method of using microorganisms to remove a pollutant from a fluid utilized in a recirculating aquaculture system, harvesting the microorganisms, and using the microorganisms as a bioplastic.

Yet another object of the disclosure is to provide a method of using microorganisms to remove a pollutant from a fluid utilized in a recirculating aquaculture system, harvesting the microorganisms, and using the microorganisms as a biofuel.

Another object of the disclosure is to provide a method of using microorganisms to remove a pollutant from a fluid utilized in a recirculating aquaculture system that maximizes production of fish on a limited supply of water.

Yet another object of the disclosure is to provide a method of using microorganisms to remove a pollutant from a fluid utilized in a recirculating aquaculture system that maximizes production of fish on a limited supply of land.

Another object of the disclosure is to provide a method of using microorganisms to remove a pollutant from a fluid utilized in a recirculating aquaculture system that allows for disease control.

Yet another object of the disclosure is to provide a method of using microorganisms to remove a pollutant from a fluid utilized in a recirculating aquaculture system that allows for control of the environment in order to maximize fish growth.

These and other objects, features, or advantages of the present disclosure will become apparent from the specification and claims.

BRIEF SUMMARY OF THE DISCLOSURE

The disclosure relates to a recirculating aquaculture system comprising a microorganism growing apparatus and a method of using microorganisms to remove a pollutant from a fluid utilized in a recirculating aquaculture system. The disclosure relates to a method of using microorganisms, including, but not limited to, bacteria, fungi, or algae, to remove a pollutant from a fluid utilized in a recirculating aquaculture system. Furthermore, the disclosure relates to a method of using microorganisms, including, but not limited to, bacteria, fungi, or algae, to remove a pollutant from a fluid used in a recirculating aquaculture system utilizing a microorganism growing apparatus. Furthermore, the disclosure relates to a method of using microorganisms to remove a pollutant from a fluid used in a recirculating aquaculture system utilizing a microorganism growing apparatus wherein the microorganisms are exposed to a first fluid containing a pollutant wherein the microorganisms are exposed to a first condition, exposing the microorganisms to light and air (which may be a CO2-rich gaseous phase or an O2-rich gaseous phase, among other compositions), and then exposing the microorganisms to a second fluid wherein the microorganisms are exposed to a second condition and the microorganisms are stimulated to release the pollutant.

BRIEF DESCRIPTION OF THE DRAWINGS

The figures depict one or more embodiments of a recirculating aquaculture system comprising a microorganism growing apparatus. Furthermore, the figures depict one or more embodiments of a recirculating aquaculture system comprising an algae growing apparatus.

DETAILED DESCRIPTION

Figure 1:
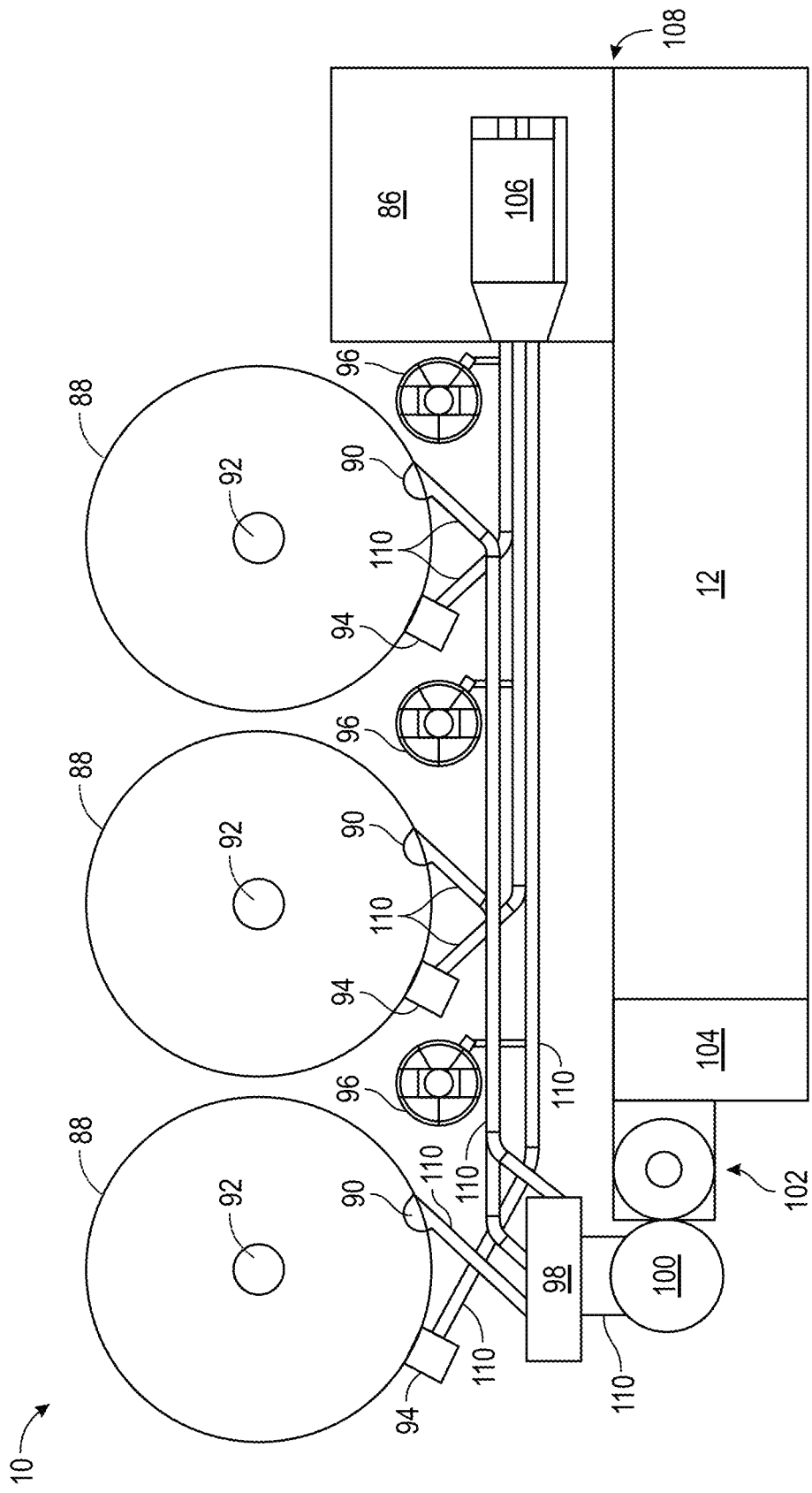
FIG. 1 depicts a perspective view of a recirculating aquaculture system using microorganisms to remove pollutants from a fluid according to one embodiment.

In the following detailed description of the embodiments, reference is made to the accompanying drawings which form a part hereof, and in which is shown by way of illustration specific preferred embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the present disclosures. The following detailed description is, therefore, not to be taken in a limiting sense, and the scope of the present disclosure is defined only by the appended claims, along with the full scope of equivalents to which such claims are entitled.

As used herein, the terminology such as vertical, horizontal, top, bottom, front, back, end and sides are referenced according to the views presented. It should be understood, however, that the terms are used only for purposes of description, and are not intended to be used as limitations. Accordingly, orientation of an object or a combination of objects may change without departing from the scope of the disclosure.

Recirculating Aquaculture System

In the arrangement shown, as one example, a recirculating aquaculture system 10 using microorganisms 84 to remove pollutants 56 from a fluid 58 (or simply "recirculating aquaculture system" 10 or "system" 10) is formed of any suitable size, shape, and design and is configured to be utilized in association with any type of microorganism growing apparatus 12. The system 10 is utilized for many purposes including, but not limited to, rearing of aquatic animals and/or the cultivation of aquatic plants where fluid 58 exchange is limited. Furthermore, the system 10 may be utilized for rearing of aquatic animals including vertebrate or invertebrate. The system 10 may be utilized for any purpose or objective without departing from the scope of the disclosure. In one arrangement, as one example, the system 10 may be utilized for fish production where exchange of fluid 58 is limited. In this arrangement, the system 10 treats the fluid 58 by removing pollutants 56 in order for the fluid 58 to be recirculated throughout the system 10. This provides the ability to maintain clean fluid 58 and to provide a suitable habitat for fish growth and health. In one arrangement, as one example, the recirculating aquaculture system 10 comprises a plurality of tanks 88, a radial flow settler 96, a first header tank 86, a Low Head Oxygenator (LHO) 100, a foam fractionator 102, a sump pump 104, a drum filter 106, a waterfall 108, a microorganism growing apparatus 12, a second header tank 98, and a fluid recirculation system 110.

Figure 2:
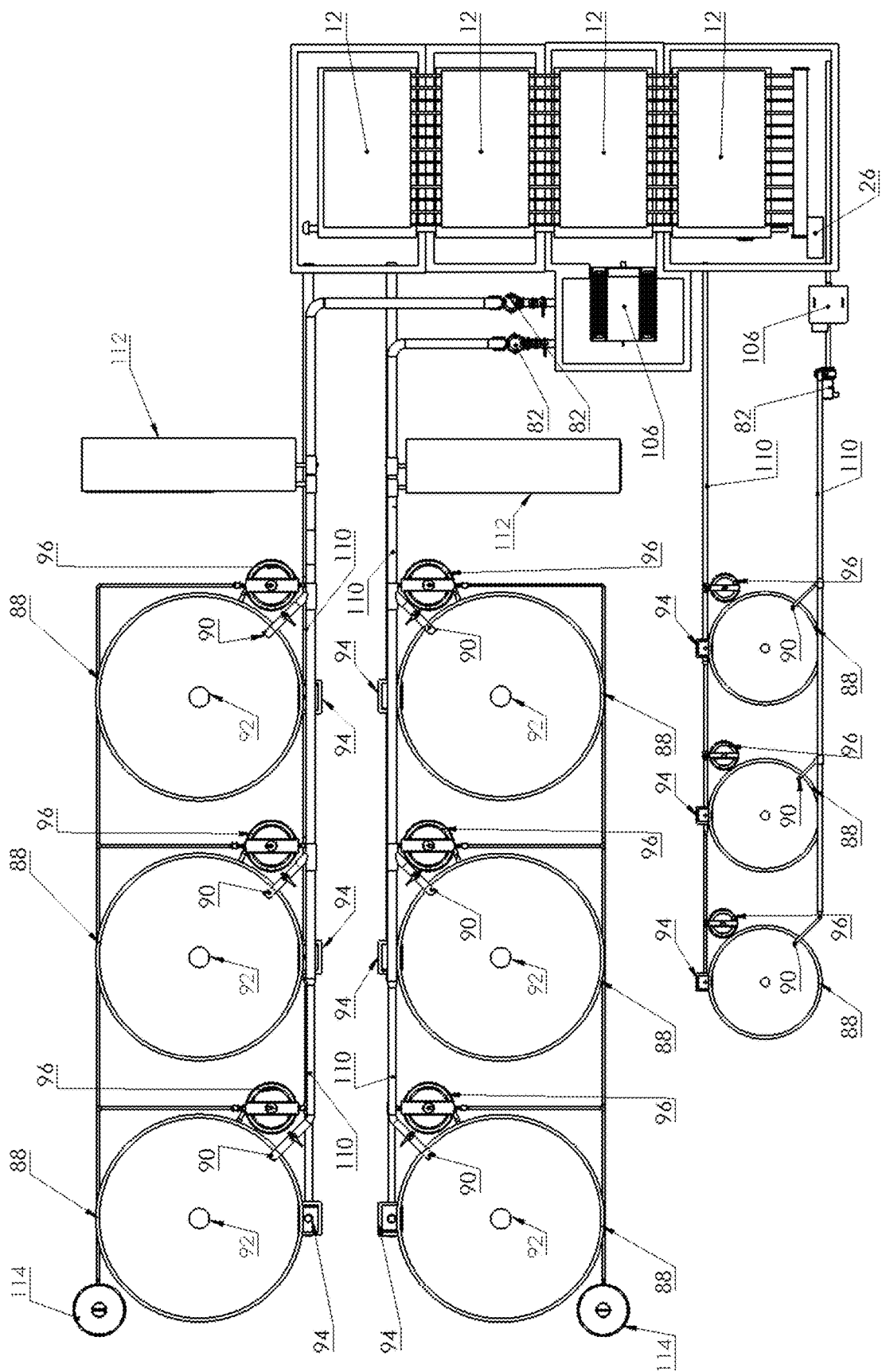
FIG. 2 depicts a perspective view of a recirculating aquaculture system using microorganisms to remove pollutants from a fluid according to one embodiment.

In one arrangement, as one example, the recirculating aquaculture system 10 may comprise a plurality of tanks 88, a radial flow settler 96, a microorganism growing apparatus 12, a water chiller 112, and a solids collection tank 114, in addition to other components, as depicted in FIG. 2.

Figure 3:
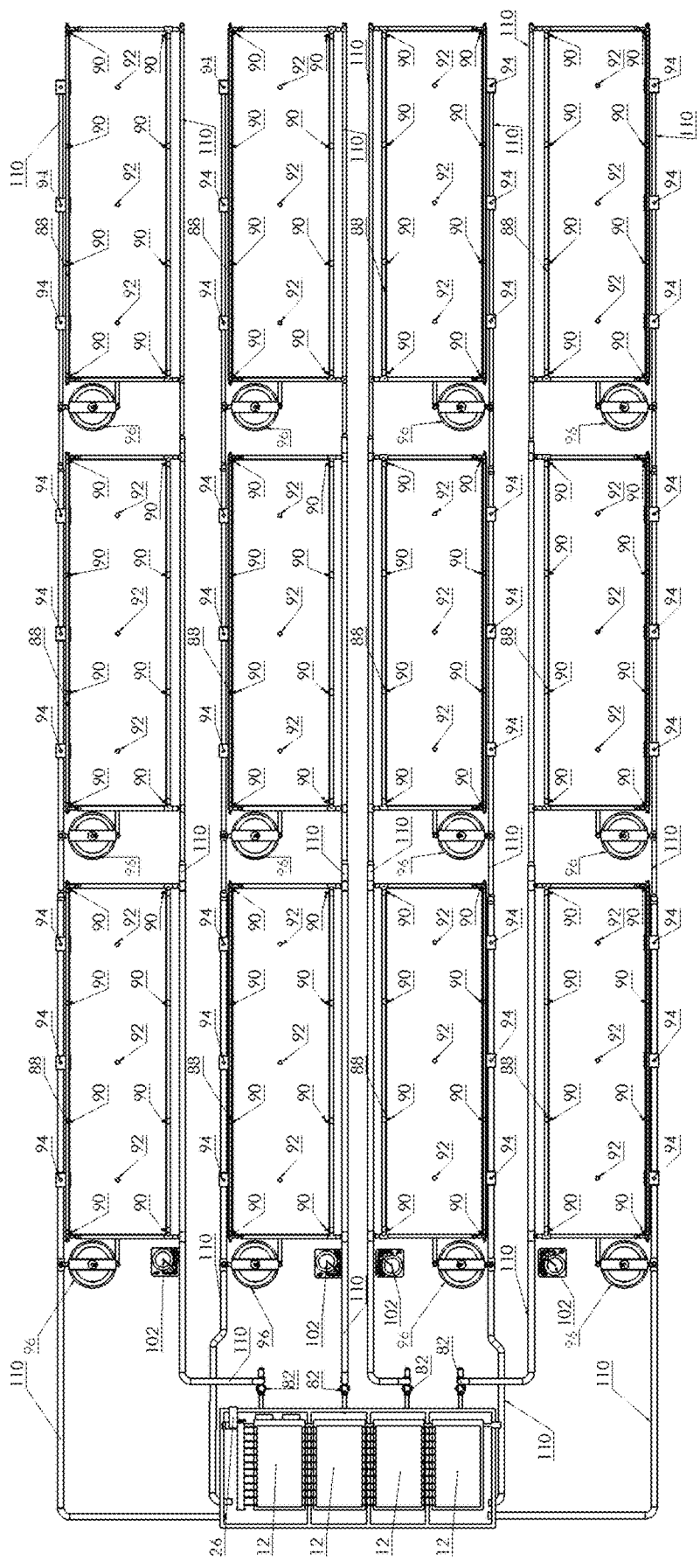
FIG. 3 depicts a perspective view of a recirculating aquaculture system using microorganisms to remove pollutants from a fluid according to one embodiment.
Figure 4:
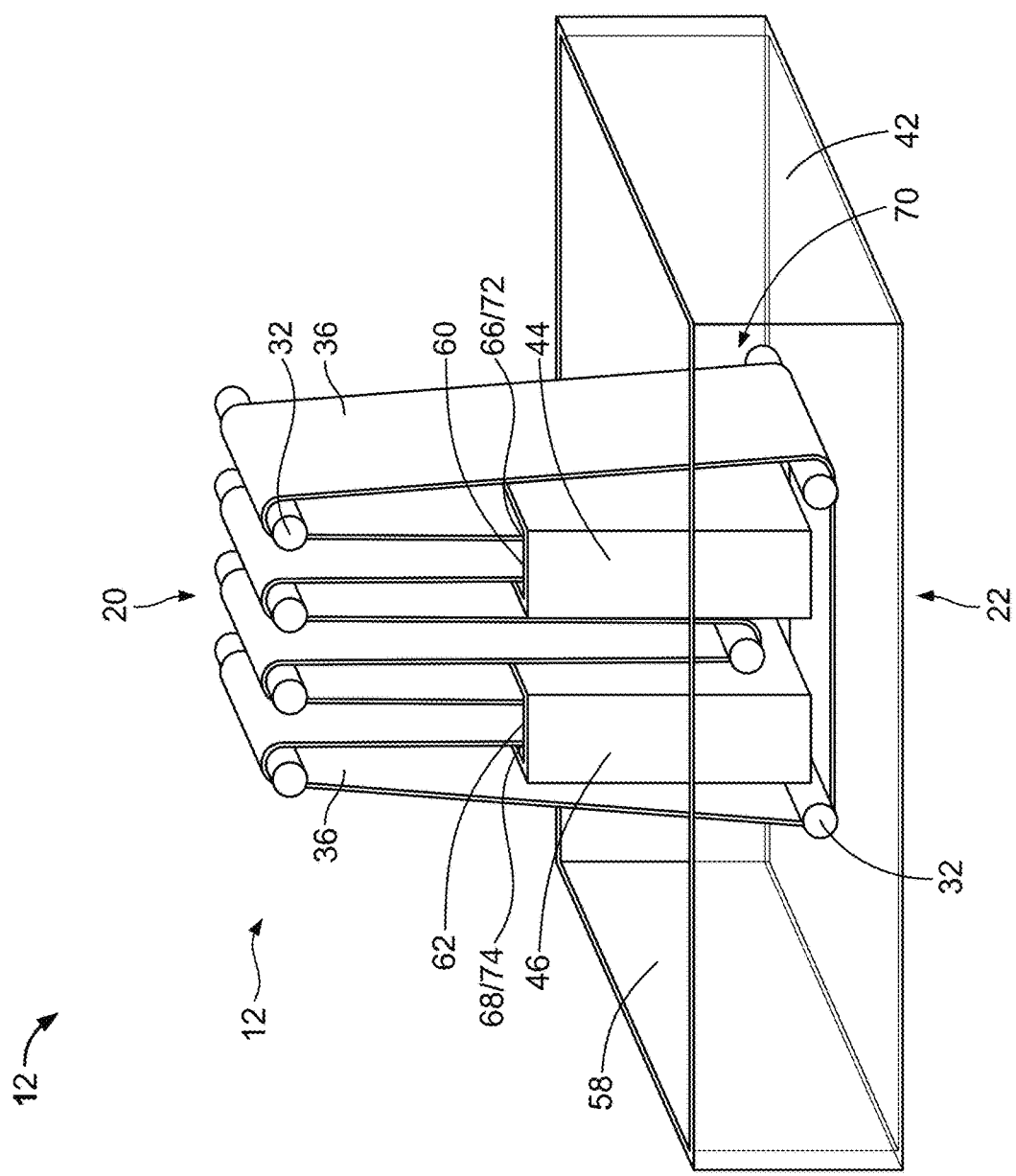
FIG. 4 depicts a perspective view of a system which utilizes microorganisms for removing a pollutant from a fluid.
Figure 5:
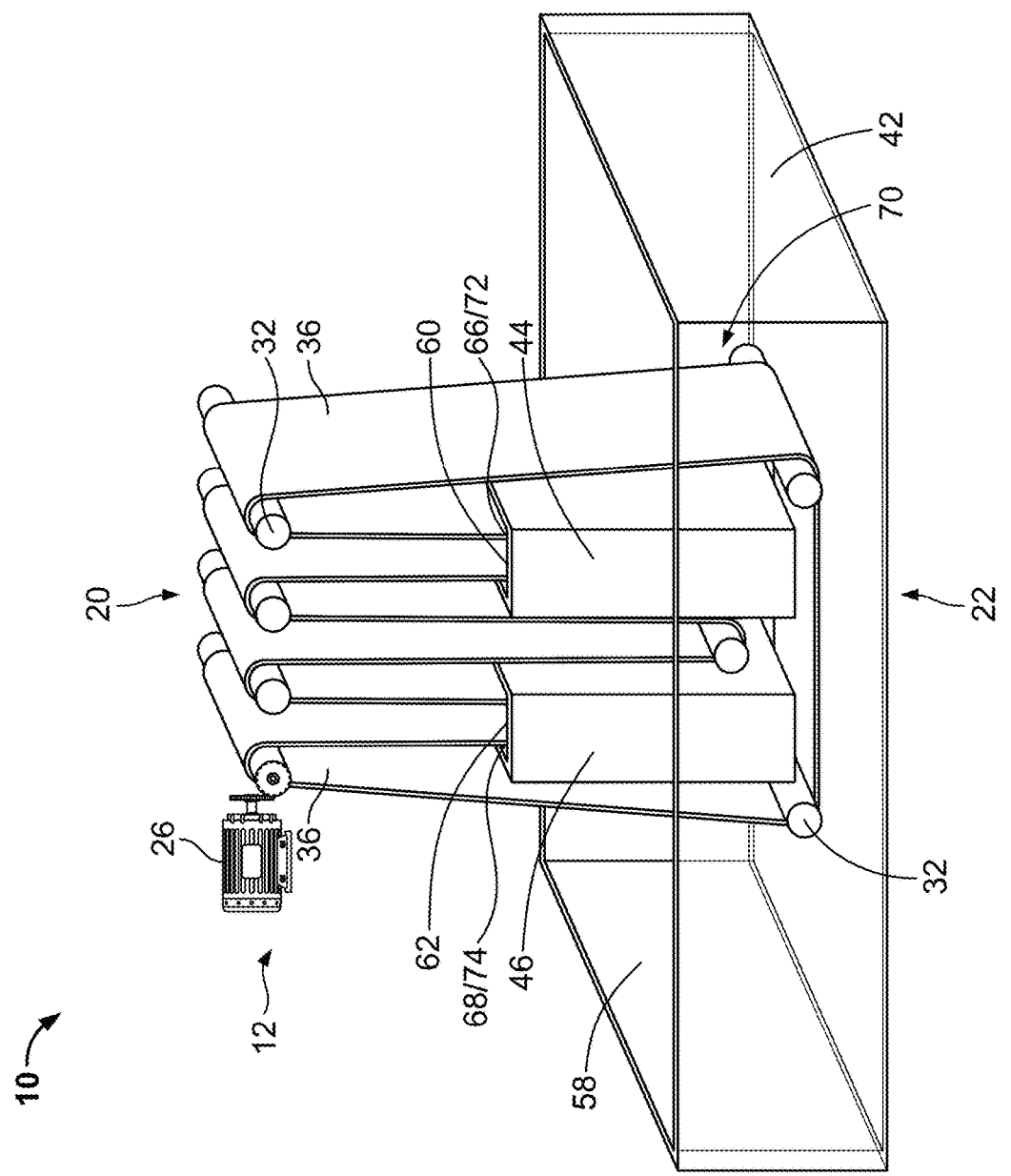
FIG. 5 depicts a perspective view of the system illustrated in FIG. 4 further comprising a motor.
Figure 6:
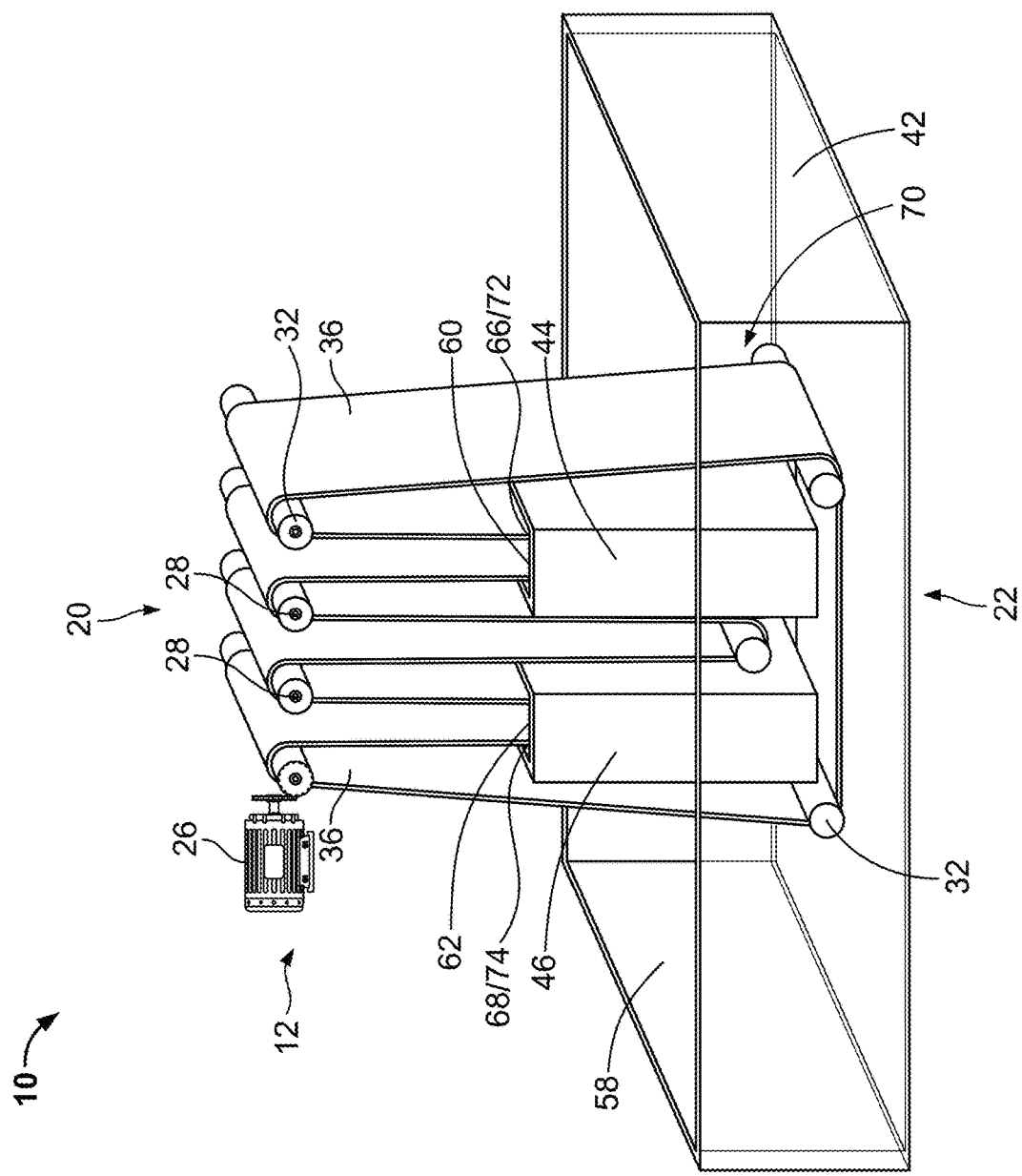
FIG. 6 depicts a perspective view of the system illustrated in FIG. 4 further comprising a motor and a plurality of drive shafts.
Figure 7:
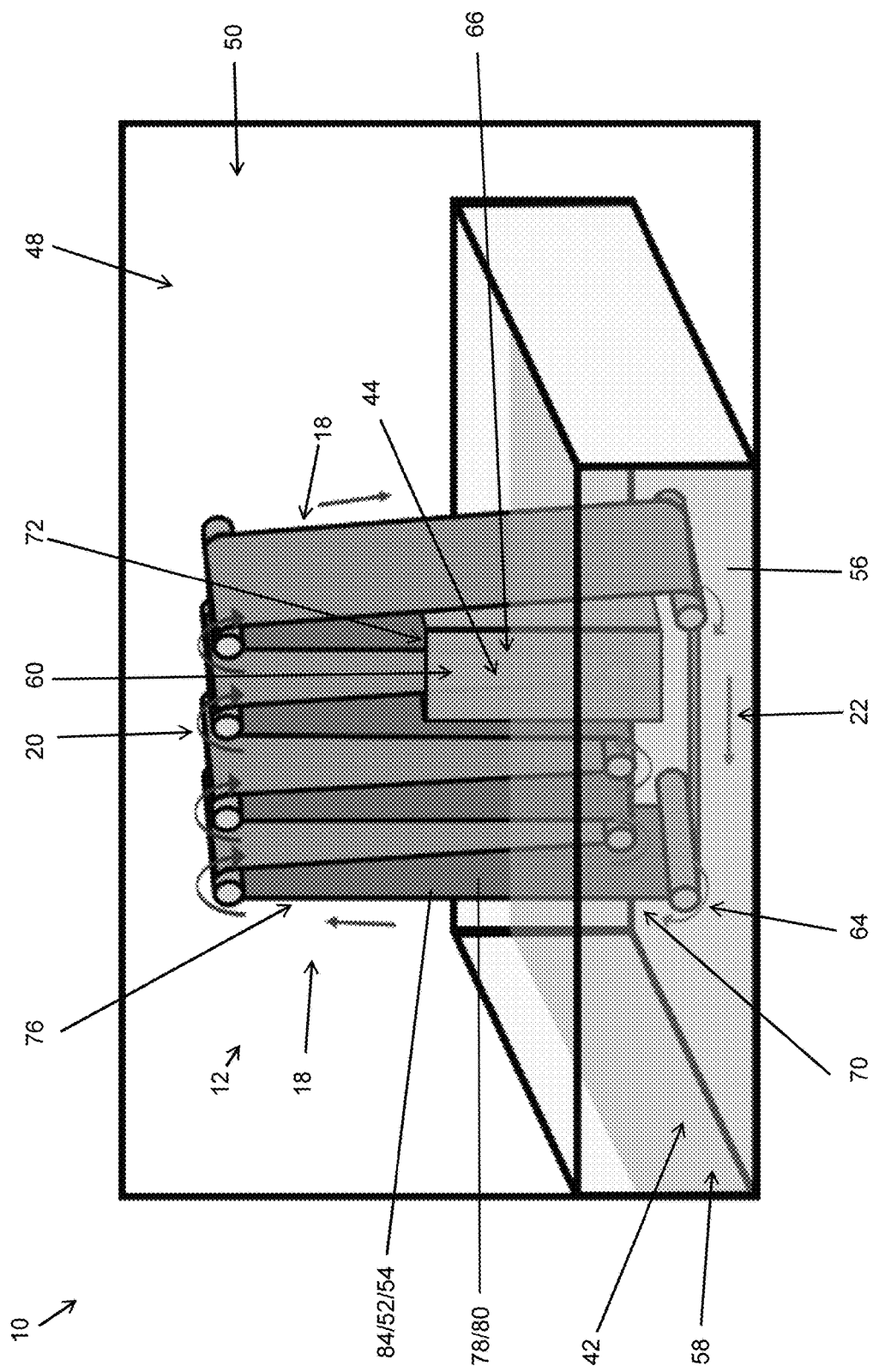
FIG. 7 depicts a perspective view of a system which utilizes microorganisms for removing a pollutant from a fluid wherein the system comprises two reservoirs.
Figure 8:
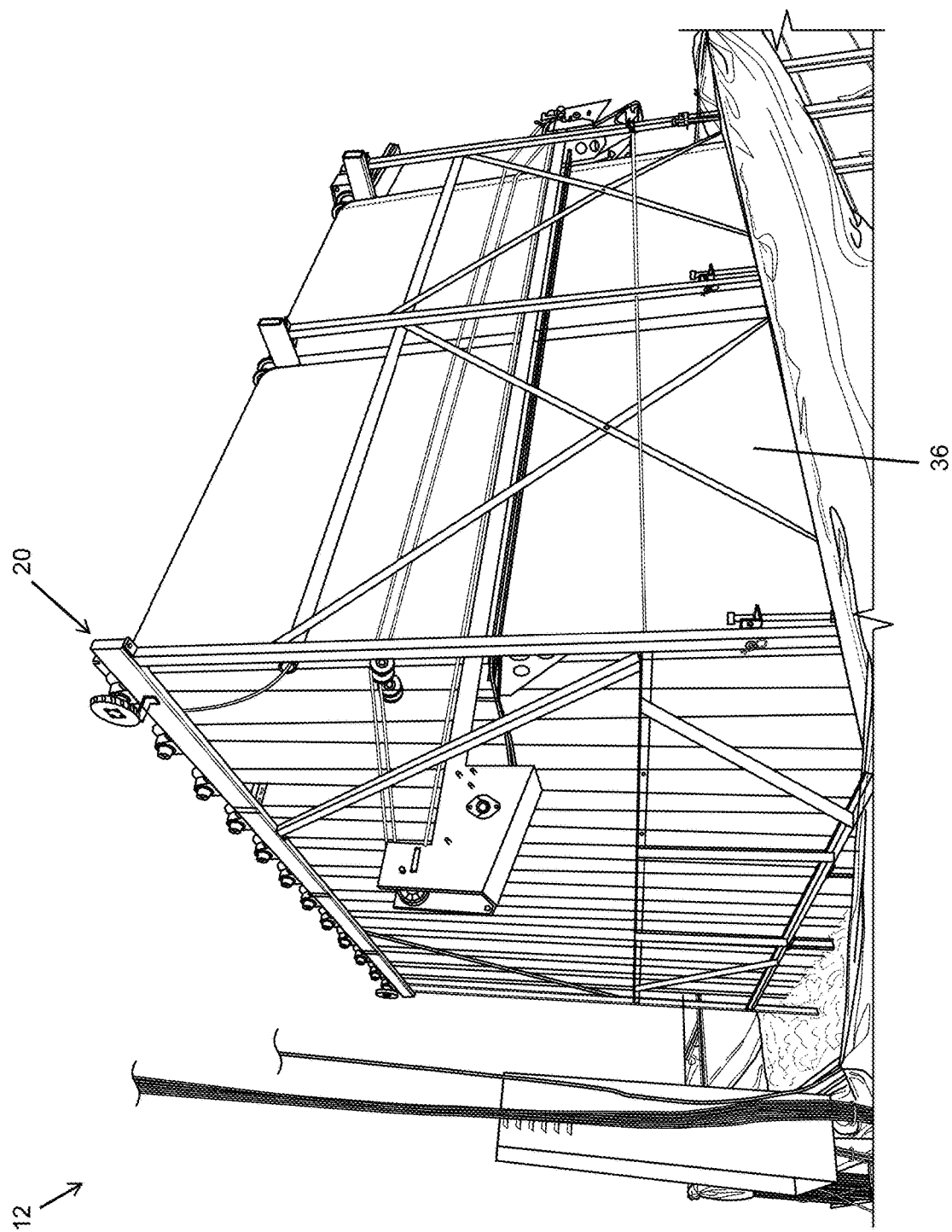
FIG. 8 depicts a perspective view of a microorganism growing apparatus according to one embodiment.
Figure 9:
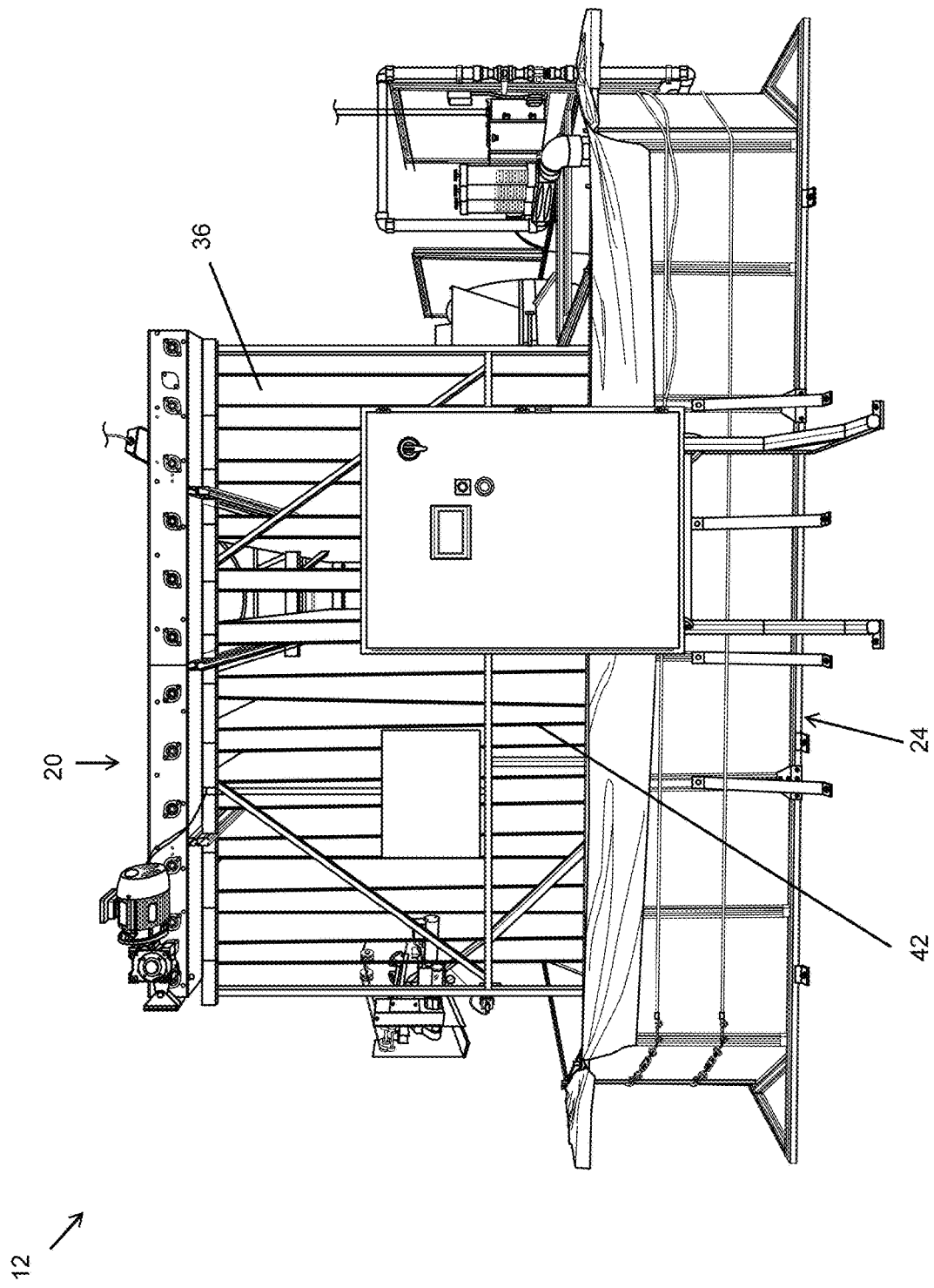
FIG. 9 depicts a perspective view of a microorganism growing apparatus according to one embodiment.
Figure 10:
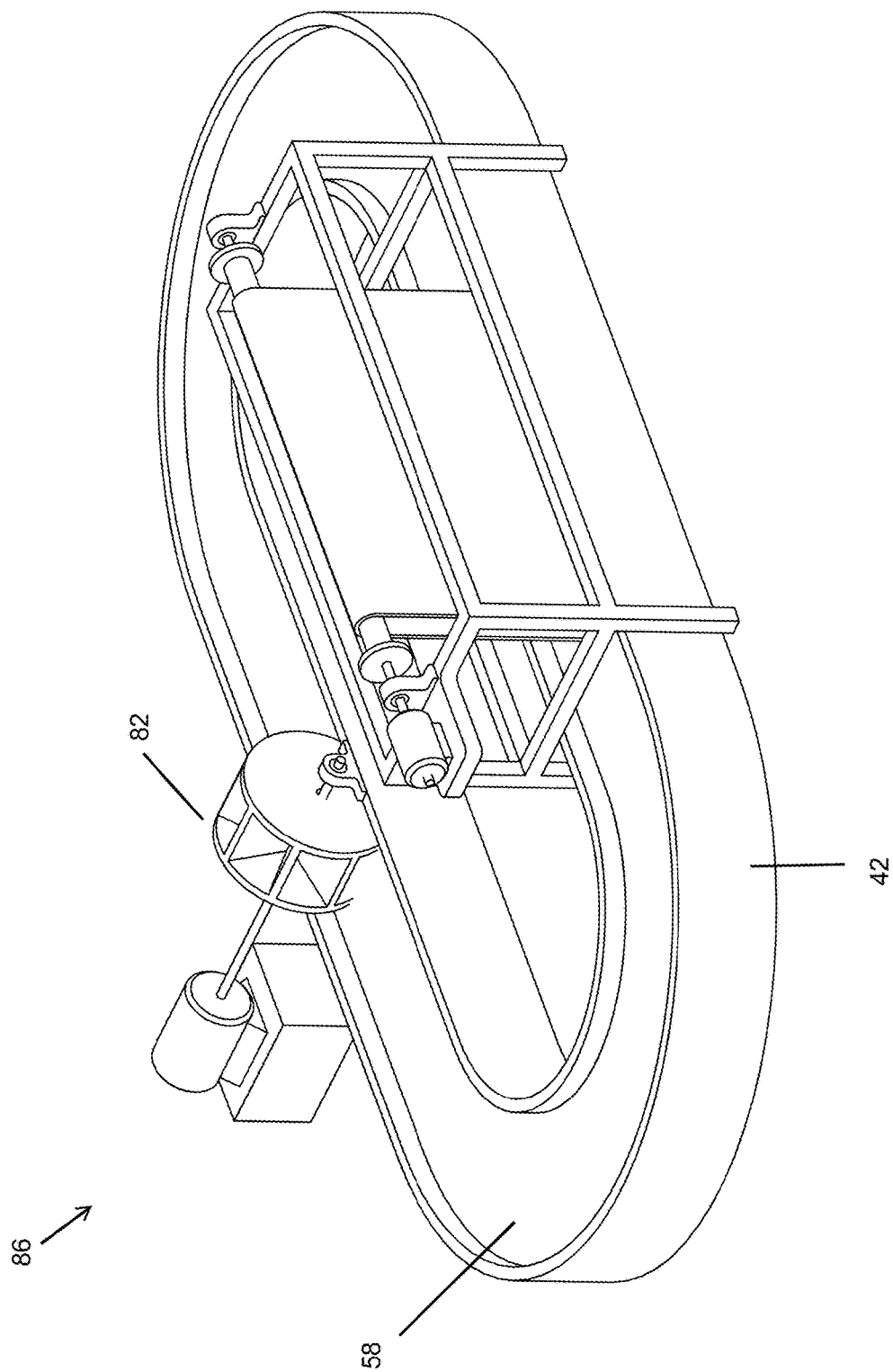
FIG. 10 depicts a perspective view of a trough system according to one embodiment.
Figure 11:
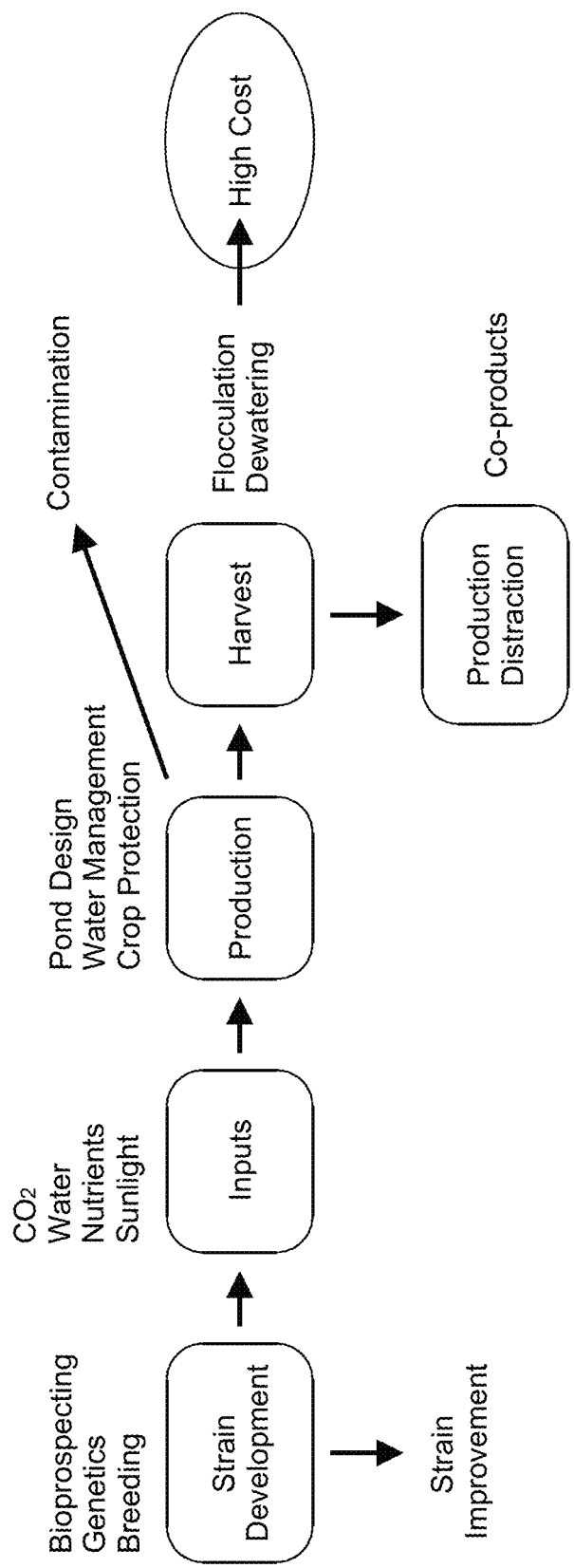
FIG. 11 depicts a flow chart illustrating the methodology generally associated with harvesting of microorganisms such as algae.
Figure 12:
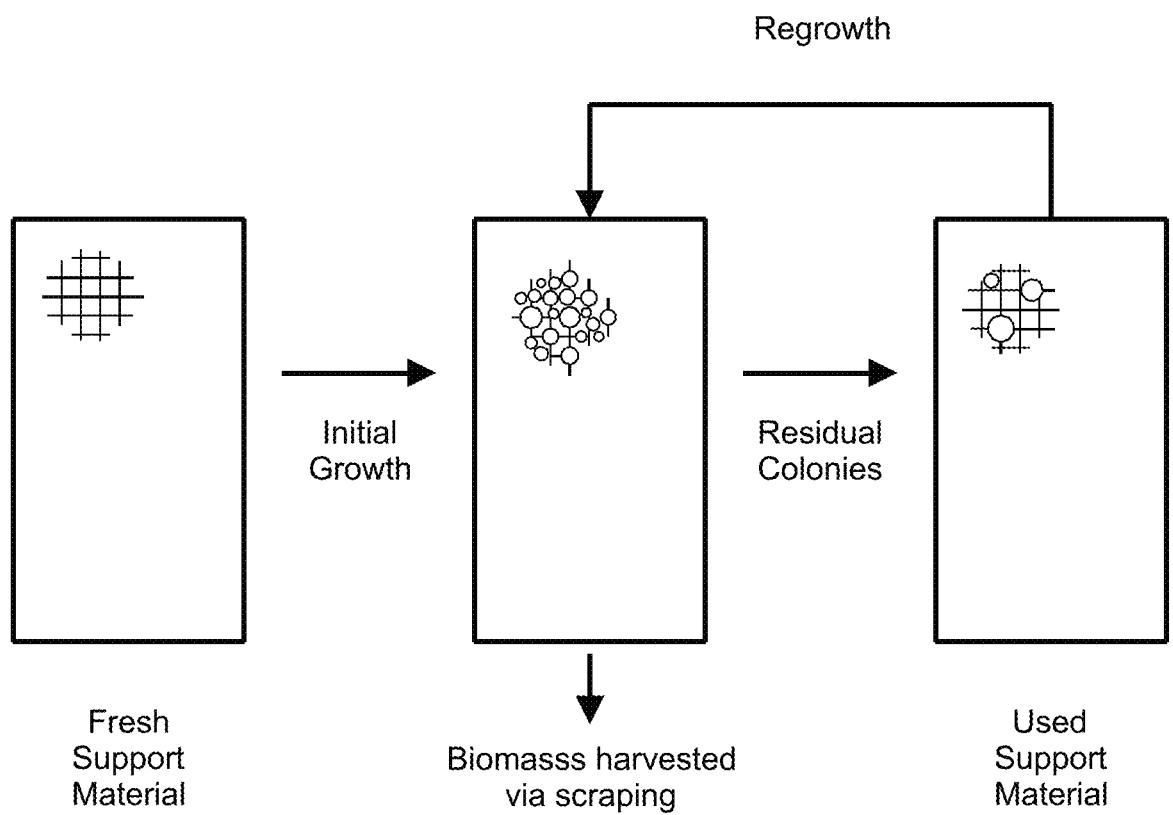
FIG. 12 depicts a top view of a microorganism, such as algae, being grown on a moving belt.
Figure 13:
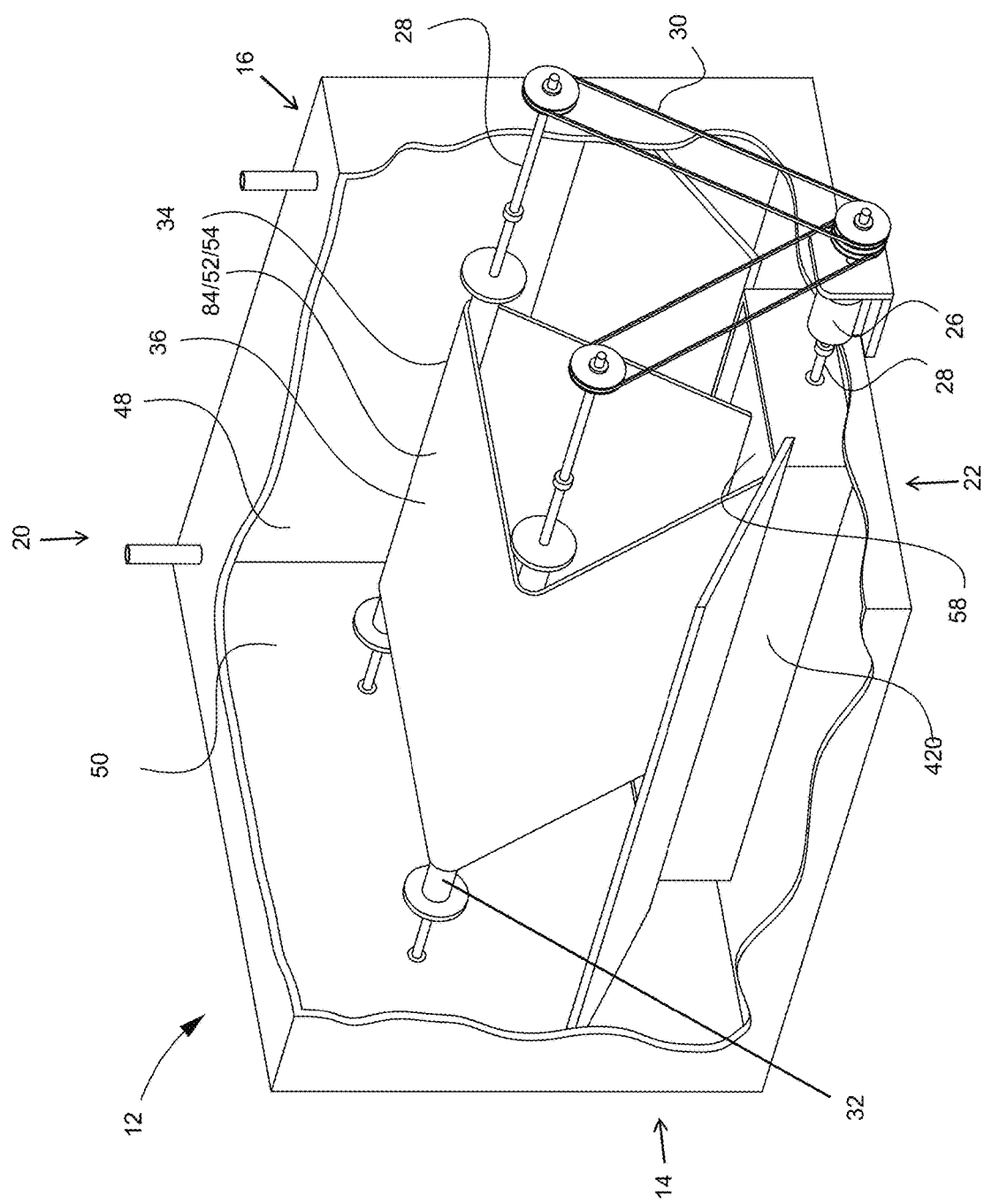
FIG. 13 depicts a partial cutaway perspective view of a microorganism growing apparatus according to one embodiment.
Figure 14:
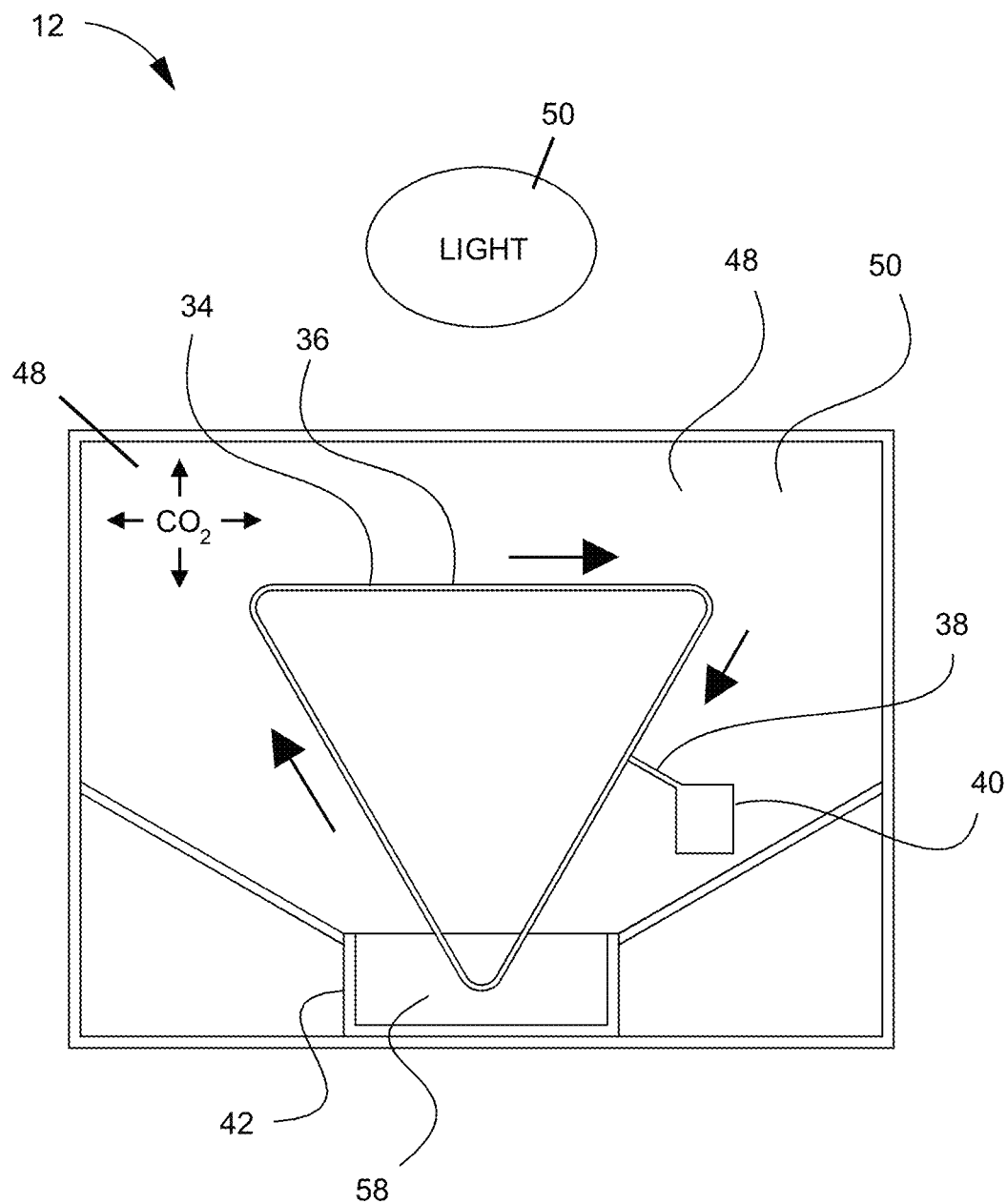
FIG. 14 depicts a schematic front view of the microorganism growing apparatus illustrated in FIG. 13.
Figure 15:
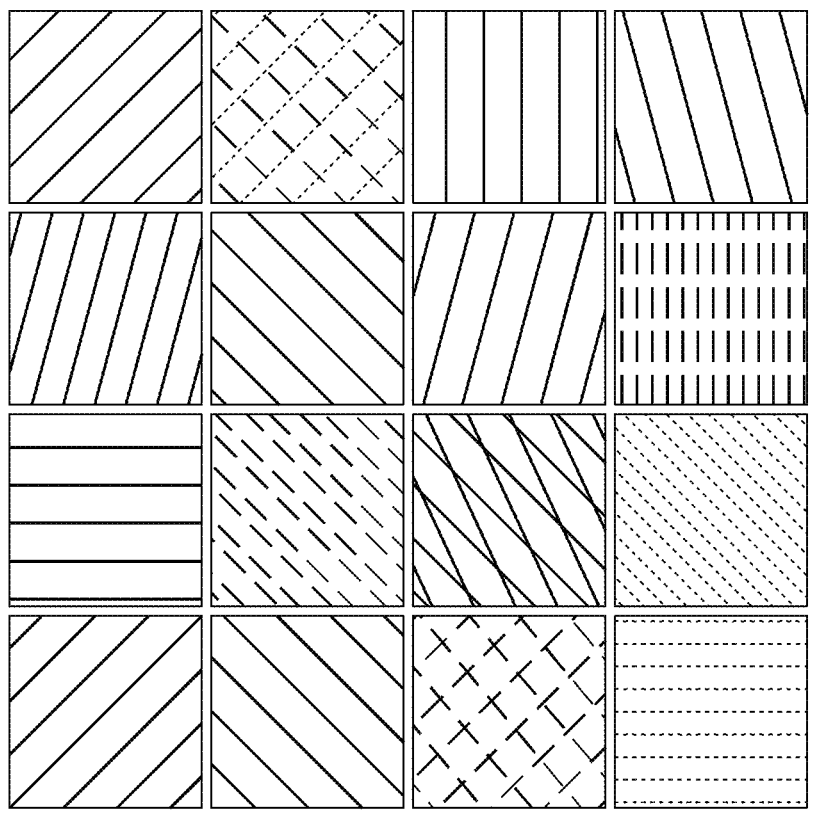
FIG. 15 depicts a top view of a microorganism being grown on a variety of materials which may be used to form the at least one moving belt.
Figure 16:
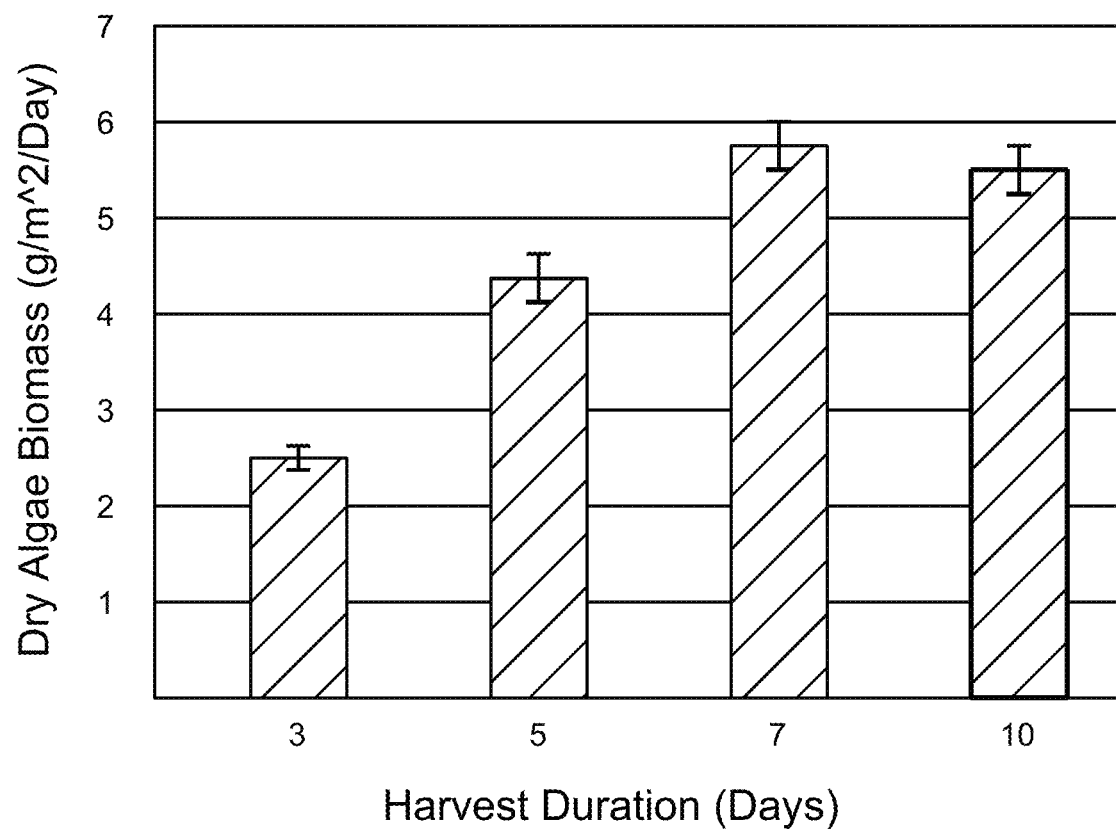
FIG. 16 depicts a bar chart of harvesting frequencies for an algal strain according to one embodiment.
Figure 17:
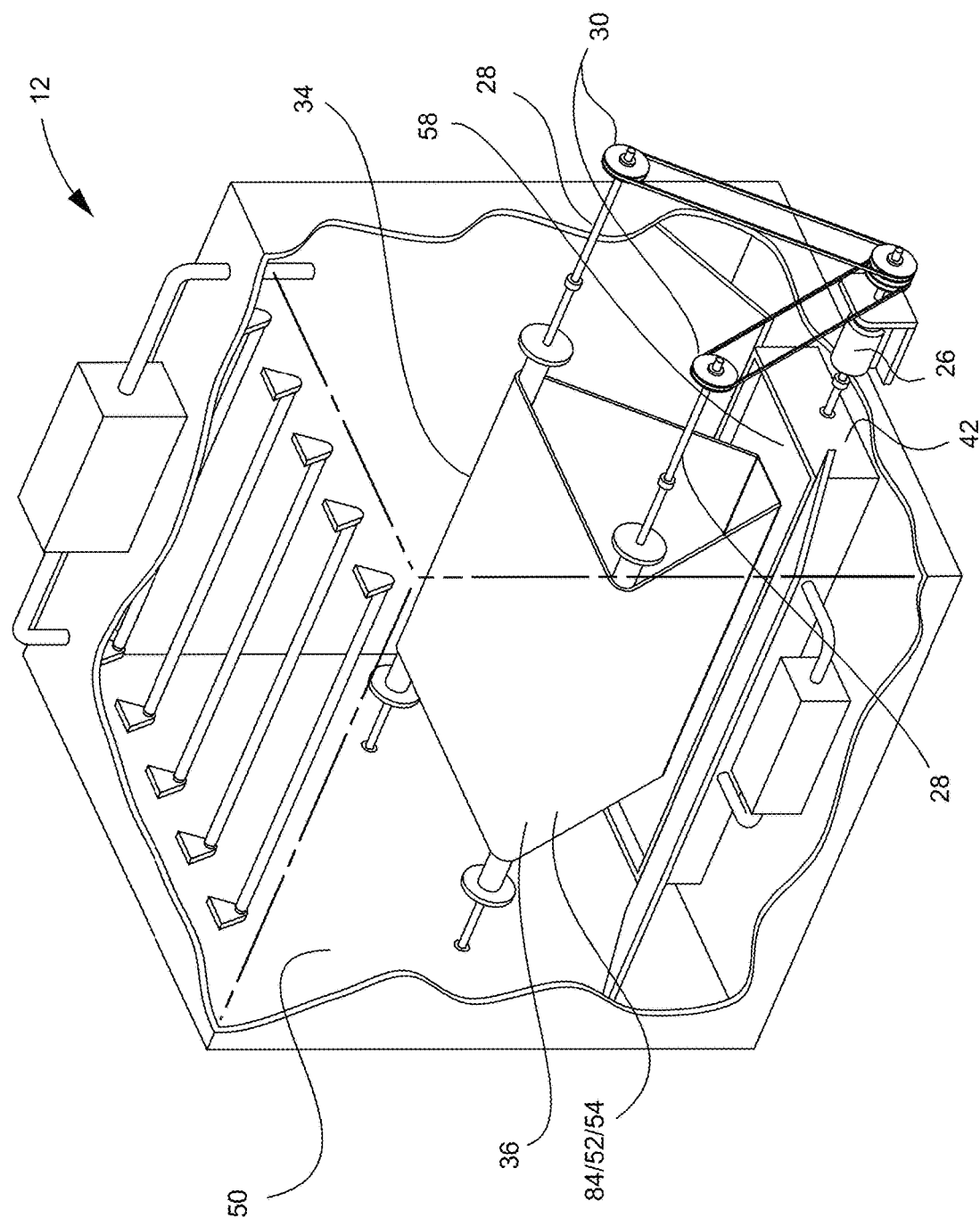
FIG. 17 depicts a partial cutaway perspective view of the microorganism growing apparatus illustrated in FIG. 13, shown with grow lights and gas input.
Figure 18:
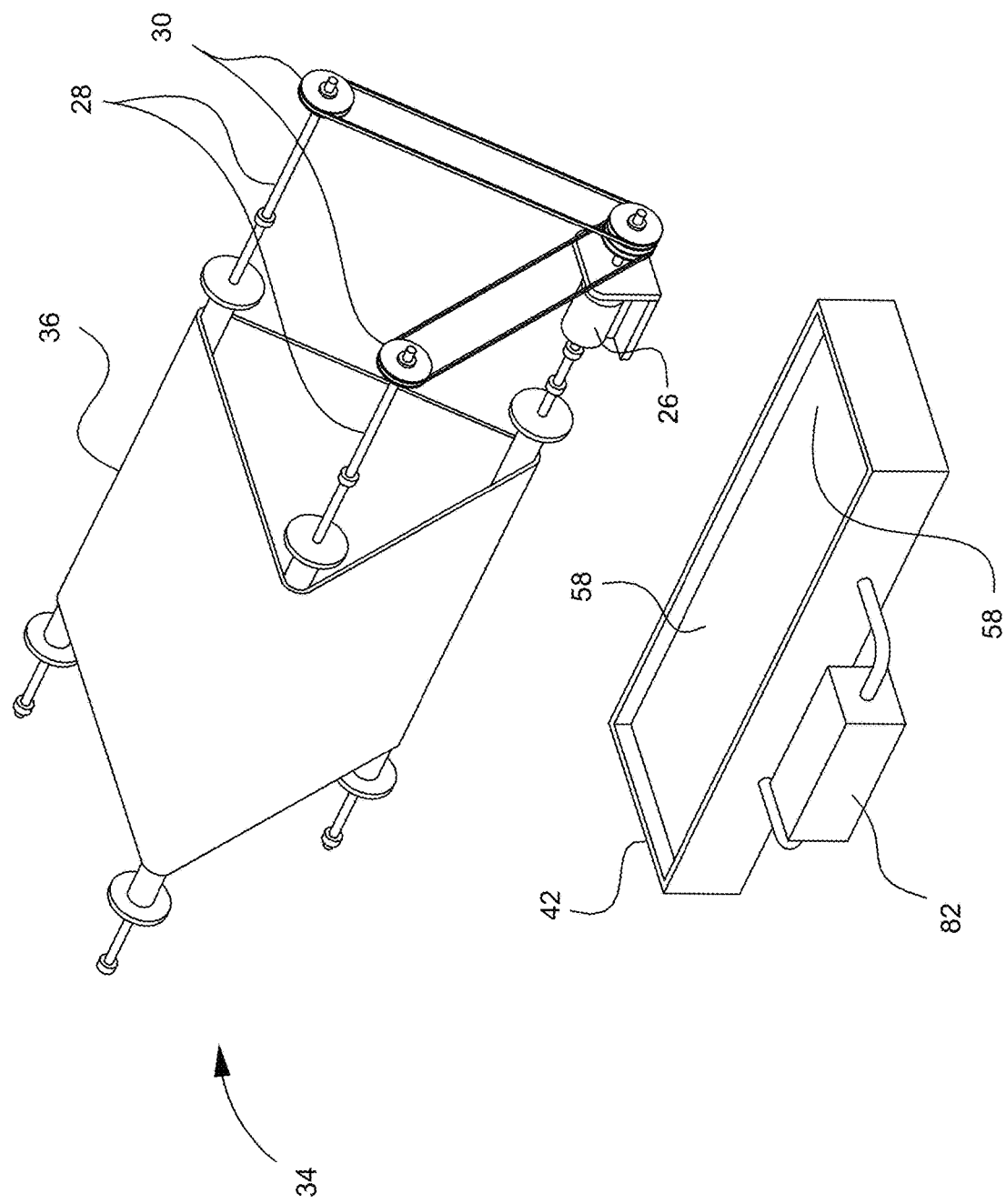
FIG. 18 depicts a partial exploded view of the microorganism growing apparatus shown in FIG. 13.
Figure 19:
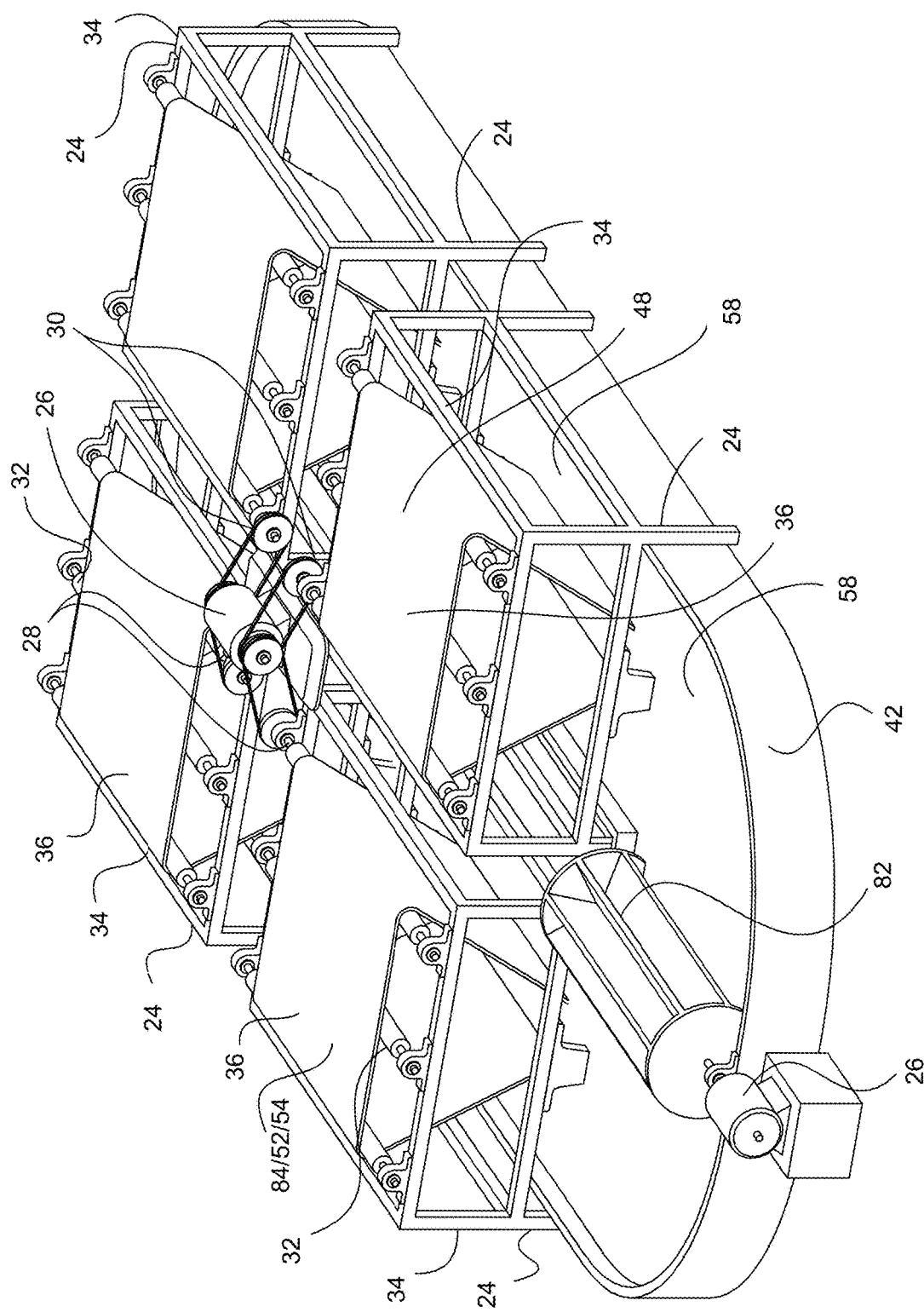
FIG. 19 depicts a perspective view of a system having a plurality of associated microorganism growing apparatuses and a trough system according to one embodiment.
Figure 20:
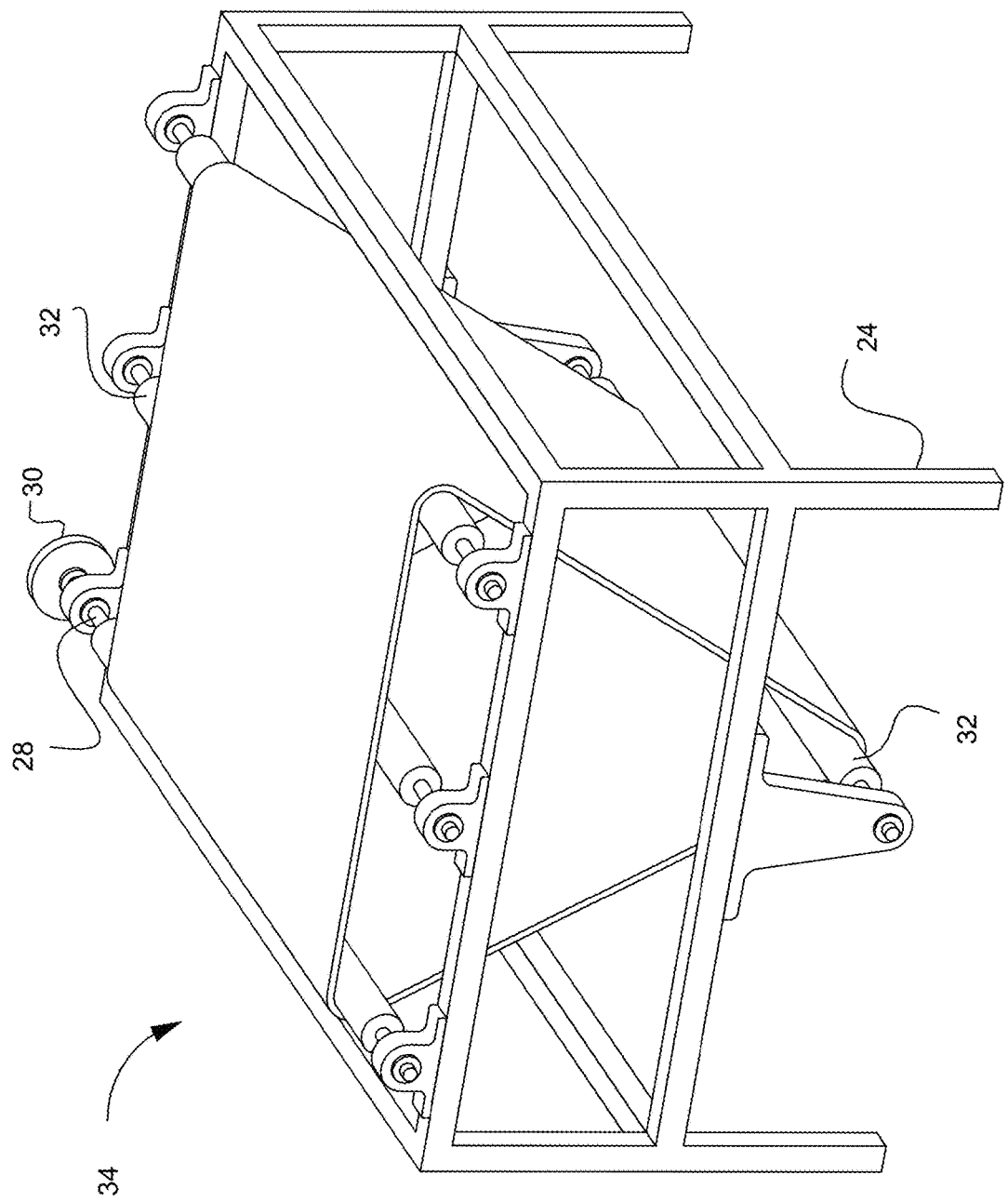
FIG. 20 depicts a perspective view of a microorganism growing apparatus as illustrated in FIG. 22.
Figure 21:
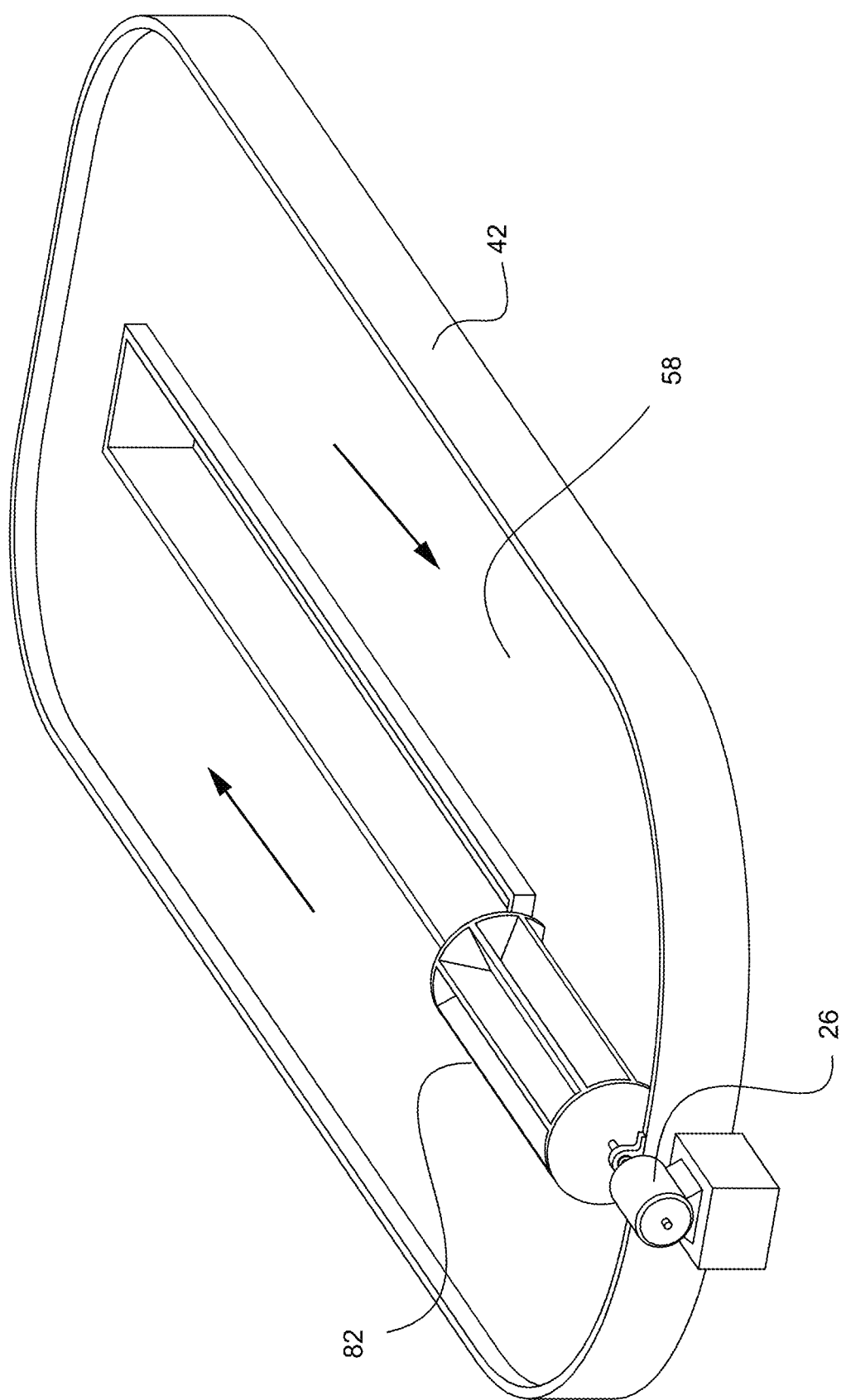
FIG. 21 depicts a perspective view of a trough system as illustrated in FIG. 22.
Figure 22:
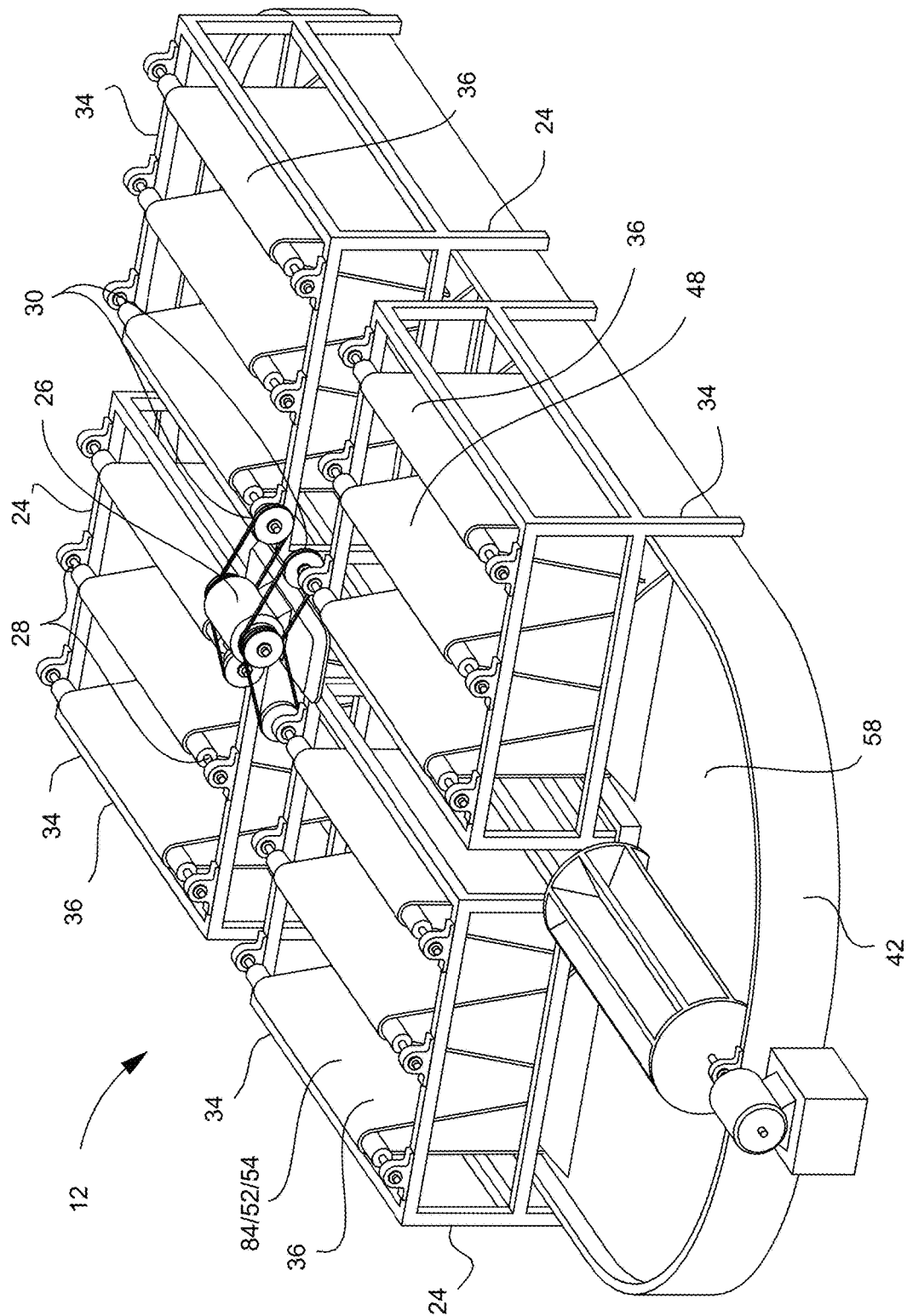
FIG. 22 depicts a perspective view of a system having a plurality of associated microorganism growing apparatuses and a trough system according to an alternate embodiment.
Figure 23:
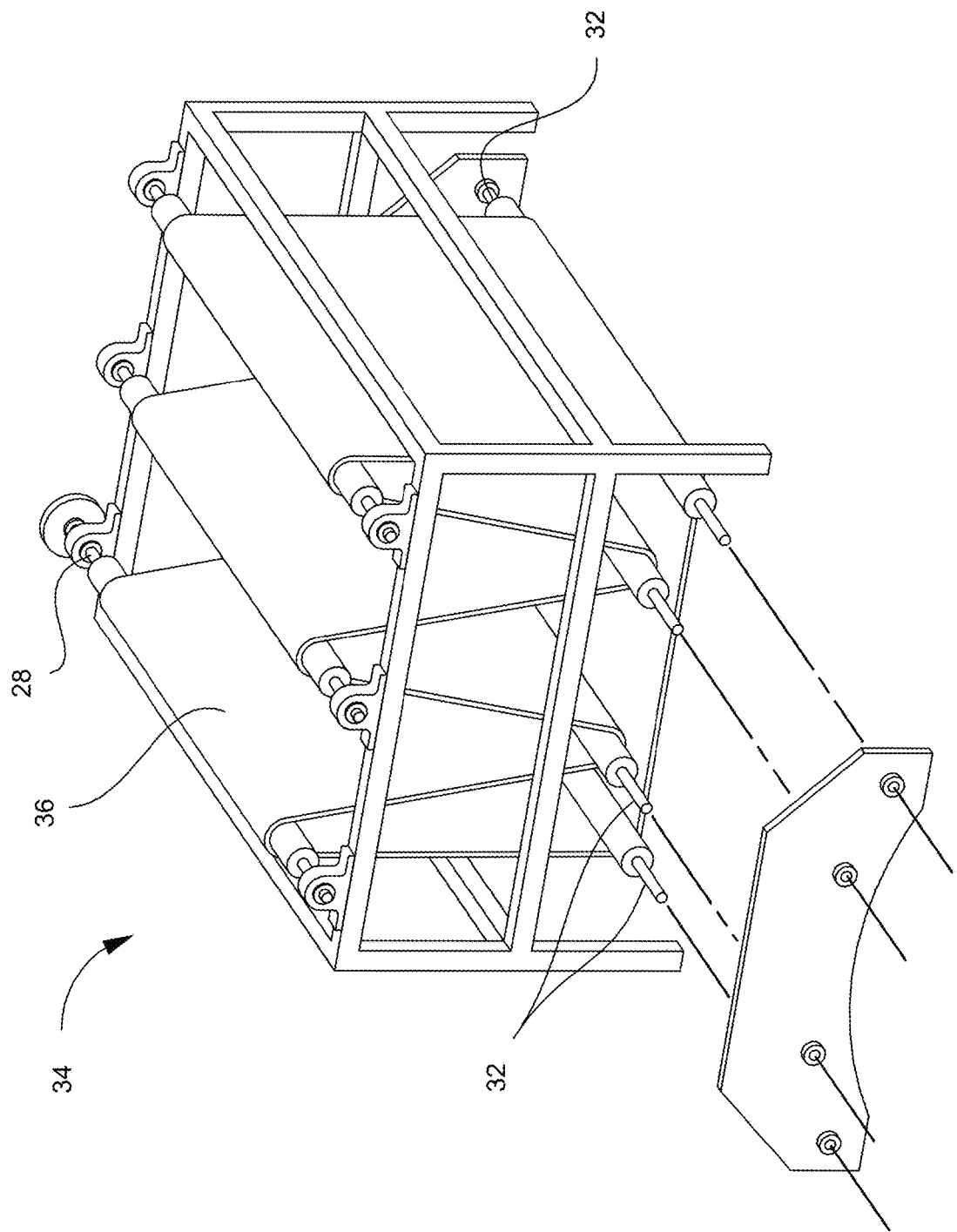
FIG. 23 depicts a perspective view of a microorganism growing apparatus as illustrated in FIG. 22.
Figure 24:
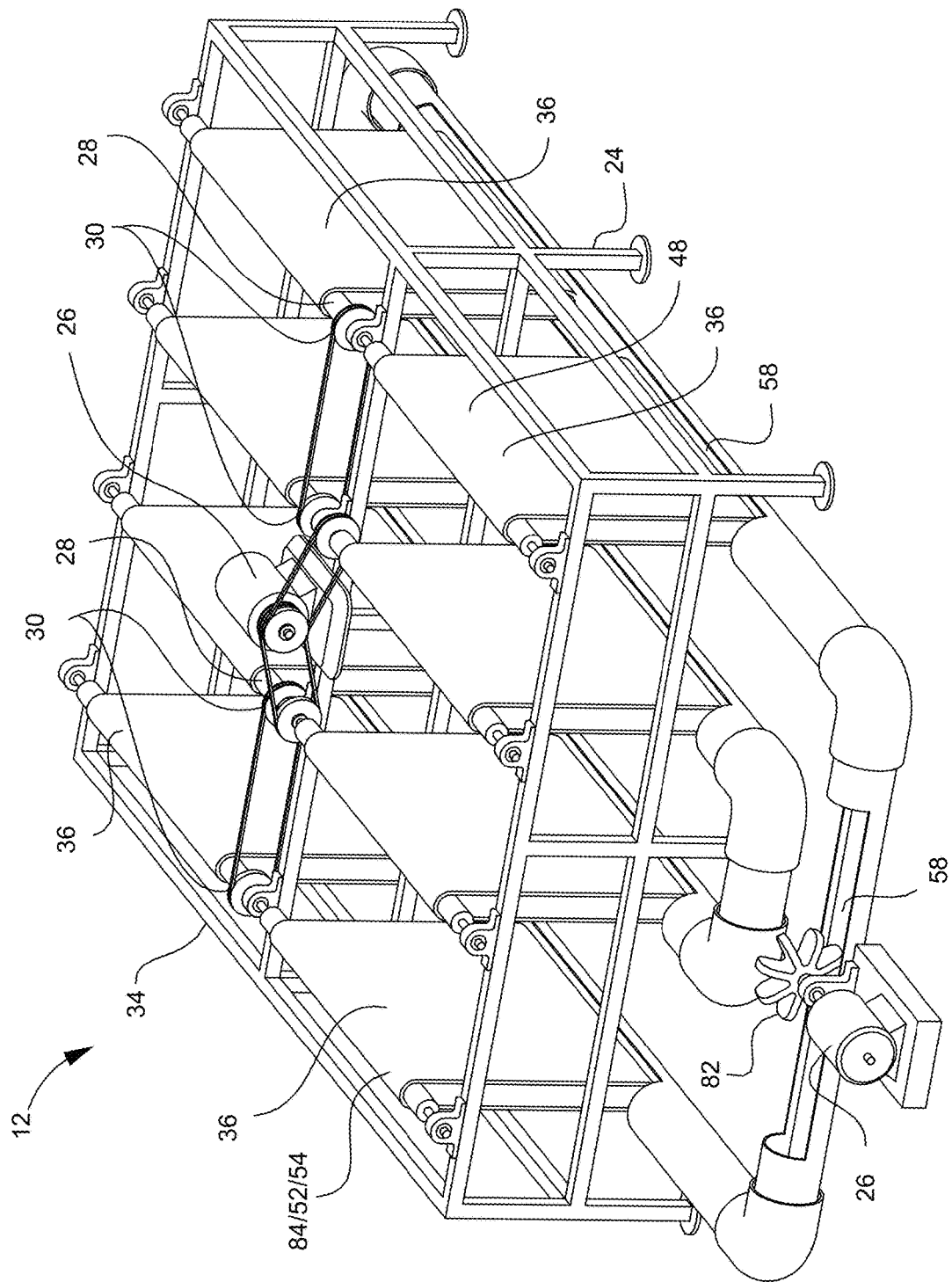
FIG. 24 depicts a perspective view of a system having associated microorganism growing apparatuses and a trough system according to one embodiment.
Figure 25:
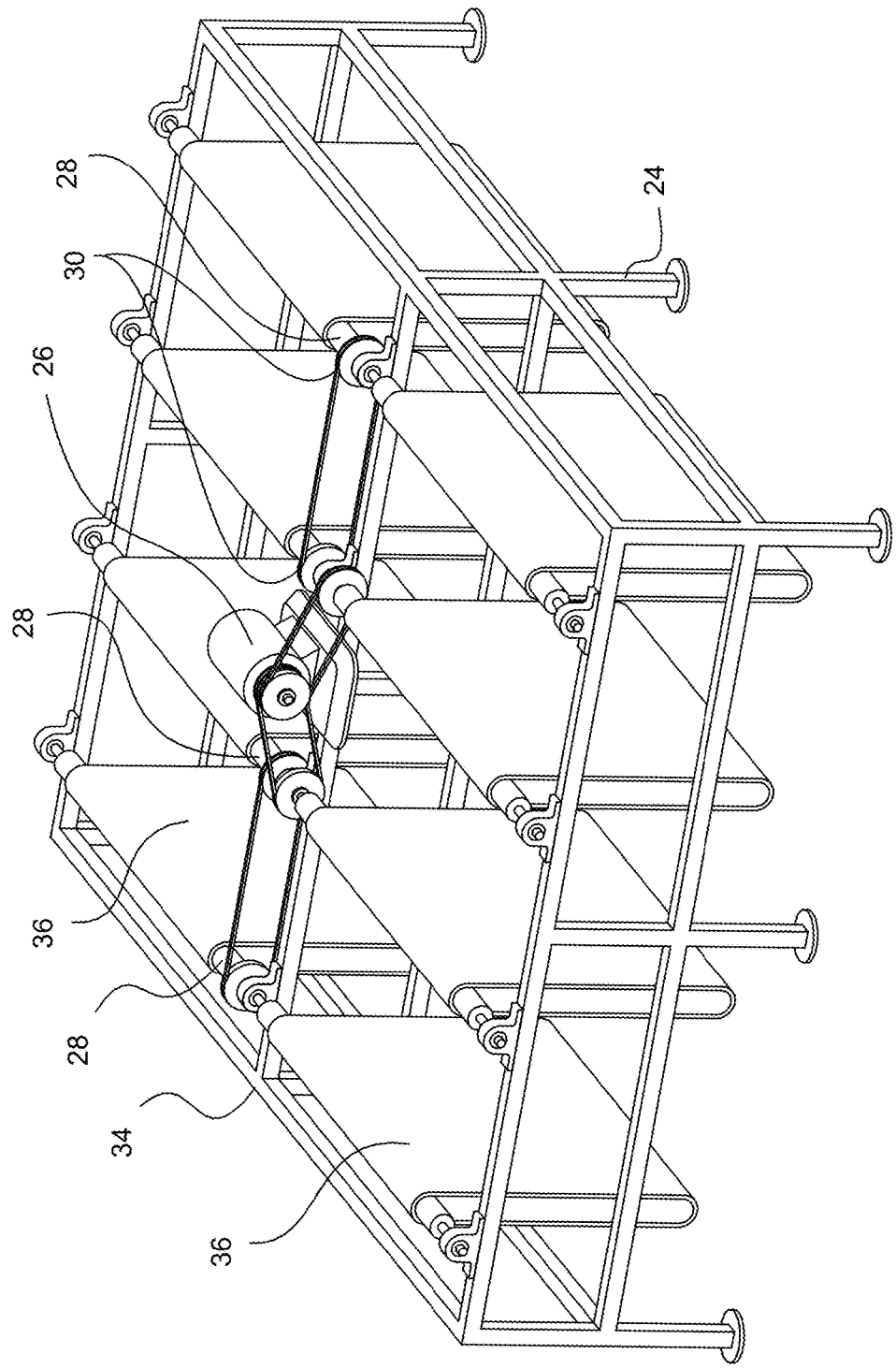
FIG. 25 depicts a perspective view of the system having associated microorganism growing apparatuses as illustrated in FIG. 24.
Figure 26:
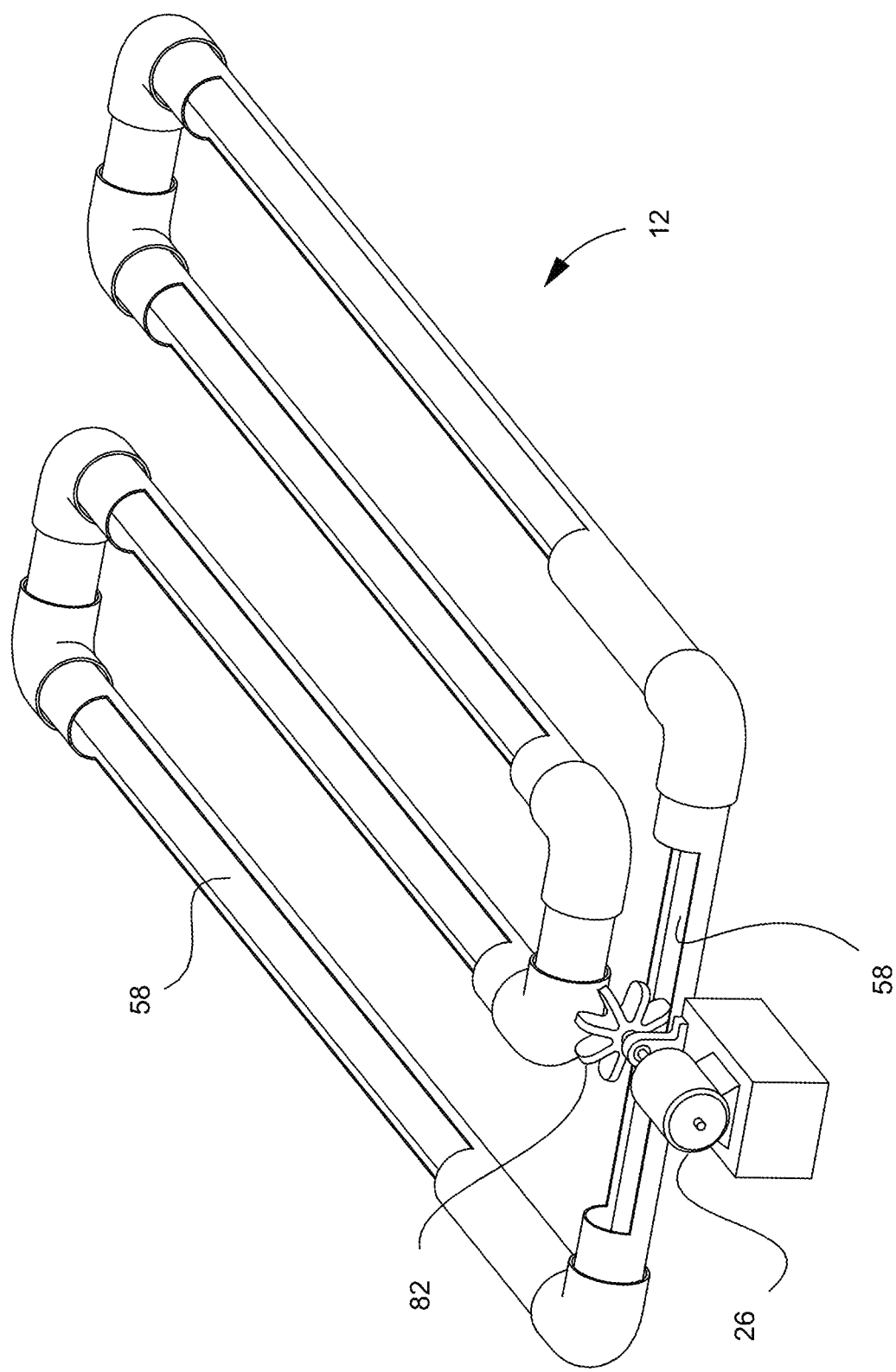
FIG. 26 depicts a perspective view of the trough system illustrated in FIG. 24.
Figure 27:
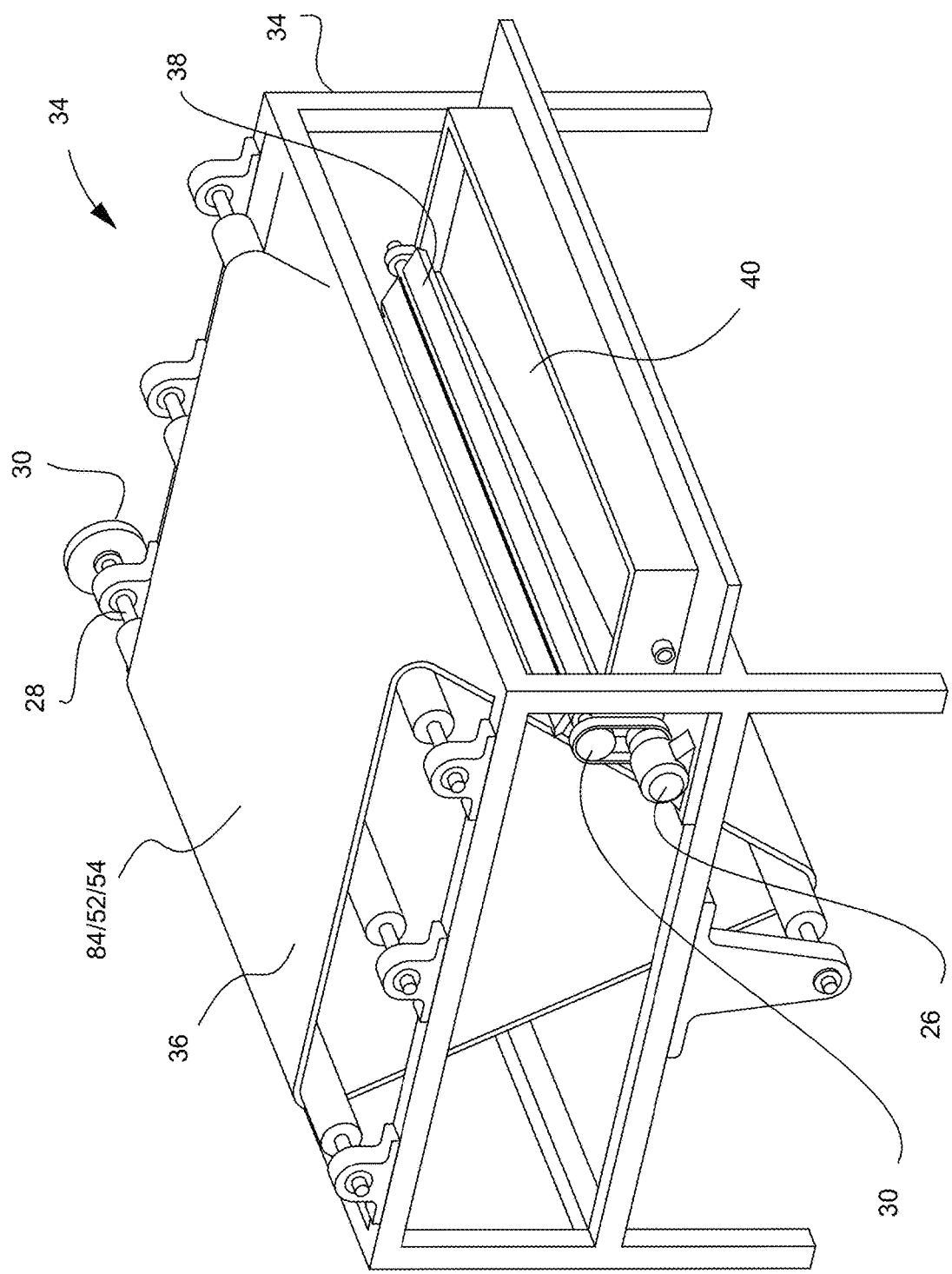
FIG. 27 depicts a perspective view of a microorganism growing apparatus shown with a mechanized harvesting system according to one embodiment.
Figure 28:
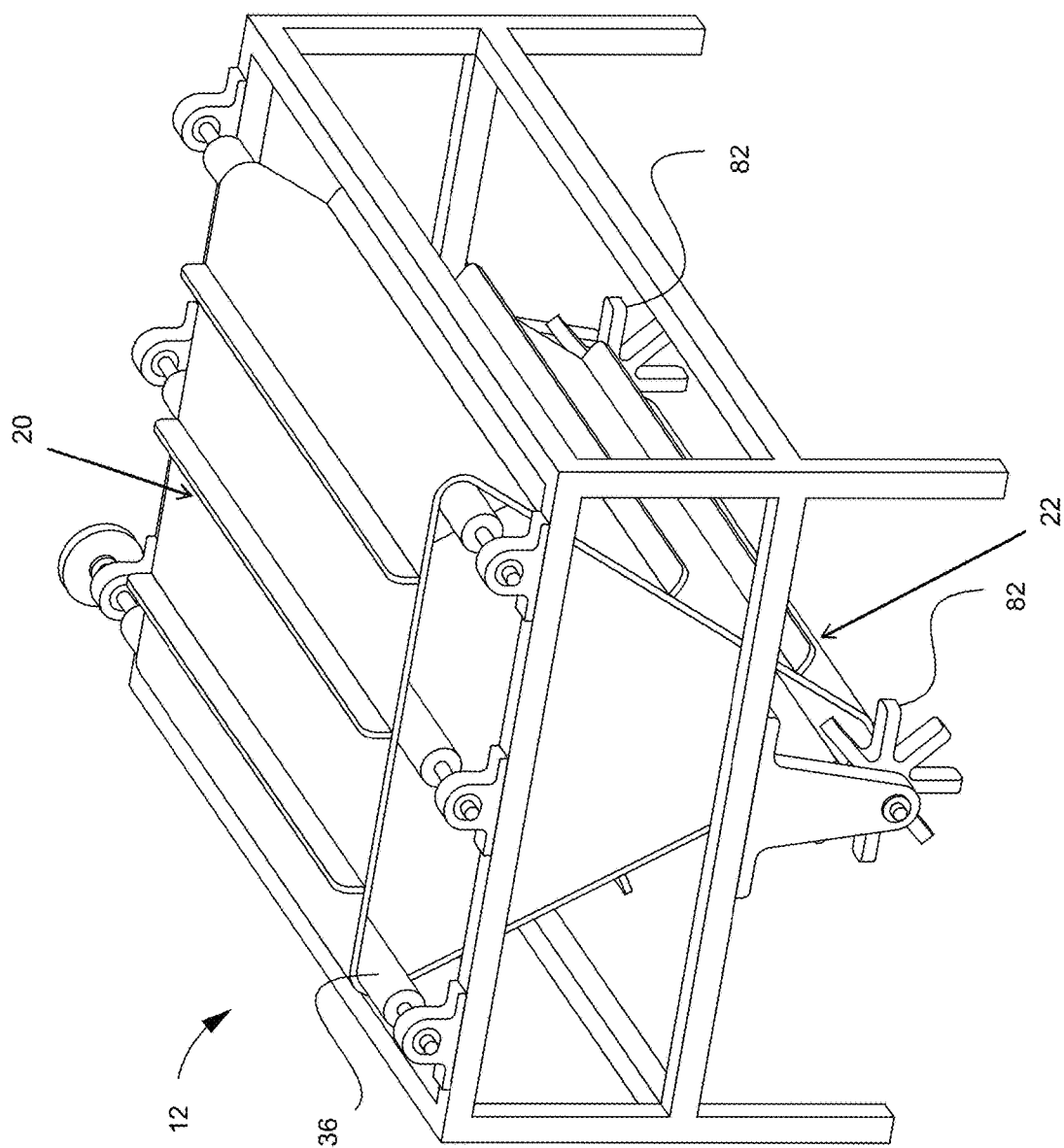
FIG. 28 depicts a perspective view of a microorganism growing apparatus according to one embodiment.
Figure 29:
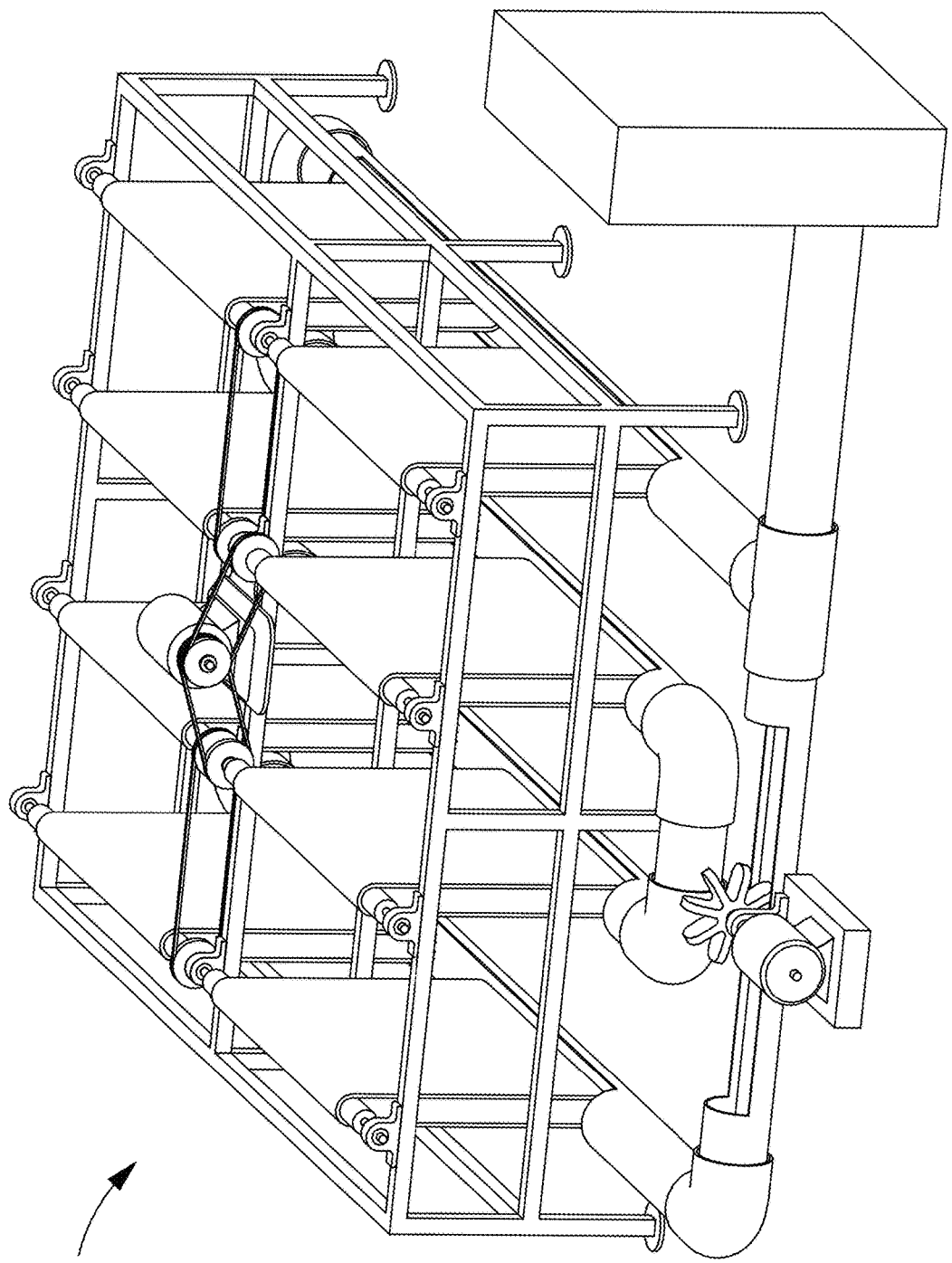
FIG. 29 depicts a perspective view of a system according to one embodiment.
Figure 30:
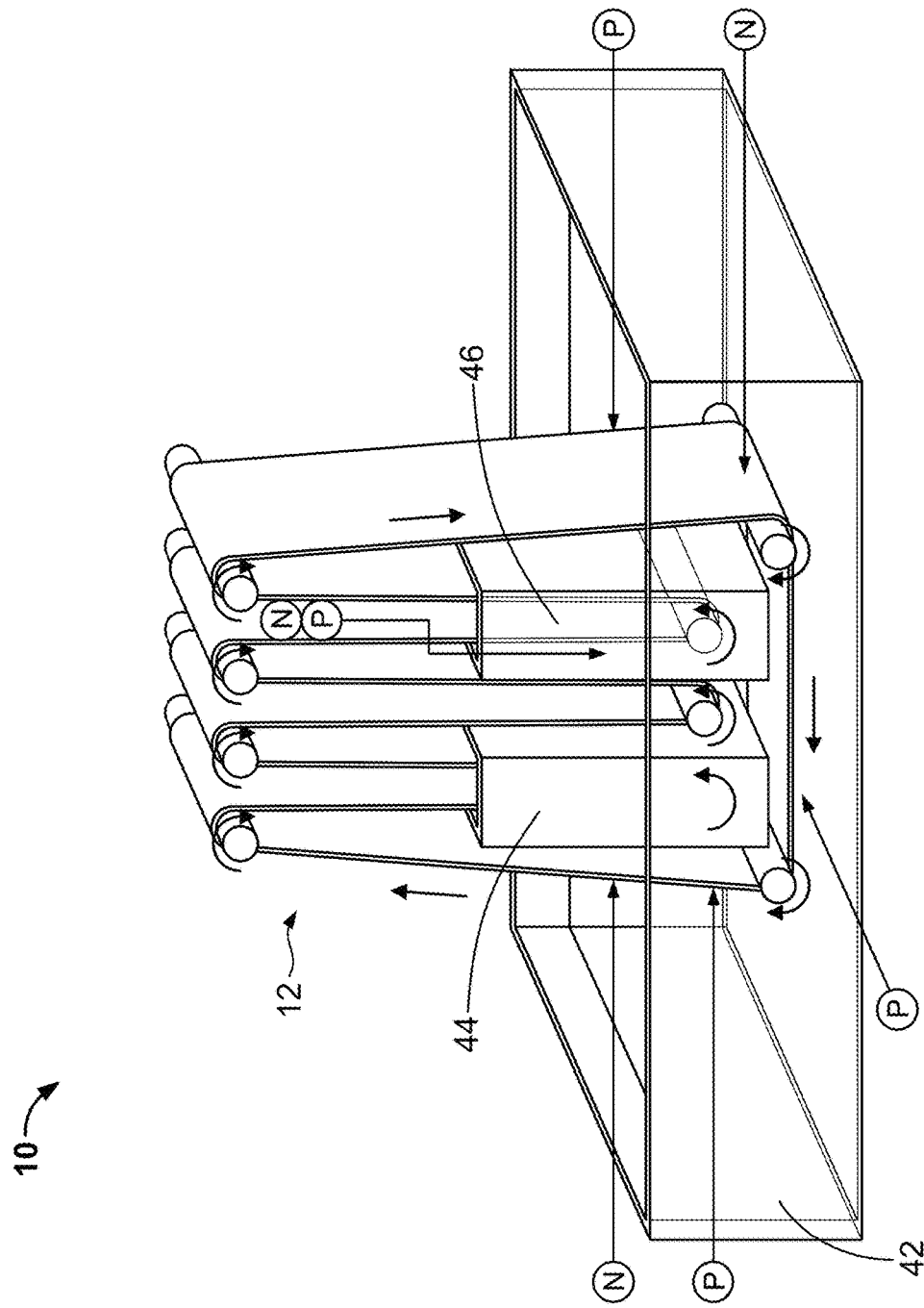
FIG. 30 depicts a perspective view of a system which utilizes microorganisms for removing a pollutant from a fluid according to one embodiment; wherein the system comprises a first reservoir for pollutant uptake and a second reservoir for release of the pollutant.
Figure 31:
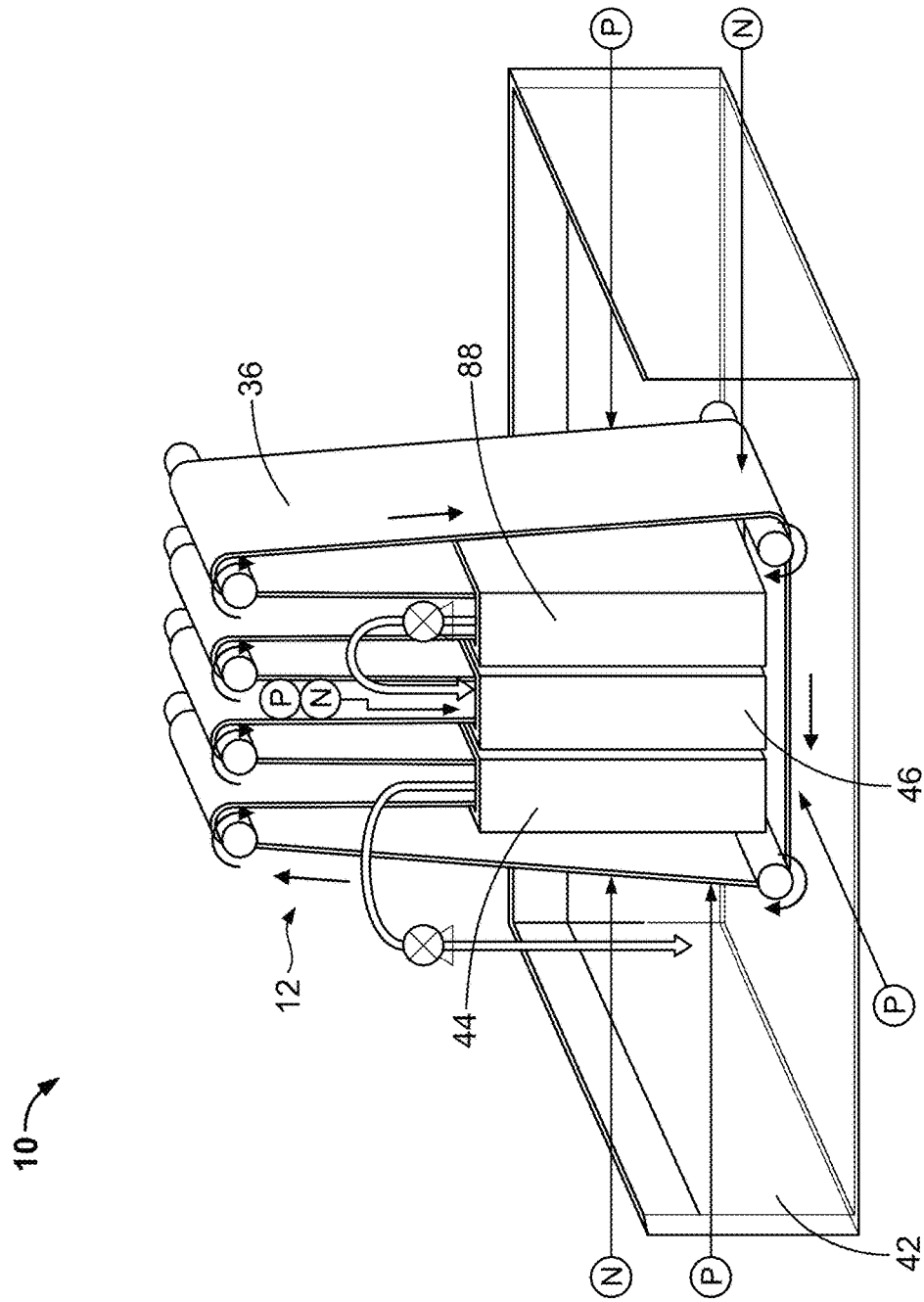
FIG. 31 depicts a perspective view of a system which utilizes microorganisms for removing a pollutant from a fluid according to one embodiment; wherein the system comprises four reservoirs.

In yet another arrangement, as one example, the recirculating aquaculture system 10 may comprise a plurality of tanks 88, a radial flow settler 96, a fluid recirculation system 110, a motor 26, a foam fractionator 102, a plurality of pumps 82, and at least one microorganism biofilm growing apparatus 12, in addition to other components, as depicted in FIG. 3.

As stated above, in one arrangement, as one example, the recirculating aquaculture system 10 comprises a microorganism growing apparatus 12 in order to provide for filtering a fluid 58 which is recirculated throughout the system 10. This allows for the fluid 58 to be reused within the recirculating aquaculture system 10 while controlling the environment in order to maximize fish growth and production. In one arrangement, as described in more detail below, the fluid 58 moves from the drum filter 106 of the recirculating aquaculture system 10 to the microorganism growing apparatus 12 through a waterfall 108.

The recirculating aquaculture system 10 may be formed of any suitable size, shape, and design. Furthermore, the recirculating aquaculture system 10 may be formed of any material that is acceptable for fish production. The recirculating aquaculture system 10 may be formed of any material without departing from the scope of the disclosure.

Plurality of Tanks

In one arrangement, as one example, the recirculating aquaculture system 10 comprises a plurality of tanks 88. However, any number of tanks 88 may be used without departing from the scope of the disclosure. For example, the recirculating aquaculture system 10 may comprise one, two, three, four, five, six, seven, eight, nine, ten, or more tanks 88 without departing from the scope of the disclosure. The plurality of tanks 88 are configured to hold a fluid 58 among other components including, but not limited to, aquatic animals or aquatic plants. The plurality of tanks 88 are configured to hold a fluid 58 and any other component without departing from the scope of the disclosure. In one arrangement, as one example, the plurality of tanks 88 are configured to hold a fluid 58 and fish in order to facilitate efficient fish production.

Each tank 88 utilized in the recirculating aquaculture system 10 may comprise, among other components, an inlet 90, a center drain 92, and a sidewall drain 94. Furthermore, the tanks 88 are formed of any suitable, size, shape, and design. In one arrangement, the tanks 88 are circular in shape with smooth walls and a sloping bottom in order to facilitate in waste concentrating at the bottom and exiting out the center drain 92.

Inlet

As stated above, the recirculating aquaculture system 10 comprises a plurality of tanks 88. Each tank 88 utilized in the recirculating aquaculture system 10 may comprise, among other components, an inlet 90 wherein a fluid 58/60/62 enters the tank 88. The inlet 90 may be located at any position on the outer perimeter of the tank 88 without departing from the scope of the disclosure. As previously stated, the recirculating aquaculture system 10 comprises, among other components, a fluid recirculation system 110. The inlet 90 is connected to at least one of the fluid recirculation system 110 which allows fluid 58 to flow into the tank 88. The inlet 90 may be formed of any suitable size, shape, and design. Furthermore, the inlet 90 may be formed of any material that is acceptable for entry of a fluid 58. In one arrangement, as one example, the inlet 90 is formed of a fluid recirculation system 110, a tube, a filter, a mesh filter, etc. The inlet 90 may be formed of any material without departing from the scope of the disclosure.

Center Drain

As stated above, the recirculating aquaculture system 10 comprises a plurality of tanks 88. Each tank 88 utilized in the recirculating aquaculture system 10 may comprise, among other components, a center drain 92. The center drain 92 allows fluid 58 to exit the tank 88 through the center of the tank 88. The center drain 92 may be formed of any material that is acceptable for a fluid 58 to exit a tank 88. Furthermore, the center drain 92 may be formed of any material that is acceptable for a fluid 58 to exit a tank 88. The center drain 92 may be formed of any material without departing from the scope of the disclosure.

Sidewall Drain

As stated above, the recirculating aquaculture system 10 comprises a plurality of tanks 88. Each tank 88 utilized in the recirculating aquaculture system 10 may comprise, among other components, a sidewall drain 94. The sidewall drain 94 allows fluid 58/60/62 to exit the tank 88 through the side of the tank 88. The sidewall drain 94 may be formed of any material that is acceptable for a fluid 58/60/62 to exit a tank 88. Furthermore, the sidewall drain 94 may be formed of any material that is acceptable for a fluid 58/60/62 to exit a tank 88. The sidewall drain 94 may be formed of any material without departing from the scope of the disclosure.

Radial Flow Settler

As provided above, the recirculating aquaculture system 10 comprises, among other components, at least one radial flow settler 96. The radial flow settler 96 is a passive filtration device that removes waste including, but not limited to, solid waste, from the recirculating aquaculture system 10. Any number of radial flow settlers 96 may be used in the recirculating aquaculture system 10 without departing from the scope of the disclosure. For example, the recirculating aquaculture system 10 may comprise one, two, three, four, five, six, seven, eight, nine, ten, or more radial flow settlers 96 without departing from the scope of the disclosure.

Each radial flow settler 96 utilized in the recirculating aquaculture system 10 is connected to one of the fluid recirculation systems 110 in order to filter waste from the fluid 58 utilized in the recirculating aquaculture system 10. Each radial flow settler 96 operates by utilizing gravity to move fluid 58 through the radial flow settler 96 in order to filter waste including, but not limited to, fecal matter, uneaten food, other pollutants 56, etc.

The radial flow settler 96 may be formed of any material that is acceptable for a passive filtration device. The radial flow settler 96 may be formed of any material without departing from the scope of the disclosure. Furthermore, in one arrangement, as one example, a radial flow settler 96 is located in close proximity to each tank 88 in order to filter pollutants 56 from the fluid 58 being drained from the tank 88.

Header Tank

As provided above, the recirculating aquaculture system 10 comprises, among other components, a header tank 86/98. The header tank 86/98 is a container of fluid 58 utilized to maintain the level of pressure and fluid in the reservoir or tank below. In one arrangement, the system 10 comprises a first header tank 86 and a second header tank 98. In one arrangement, the first header tank 86 is positioned above the microorganism growing apparatus 12 in order to maintain the level of pressure and fluid in the microorganism growing apparatus 12. Also, in one arrangement, the second header tank 98 is located above the plurality of tanks 88 in order to maintain the level of pressure and fluid in the tanks 88. The recirculating aquaculture system 10 may comprise any number of header tanks 86/98 without departing from the scope of the disclosure. For example, the recirculating aquaculture system 10 may comprise one, two, three, etc. header tanks 86/98 without departing from the scope of the disclosure. Furthermore, the header tank 86/98 may be formed of any material without departing from the scope of the disclosure. Additionally, the header tank 86/98 may be formed of any shape, size, or design without departing from the scope of the disclosure.

In one arrangement, as one example, fluid 58 moves from the plurality of tanks 88 to a first header tank 86 via the fluid recirculation system 110 wherein the fluid 58 moves from the first header tank 86 to the drum filter 106. Also, in one arrangement, fluid 58 moves from the low head oxygenator 100 to a second header tank 98 to the plurality of tanks 88 through the inlet 90 after having pollutants 56 removed from the fluid 58 throughout the recirculating aquaculture system 10.

Throughout the disclosure, reference to a header tank 86/98 refers to a first header tank 86 or a second header tank 98, unless the disclosure specifically states that it is referring to only a specific header tank 86/98.

Low Head Oxygenator (LHO)

As provided above, the recirculating aquaculture system 10 comprises, among other components, a low head oxygenator (LHO) 100. The LHO 100 is utilized to efficiently and simply add oxygen to fluid 58 utilized in the recirculating aquaculture system 10. Furthermore, the LHO 100 is used to remove nitrogen from the fluid 58 utilized in the recirculating aquaculture system 10. The LHO 100 may be formed of any material without departing from the scope of the disclosure. Additionally, the LHO 100 may be formed of any shape, size, or design without departing from the scope of the disclosure.

In one arrangement, as one example, the fluid 58 moves from the foam fractionator 102 to the LHO 100 in order to filter pollutants 56 from the fluid 58 utilized in the recirculating aquaculture system 10. In one arrangement, the fluid 58 moves from the LHO 100 to a second header tank 98 in order to recirculate the fluid 58 utilized in the recirculating aquaculture system 10.

Foam Fractionator

As stated above, the recirculating aquaculture system 10 comprises, among other components, a foam fractionator 102. The foam fractionator 102 is utilized to remove pollutants 56 from the fluid 58 utilized in the recirculating aquaculture system 10. The foam fractionator 102 utilizes a chemical process wherein hydrophobic molecules are separated from the fluid 58 using rising columns of foam resulting in separating pollutants 56 from the fluid 58.

The foam fractionator 102 may be formed of any material that is acceptable to remove pollutants 56 from a fluid 58 utilized in a recirculating aquaculture system 10. Additionally, the foam fractionator 102 may be formed of any shape, size, or design without departing from the scope of the disclosure.

In one arrangement, as one example, the fluid 58 moves from the sump pump 104 to the foam fractionator 102 in order to move the fluid 58 throughout the recirculating aquaculture system 10. Furthermore, in one arrangement, the fluid 58 moves from the foam fractionator 102 to the LHO 100.

Sump Pump

As provided above, the recirculating aquaculture system 10 comprises, among other components, a sump pump 104. The sump pump 104 is utilized to remove the fluid 58 from the microorganism growing apparatus 12. The sump pump 104 may be formed of any material that is acceptable to remove a fluid 58 from the microorganism growing apparatus 12. In one arrangement, as one example, the fluid 58 moves from the microorganism growing apparatus 12 to the sump pump 104 wherein the fluid 58 is transferred to the foam fractionator 102 in order to move the fluid 58 throughout the recirculating aquaculture system 10. Furthermore, the sump pump 104 may be formed of any material without departing from the scope of the disclosure. Additionally, the sump pump 104 may be formed of any shape, size, or design without departing from the scope of the disclosure.

Drum Filter

As provided above, the recirculating aquaculture system 10 comprises, among other components, a drum filter 106. The drum filter 106 consists of a drum rotating in a tub of fluid 58 and is utilized to filter pollutants 56 from the fluid 58. The drum filter 106 may be formed of any material that is acceptable to filter pollutants 56 from the fluid 58. Additionally, the drum filter 106 may be formed of any shape, size, or design without departing from the scope of the disclosure.

In one arrangement, the fluid 58 moves from a first header tank 86 to the drum filter 106. Additionally, in one arrangement, as one example, the fluid 58 moves from the drum filter 106 to the microorganism growing apparatus 12. In one arrangement, the fluid 58 moves from the drum filter 106 to the microorganism growing apparatus 12 through a waterfall 108. However, the fluid 58 may move from the drum filter 106 to the microorganism growing apparatus 12 via any means without departing from the scope of the disclosure.

Waterfall

In one arrangement, as one example, the recirculating aquaculture system 10 comprises a waterfall 108. The waterfall 108 is utilized to move the fluid 58 utilized in the recirculating aquaculture system 10 from the drum filter 106 to the microorganism growing apparatus 12 in order to filter the pollutants 56 from the fluid 58. However, any other means of moving the fluid 58 from the drum filter 106 to the microorganism growing apparatus 12 is contemplated by the disclosure including, but not limited to, a pipe, a tube, etc. The waterfall 108 is formed of any shape, size, or design without departing from the scope of the disclosure.

Fluid Recirculation System

As provided above, the recirculating aquaculture system 10 comprises, among other components, a fluid recirculation system 110. The fluid recirculation system 110 is utilized to connect the multiple components of the recirculating aquaculture system 10 to one another in order to allow the fluid 58 utilized in the recirculating aquaculture system 10 to move from one component to the next. In other words, the fluid recirculation system 110 serves as the recirculation system of the system 10. The fluid recirculation system 110 provides the system 10 with the ability to recirculate fluid 58 in order to rear aquatic animals or cultivate aquatic plants. In one embodiment, the fluid recirculation system 110 is comprised of a plurality of pipes. However, the fluid recirculation system 110 may be comprised of any system or apparatus that provides for the exchange or recirculation of fluid without departing from the disclosure. Throughout the disclosure, the fluid recirculation system 110 may be referred to as "a fluid exchange system" 110, "a plurality of pipes" 110, "pipes" 110, or "a recirculation system" 110 without departing from the scope of the disclosure. In one arrangement, as one example, the fluid 58 utilized in the recirculating aquaculture system 10 moves from a tank 88 to the center drain 92 or the sidewall drain 94 to a first header tank 86 through a fluid recirculation system 110, then the fluid 58 moves to the first header tank 86 to the drum filter 106 through a fluid recirculation systems 110.

The fluid recirculation system 110 may be formed of any material that is acceptable to transfer a fluid 58 from one component of the recirculating aquaculture system 10 to another component. In one arrangement, the fluid recirculation system 110 is formed of metal. Additionally, the fluid recirculation system 110 may be formed of any shape, size, or design without departing from the scope of the disclosure.

Water Chiller

In one arrangement, as one example, the recirculating aquaculture system 10 comprises at least one water chiller 112. The at least one water chiller 112 is utilized to chill the fluid 58/60/62 utilized in the recirculating aquaculture system 10. The at least one water chiller 112 may be formed of any shape, size, or design without departing from the scope of the disclosure.

Solids Collection Tank

In one arrangement, as one example, the recirculating aquaculture system 10 comprises at least one solids collection tank 114. The at least one solids collection tank 114 is utilized to collect solids, wastes, debris, and the like in order to prevent the solids, waste, and debris from being circulated throughout the recirculating aquaculture system 10. The at least one solids collection tank 114 may be formed of any shape, size, or design without departing from the scope of the disclosure.

Targeted Pollutant Release in Microorganisms System

In the arrangement shown, as one example, the recirculating aquaculture system 10 utilizes a microorganism growing apparatus 12 wherein microorganisms 84 such as bacteria, algae 52, and the like are used to remove a pollutant 56 from a fluid 58. In one arrangement, as shown, the system 10 comprises a microorganism growing apparatus 12, microorganisms 84, and a first fluid 58 (or simply "a fluid" 58) wherein the microorganisms 84 remove a pollutant 56 from the fluid 58.

In one arrangement, as one example, the system 10 comprises a microorganism growing apparatus 12 wherein the microorganism growing apparatus comprises the steps of: providing a microorganism growing apparatus 12 having a first reservoir 42 and a second reservoir 44; filling the first reservoir 42 with a first fluid 58 that contains a pollutant 56; controlling the first fluid 58 within the first reservoir 42 to have a first condition 64; filling the second reservoir 44 with a second fluid 60; controlling the second fluid 60 within the second reservoir 44 to have a second condition 66; growing microorganisms 84 using the microorganism growing apparatus 12; exposing the microorganisms 84 to the first fluid 58 within the first reservoir 42 wherein the microorganisms 84 are exposed to the first condition 64 and the microorganisms 84 uptake the pollutant 56 from the first fluid 58; exposing the microorganisms 84 to light 50 and air 48; and exposing the microorganisms 84 to the second fluid 60 within the second reservoir 44 wherein the microorganisms 84 are exposed to the second condition 66 and the microorganisms 84 are stimulated to release the pollutant 56. Furthermore, this arrangement of the system 10 may also comprise the steps of: providing a third reservoir 46; filing the third reservoir 46 with a third fluid 62; controlling the third fluid 62 within the third reservoir 46 to have a third condition 68; and submerging a portion of the microorganisms 84 within the third fluid 62 of the third reservoir 46 thereby exposing this portion of the microorganisms 84 to the third condition 68. Any number of reservoirs 42/44/46 is hereby contemplated for use.

In another arrangement, the system 10 comprises a microorganism growing apparatus 12 wherein the microorganism growing apparatus 12 comprises the steps of: providing a microorganism growing apparatus 12 having a first reservoir 42, a second reservoir 44, and at least one moving belt 36; filling the first reservoir 42 with a first fluid 58 that has a high concentration of the pollutant 56; controlling the first fluid 58 within the first reservoir 42 to have a first condition 64; filling the second reservoir 44 with a second fluid 60; controlling the second fluid 60 within the second reservoir 44 to have a second condition 66; moving the at least one belt 36 between a first submerged position 70, wherein a portion of the at least one belt 36 is submerged within the first fluid 58 held within the first reservoir 42, and an exposed position 76, wherein a portion of the at least one belt 36 is not submerged within the first fluid 58 held within the first reservoir 42; moving the portion of the at least one belt 36 to the exposed position wherein this portion of the at least one belt 36 is exposed to air 48 and light 50; growing microorganisms 84 on the at least one belt 36 as the at least one belt 36 moves through the microorganism growing apparatus 12, wherein the microorganisms 84 consume the pollutant 56 from the first fluid 58 held within the first reservoir 42 during the growing process; moving the at least one belt 36 to a second submerged position 72, wherein a portion of the at least one belt 36 is submerged within the second fluid 60 of the second reservoir 44 thereby exposing this portion of the at least one belt 36 to the second condition 66 thereby stimulating the microorganisms 84 contained on this portion of the belt 36 to release the pollutant 56. Additionally, this arrangement of the system 10 may further comprise the steps of: providing a third reservoir 46; filling the third reservoir 46 with a third fluid 62; controlling the third fluid 62 within the third reservoir 46 to have a third condition 68; and submerging a portion of the microorganisms 84 within the third fluid 62 of the third reservoir 46 thereby exposing this portion of the microorganisms 84 to the third condition 68.

In one arrangement, as one example, the system 10 comprises a microorganism growing apparatus 12 wherein the microorganism growing apparatus 12 comprises the steps of: providing microorganism growing apparatus 12 having a first reservoir 42 and a second reservoir 44; filling the first reservoir 42 with a first fluid 58 that contains a pollutant 56; controlling the first fluid 58 within the first reservoir 42 to have a first condition 64; filing the second reservoir 44 with a second fluid 60; controlling the second fluid 60 within the second reservoir 44 to have a second condition 66; growing an algae biofilm 54 using the microorganism growing apparatus 12; moving the algae biofilm 54 to a first submerged position 70 such that a portion of the algae biofilm 54 is submerged within the first fluid 58 held within the first reservoir 42 exposing the algae biofilm 54 to the first condition 64 wherein the algae 52 uptakes the pollutant 56 from the first fluid 58 held within the first reservoir 42; moving the algae biofilm 54 such that it is exposed to air 48 and light 50; following the uptake of the pollutant 56, moving the algae biofilm 54 to a second submerged position 72 such that a portion of the algae biofilm 54 is submerged within the second fluid 60 held within the second reservoir 44 exposing the algae biofilm 54 to the second condition 66 and stimulating the algae biofilm 54 to release the pollutant 56. Furthermore, this arrangement of the system 10 may also comprise the steps of: providing a third reservoir 46; filling the third reservoir 46 with a third fluid 62; controlling the third fluid 62 within the third reservoir 46 to have a third condition 68; and moving the algae biofilm 54 to a third submerged position 74 such that a portion of the algae biofilm 54 is submerged within the third fluid 62 of the third reservoir 46 thereby exposing this portion of the algae biofilm 54 to the third condition 68.

In another arrangement, the system 10 comprises a microorganism growing apparatus 12 wherein the microorganism growing apparatus 12 comprises the steps of: providing a microorganism growing apparatus 12 having a first reservoir 42, a second reservoir 44, and at least one moving belt 36; filling the first reservoir 42 with a first fluid 58 that has a high concentration of the pollutant 56; controlling the first fluid 58 within the first reservoir 42 to have a first condition 64; filling the second reservoir 44 with a second fluid 60; controlling the second fluid 60 within the second reservoir 44 to have a second condition 66; moving the at least one belt 36 between a first submerged position 70, wherein a portion of the at least one belt 36 is submerged within the first fluid 58 held within the first reservoir 42, and an exposed position 76, wherein a portion of the at least one belt 36 is not submerged within the first fluid 58 held within the first reservoir 42; moving the portion of the at least one belt 36 to the exposed position wherein this portion of the at least one belt 36 is exposed to air 48 and light 50; growing an algae biofilm 54 on the at least one belt 36 as the at least one belt 36 moves through the microorganism growing apparatus 12, wherein the algae 52 consumes the pollutant 56 from the first fluid 58 held within the first reservoir 42 during the growing process; moving the at least one belt 36 to a second submerged position 72, wherein a portion of the at least one belt 36 is submerged within the second fluid 60 of the second reservoir 44 thereby exposing this portion of the at least one belt 36 to the second condition 66 thereby stimulating the algae 52 contained on this portion of the belt 36 to release the pollutant 56. Additionally, this arrangement of the system 10 may further comprise the steps of: providing a third reservoir 46; filling the third reservoir 46 with a third fluid 62; controlling the third fluid 62 within the third reservoir 46 to have a third condition 68; and submerging a portion of the algae biofilm 54 within the third fluid 62 of the third reservoir 46 thereby exposing this portion of the algae biofilm 54 to the third condition 68.

Microorganisms

The system 10 comprises a microorganism growing apparatus 12 which is capable of using microorganisms 84 to remove a pollutant 56 from a fluid 58. Any type of microorganism 84 may be utilized in the microorganism growing apparatus 12 without departing from the scope of the disclosure. In one arrangement, as one example, the microorganisms 84 may be bacteria or algae 52. Additionally, in one arrangement, the microorganisms 84 may be fungi. Furthermore, in one arrangement, as one example, biofilm based microorganisms 54 ("a microorganism biofilm" 54) may be utilized. A microorganism biofilm 54 may also be referred to as a "microbial biofilm", a "harvestable microbial biofilm", or a "biofilm" without departing from the scope of the disclosure. Alternatively, in another arrangement, as an example, suspended microorganism systems may be utilized without departing from the scope of the disclosure.

In one arrangement, as one example, the microorganism growing apparatus 12 uses microorganisms 84 to remove a pollutant 56 from a fluid 58 by the microorganism growing apparatus 12 having a first reservoir 42 and a second reservoir 44, filling the first reservoir 42 with a first fluid 58 that contains a pollutant 56, controlling the first fluid 58 within the first reservoir 42 to have a first condition 64, filling the second reservoir 44 with a second fluid 60, controlling the second fluid 60 within the second reservoir 44 to have a second condition 66, growing the microorganisms 84 using the microorganism growing apparatus 12, exposing the microorganisms 84 to the first fluid 58 within the first reservoir 42 wherein the microorganisms 84 is exposed to the first condition 64 and the microorganisms 84 uptakes the pollutant 56 from the first fluid 58, exposing the microorganisms 84 to light 50 and air 48, and exposing the microorganisms 84 to the second fluid 60 within the second reservoir 44 wherein the microorganisms 84 is exposed to the second condition 66 and the microorganisms 84 is stimulated to release the pollutant 56.

Algae

The microorganism growing apparatus 12 is capable of using algae 52 as the microorganism 84 to remove a pollutant 56 from a fluid 58 by having a first reservoir 42 and a second reservoir 44, filling the first reservoir 42 with a first fluid 58 that contains a pollutant 56, controlling the first fluid 58 within the first reservoir 42 to have a first condition 64, filling the second reservoir 44 with a second fluid 60, controlling the second fluid 60 within the second reservoir 44 to have a second condition 66, growing algae 52 using the microorganism growing apparatus 12, exposing the algae 52 to the first fluid 58 within the first reservoir 42 wherein the algae 52 is exposed to the first condition 64 and the algae 52 uptakes the pollutant 56 from the first fluid 58, exposing the algae 52 to light 50 and air 48, and exposing the algae 52 to the second fluid 60 within the second reservoir 44 wherein the algae 52 is exposed to the second condition 66 and the algae 52 is stimulated to release the pollutant 56.

Any species or type of algae 52 may be utilized in the system 10 without departing from the scope of the disclosure. In one arrangement, as one example, the algae 52 may be *Chlorella* algae 78 or *Spirulina* algae 80. Additionally, in one arrangement, the algae 52 may be of the type regarded as Generally Regarded As Safe.

As stated above, any type of algae 52 may be utilized in the microorganism growing apparatus 12. In one arrangement, as one example, biofilm based algae 54 ("an algae biofilm" 54) may be utilized. Alternatively, in another arrangement, as one example, suspended algal culture systems may also be utilized without departing from the scope of the disclosure.

In one arrangement, as one example, the algae 52 contains extracellular polymeric substances which enhance absorption of pollutants 56, including, but not limited to, phosphorous, by the algae 52. Additionally, in one arrangement, the algae 52 contains extracellular polymeric substances which protect the algae 52 from toxic effects of high concentrations of pollutants 56, such as phosphorous.

Pollutant

The system 10 provides a method of using microorganisms 84 to remove a pollutant 56 from a fluid 58. The pollutant 56 may be in any form without departing from the scope of the disclosure. In one arrangement, as one example, the pollutant 56 may be dissolved within the fluid 58. Any type of pollutant 56 may be removed from the fluid 58 without departing from the scope of the disclosure. In one arrangement, as one example, the pollutant 56 is Nitrogen (N), Phosphorous (P), Potassium (K), Carbon (C), ammonia ($NH_3$), carbon dioxide ($CO_2$), toxic metals, salts, pharmaceuticals, and/or hormones. Furthermore, any number of pollutants 56 may be within the fluid 58. For example, the fluid 58 may comprise one pollutant 56, two pollutants 56, three pollutants 56, etc. without departing from the scope of the disclosure. In other words, the fluid 58 may comprise multiple types of pollutants 56 without departing from the scope of the disclosure. In one arrangement, as one example, the fluid 58 may comprise all or some of the following types of pollutants: Nitrogen (N), Phosphorous (P), Potassium (K), Carbon (C), ammonia ($NH_3$), carbon dioxide ($CO_2$), toxic metals, salts, pharmaceuticals, and/or hormones.

In one arrangement, as one example, the system 10 comprises a microorganism growing apparatus 12 which provides a method of using microorganisms 84 to remove a pollutant 56 from a fluid 58, the steps comprising: providing a microorganism growing apparatus 12 having a first reservoir 42 and a second reservoir 44, filling the first reservoir 42 with a first fluid 58 that contains a pollutant 56, controlling the first fluid 58 within the first reservoir 42 to have a first condition 64, filling the second reservoir 44 with a second fluid 60, controlling the second fluid 60 within the second reservoir 44 to have a second condition 66, growing microorganisms 84 using the microorganism growing apparatus 12, exposing the microorganisms 84 to the first fluid 58 within the first reservoir 42 wherein the microorganisms 84 is exposed to the first condition 64 and the microorganisms 84 uptakes the pollutant 56 from the first fluid 58, exposing the microorganisms 84 to light 50 and air 48, and exposing the microorganisms 84 to the second fluid 60 within the second reservoir 44 wherein the microorganisms 84 is exposed to the second condition 66 and the microorganisms 84 is stimulated to release the pollutant 56.

Microorganism Growing Apparatus

As provided above, system 10 may utilize a microorganism growing apparatus 12. Microorganism growing apparatus 12 is formed of any suitable size, shape, and design and is configured to grow any type of microorganism 84 including, but not limited to, algae 52. The microorganism growing apparatus 12 is configured to grow microorganisms 84 in any form without departing from the scope of the disclosure. In one arrangement, as one example, the microorganism growing apparatus 12 is configured to grow algae 52 in a biofilm 54. In one arrangement, as one example, the microorganism growing apparatus 12 is configured to grow algae 52 in a biofilm 54 wherein the algae biofilm 54 is grown on the at least one moving belt 36. In the arrangement shown, as one example, for purposes of clarity, the microorganism growing apparatus 12 has a front 14, a back 16, opposing sides 18, a top 20, and a bottom 22. In the arrangement shown, as one example, the microorganism growing apparatus 12 is symmetrical, or generally symmetrical, or operatively symmetrical, and for this reason, unless specified otherwise, description of one side 18 of the microorganism growing apparatus 12 shall apply to both sides 18 of the microorganism growing apparatus 12 which is separated by an imaginary centerline that extends down the approximate top-to-bottom center of the microorganism growing apparatus 12. Further description of a microorganism growing apparatus can be found in U.S. Pat. No. 9,932,549, which is hereby incorporated by reference in its entirety.

In the arrangement shown, as one example, the microorganism growing apparatus 12 is formed of a frame 24, a motor 26, at least one drive shaft 28, a gear system 30, a plurality of rollers 32, a mechanized harvesting system 34, which comprises at least one moving belt 36, a harvesting blade 38, a harvesting reservoir 40. Also, the microorganism growing apparatus 12 is formed of a first reservoir 42, a first fluid 58, a CO2-rich gaseous phase 48 (also referred to as "air" throughout the disclosure), and light 50 (also referred to as a "sunlight capture" part throughout the disclosure). Furthermore, the microorganism growing apparatus 12 may also include additional components, such as, a pump 82. Any type or form of microorganism growing apparatus 12 may be utilized in the system 10, including, but not limited to, horizontal stationary sheets with microorganisms 84 growing on the surface, vertical stationary sheets with microorganisms 84 growing on the surface, rotating drums with microorganisms 84 growing on the surface, small floating beads and/or solid media with microorganisms 84 growing on their surface without departing from the scope of the disclosure.

In one arrangement, as shown, the microorganism growing apparatus 12 comprises a plurality of reservoirs 42/44/46. For example, in one arrangement, the microorganism growing apparatus 12 comprises a first reservoir 42 and a second reservoir 44. In another arrangement, as shown, the microorganism growing apparatus 12 comprises a first reservoir 42, a second reservoir 44, and a third reservoir 46. Any type or form of reservoirs 42/44/46 may be utilized in the microorganism growing apparatus 12 without departing from the scope of the disclosure. Any number of reservoirs 42/44/46 may be utilized in the microorganism growing apparatus 12 without departing from the scope of the disclosure.

Frame

As provided above, the microorganism growing apparatus 12 comprises a frame 24, among other components. Frame 24 is formed of any suitable size, shape, and design and is configured to support the microorganism growing apparatus 12 and allow the microorganism growing apparatus 12 to remain in an upright position in order to operate. In one arrangement, frame 24 is square or rectangular in shape. However, any other shape or configuration is hereby contemplated for use. The frame 24 may be configured to be any size without departing from the disclosure. The frame 24 may be manufactured to be small enough to fit on a shelf for research purposes and the like or large enough to serve a large metropolitan city. Furthermore, frame 24 may be formed of any material including, but not limited to, plastic, metal, non-metal material, and PVC.

Frame 24 provides the structure of the microorganism growing apparatus 12. In one arrangement, as shown, the at least one moving belt 36 is supported by frame 24. In one arrangement, the at least one drive shaft 28 is coupled with the frame 24 wherein the at least one drive shaft 28 supports and actuates the at least one moving belt 36. In one arrangement, as one example, the microorganism growing apparatus 12 comprises a gear system 30 wherein the gear system 30 is coupled with the at least one drive shaft 28, a plurality of rollers 32 wherein the plurality of rollers 32 is coupled with the frame 24 which guides the at least one moving belt 36.

Reservoir

As stated above, the microorganism growing apparatus 12 comprises at least one reservoir 42/44/46, among other components. Reservoir 42/44/46 is formed of any suitable size, shape, and design and is configured to support the microorganism growing apparatus 12 and contain a fluid 58/60/62. In one arrangement, as one example, reservoir 42/44/46 is circular, square, or rectangular in shape. However, any other shape or configuration is hereby contemplated for use. Furthermore, the reservoir 42/44/46, and the microorganism growing apparatus 12, may be any size without departing from the disclosure. The reservoir 42/44/46, and the microorganism growing apparatus 12, may be manufactured to be small enough to fit on a shelf for research purposes and the like, or large enough to efficiently and effectively serve a large metropolitan city. Reservoir 42/44/46 may be formed of any type of reservoir 42/44/46 configured to contain fluid 58/60/62 including, but not limited to, a trough system.

In one arrangement, as shown the microorganism growing apparatus 12 comprises a first reservoir 42, among other components. In another arrangement, as shown, the microorganism growing apparatus 12 comprises a first reservoir 42 and a second reservoir 44, among other components. In another arrangement, as shown, the microorganism growing apparatus 12 comprises a first reservoir 42, a second reservoir 44, and a third reservoir 46. Any number of reservoirs 42/44/46 may be utilized by the microorganism growing apparatus 12 without departing from the scope of the disclosure. For example, the microorganism growing apparatus 12 may comprise one, two, three, four, five, six, seven, eight, nine, ten, or more reservoirs 42/44/46 without departing from the scope of the disclosure. Throughout the disclosure, reference to a reservoir 42/44/46 refers to a first reservoir 42, a second reservoir 44, or a third reservoir 46; unless the disclosure specifically states that it is referring to only one of the reservoirs 42/44/46.

In one arrangement, as one example, the system 10 comprises a microorganism growing apparatus 12 having a first reservoir 42 and a second reservoir 44 wherein the first reservoir 42 is filled with a first fluid 58 that contains a pollutant 56, the first fluid 58 is controlled to have a first condition 64, the second reservoir 44 is filled with a second fluid 60, the second fluid 60 is controlled to have a second condition 66, microorganisms 84 are grown using the microorganism growing apparatus 12, the microorganisms 84 are exposed to the first fluid 58 wherein the microorganisms 84 are exposed to the first condition 64 and the microorganisms 84 uptake the pollutant 56 from the first fluid 58, the microorganisms 84 are exposed to light 50 and air 48 and the microorganisms 84 are exposed to the second fluid 60 wherein the microorganisms 84 are exposed to the second condition 66 and the microorganisms 84 are stimulated to release the pollutant 56.

In another arrangement, for example, the system 10 comprises a microorganism growing apparatus 12 having a first reservoir 42 and a second reservoir 44 wherein the first reservoir 42 is filled with a first fluid 58 that contains a pollutant 56, the first fluid 58 is controlled to have a first condition 64, the second reservoir 44 is filled with a second fluid 60, the second fluid 60 is controlled to have a second condition 66, microorganisms 84 are grown using the microorganism growing apparatus 12, the microorganisms 84 are exposed to the first fluid 58 wherein the microorganisms 84 are exposed to the first condition 64 and the microorganisms 84 uptake the pollutant 56 from the first fluid 58, the microorganisms 84 are exposed to light 50 and air 48 and the microorganisms 84 are exposed to the second fluid 60 wherein the microorganisms 84 are exposed to the second condition 66 and the microorganisms 84 are stimulated to release the pollutant 56.

Furthermore, in an alternative arrangement, the system 10 comprises a microorganism growing apparatus 12 having a first reservoir 42 and a second reservoir 44 wherein the first reservoir 42 is filled with a first fluid 58 that contains a pollutant 56, the first fluid 58 is controlled to have a first condition 64, the second reservoir 44 is filled with a second fluid 60, the second fluid 60 is controlled to have a second condition 66, algae 52 is grown using the microorganism growing apparatus 12, the algae 52 is exposed to the first fluid 58 wherein the algae 52 is exposed to the first condition 64 and the algae 52 uptakes the pollutant 56 from the first fluid 58, the algae 52 is exposed to light 50 and air 48 and the algae 52 is exposed to the second fluid 60 wherein the algae 52 is exposed to the second condition 66 and the algae 52 is stimulated to release the pollutant 56, then a third reservoir 46 is provided, the third reservoir 46 is filled with a third fluid 62, the third fluid 62 is controlled within the third reservoir 46 to have a third condition 68, and a portion of the algae biofilm 54 is submerged within the third fluid 62 of the third reservoir 46 thereby exposing this portion of the algae biofilm 54 to the third condition 68 in order to stimulate the algae 52 to release the pollutant 56.

In one arrangement, as shown, the first reservoir 42 is located at the bottom 22 of the microorganism growing apparatus 12. The first reservoir 42 is designed to contain or hold the first fluid 58 which contains a pollutant 56. In one arrangement, as one example, the at least one moving belt 36 is moved through the microorganism growing apparatus 12 wherein a portion of the at least one moving belt 36 is in a first submerged position 70 wherein a portion of the at least one moving belt 36 is submerged within the first fluid 58 held within the first reservoir 42 and the microorganisms 84 on the at least one moving belt 36 are exposed to a first condition 64 within the first fluid 58 wherein the microorganisms 84 uptake the pollutant 56 from the first fluid 58. Then the at least one moving belt 36 transitions to an exposed position 76 wherein a portion of the at least one moving belt 36 is not submerged within the first fluid 58 held within the first reservoir 42, but is exposed to air 48 and light 50.

In another arrangement, as shown, the microorganism growing apparatus 12 comprises a first reservoir 42 and a second reservoir 44 wherein the first reservoir 42 is located at the bottom 22 of the microorganism growing apparatus 12 and the first reservoir 42 is designed to contain or hold the first fluid 58. Additionally, the second reservoir 44 is located within or near the first reservoir 42 and the second reservoir 44 is designed to contain or hold the second fluid 60. In this arrangement, as one example, the at least one moving belt 36 is moved through the microorganism growing apparatus 12 wherein a portion of the at least one moving belt 36 is in a first submerged position 70 wherein the at least one moving belt 36 is submerged within the first fluid 58 held within the first reservoir 42, then to an exposed position 76 wherein a portion of the at least one moving belt 36 is not submerged within the first fluid 58 held within the first reservoir 42, but is exposed to air 48 and light 50. Then the at least one moving belt 36 is in a second submerged position 72 wherein the at least one moving belt 36 is submerged within the second fluid 60 held within the second reservoir 44 wherein the microorganisms 84 are exposed to a second condition 66 within the second fluid 60 and the microorganisms 84 are stimulated to release a pollutant 56.

In one arrangement, as another example, the microorganism growing apparatus 12 comprises a first reservoir 42, a second reservoir 44, and a third reservoir 46 wherein the first reservoir 42 is located at the bottom 22 of the microorganism growing apparatus 12 and the first reservoir 42 is designed to contain or hold the first fluid 58 which contains a pollutant 56. Additionally, the second reservoir 44 and the third reservoir 46 are located within or near the first reservoir 42 and the second reservoir 44 is designed to contain or hold the second fluid 60 and the third reservoir 46 is designed to contain or hold the third fluid 62. In this arrangement, as one example, the at least one moving belt 36 is moved through the microorganism growing apparatus 12 wherein a portion of the at least one moving belt 36 is in a first submerged position 70 wherein the at least one moving belt 36 is submerged within the first fluid 58 held within the first reservoir 42 and the microorganisms 84 on the at least one moving belt 36 are exposed to a first condition 64 wherein the microorganisms 84 uptake the pollutant 56 from the first fluid 58, then to an exposed position 76 wherein a portion of the at least one moving belt 36 is not submerged within the first fluid 58 held within the first reservoir 42, but is exposed to air 48 and light 50. Then, the at least one moving belt 36 is in a second submerged position 72 wherein a portion of the at least one moving belt 36 is submerged within the second fluid 60 held within the second reservoir 44 wherein the microorganisms 84 on the at least one moving belt 36 are exposed to a second condition 66 within the second fluid 60 and the microorganisms 84 are stimulated to release the pollutant 56. Furthermore, the at least one moving belt 36 is in a third submerged position 74 wherein a portion of the at least one moving belt 36 is submerged within the third fluid 62 held within the third reservoir 46 wherein the microorganisms 84 on the at least one moving belt 36 are exposed to a third condition 68 within the third fluid 62 and the microorganisms 84 are stimulated to release the pollutant 56.

In one arrangement, as one example, reservoir 42/44/46 may also include a pump 82 which is configured to circulate fluid 58/60/62 within reservoir 42/44/46. The circulation of the fluid 58/60/62 within reservoir 42/44/46 may improve the growth of the microorganisms 84 and the efficiency of the system 10. As described in more detail below, pump 82 may be any type of pump 82 such as a paddlewheel.

Additionally, it is important to note, while the microorganism growing apparatus 12 may comprise any number of reservoirs 42/44/46, the at least one moving belt 36 is not required to be submerged within each reservoir 42/44/46. For example, in one arrangement, the microorganism growing apparatus 12 comprises a first reservoir 42, a second reservoir 44, and a third reservoir 46 wherein the first reservoir 42 is located at the bottom 22 of the microorganism growing apparatus 12 and the first reservoir 42 is designed to contain or hold the first fluid 58 which contains a pollutant 56. Additionally, the second reservoir 44 and the third reservoir 46 are located within or near the first reservoir 42 and the second reservoir 44 is designed to contain or hold the second fluid 60 and the third reservoir 46 is designed to contain or hold the third fluid 62. In this arrangement, as one example, the at least one moving belt 36 is moved through the microorganism growing apparatus 12 wherein a portion of the at least one moving belt 36 is in a first submerged position 70 wherein the at least one moving belt 36 is submerged within the first fluid 58 held within the first reservoir 42 and the microorganisms 84 on the at least one moving belt 36 is exposed to a first condition 64 wherein the microorganisms 84 uptake the pollutant 56 from the first fluid 58, then to an exposed position 76 wherein a portion of the at least one moving belt 36 is not submerged within the first fluid 58 held within the first reservoir 42, but is exposed to air 48 and light 50. Then, the at least one moving belt 36 skips over the second reservoir 44 bypassing the second submerged position 72 wherein the at least one moving belt 36 is not submerged within the second fluid 60. Instead, the at least one moving belt 36 moves to a third submerged position 74 wherein a portion of the at least one moving belt 36 is submerged within the third fluid 62 held within the third reservoir 46 wherein the algae 52 on the at least one moving belt 36 is exposed to a third condition 68 within the third fluid 62 and the microorganisms 84 are stimulated to release the pollutant 56.

Motor

Motor 26 is formed of any suitable size, shape, and design. Motor 26 is any form of a motor that converts electrical energy to mechanical energy and provides rotation and torque. In one arrangement, as one example, the motor 26 can include a gear system 30 that is capable of driving the at least one drive shaft 28 wherein the at least one drive shaft 28 rotates the at least one moving belt 36. The rotating of the at least one moving belt 36 allows the at least one moving belt 36 to be in a submerged position 70/72/74 wherein a portion of the at least one moving belt 36 is submerged within the fluid 58/60/62 held within the reservoir 42/44/46, and an exposed position 76 wherein a portion of the at least one moving belt 36 is not submerged within the fluid 58/60/62 held within the reservoir 42/44/46.

Drive Shaft

The microorganism growing apparatus 12 comprises at least one drive shaft 28 which is formed of any suitable size, shape, and design. In one arrangement, as one example, the at least one drive shaft 28 extends from one side 18 of the microorganism growing apparatus 12 to the opposing side 18 wherein the at least one moving belt 36 is placed over the at least one drive shaft 28 allowing for the at least one drive shaft 28 to rotate and move the at least one moving belt 36 causing the at least one moving belt 36 to move between a submerged position 70/72/74 wherein a portion of the at least one moving belt 36 is submerged within the fluid 58/60/62 held within the reservoir 42/44/46, and an exposed position 76 wherein a portion of the at least one moving belt 36 is not submerged within the fluid 58/60/62 held within the reservoir 42/44/46.

Gear System

The microorganism growing apparatus 12 comprises a gear system 30, in addition to other components. In one arrangement, as one example, the gear system 30 may be a plurality of gear systems 30. Any number of gear systems 30 may be used without departing from the scope of the disclosure. For example, the microorganism growing apparatus 12 may comprise one, two, three, four, five, six, seven, eight, nine, ten, or more gear systems 30 without departing from the scope of the disclosure. Furthermore, the gear system 30 is formed of any suitable size, shape, and design.

The gear system 30 may be comprised of any form of a gear system 30 including, but not limited to, a pulley system, that is configured to direct power to the microorganism growing apparatus 12. The gear system 30 is configured to drive the at least one drive shaft 28 wherein the at least one drive shaft 28 rotates the at least one moving belt 36. The rotating of the at least one moving belt 36 allows the at least one moving belt 36 to be in a submerged position 70/72/74 wherein a portion of the at least one moving belt 36 is submerged within the fluid 58/60/62 held within the reservoir 42/44/46, and an exposed position 76 wherein a portion of the at least one moving belt 36 is not submerged within the fluid 58/60/62 held within the reservoir 42/44/46.

Rollers

The microorganism growing apparatus 12 may comprise, in addition to other components, a plurality of rollers 32. The plurality of rollers 32 is formed of any suitable size, shape, and design. In one arrangement, as one example, the plurality of rollers 32 are cylindrical in shape. However, any other shape or configuration is hereby contemplated for use. Additionally, in one arrangement, as an example, one, two, three, four, five, or more rollers 32 may be used. Any number of rollers 32 may be used without departing from the scope of the disclosure.

The plurality of rollers 32 is formed of any suitable size, shape, and design and is configured to provide guidance, direction, and support to the at least one moving belt 32 as the at least one moving belt 36 moves through the microorganism growing apparatus 12.

Pump

The microorganism growing apparatus 12 may comprise, in addition to other components, a pump 82. The pump 82 is formed of any suitable size, shape, and design. Pump 82 may be formed of any size without departing from the disclosure.

Pump 82 is configured to circulate fluid 58 within the first reservoir 42 which may improve the growth of algae 52 and the efficiency of the microorganism growing apparatus 12. Pump 82 can be any type of pump 82 including, but not limited to, an electric pump, a wheel, a paddlewheel or any other type of pump 82 that is configured to circulate fluid 58.

Mechanized Harvesting System

The microorganism growing apparatus 12 may comprise, in addition to other components, a mechanized harvesting system 34. The mechanized harvesting system 34 is formed of any suitable size, shape, and design. The mechanized harvesting system 34 comprises at least one moving belt 36, a harvesting blade 38, and a harvesting reservoir 40. The mechanized harvesting system 34 may be triangular in shape in order to efficiently move the at least one belt 36 through the microorganism growing apparatus 12 wherein the at least moving belt 36 is transitioned between a first submerged position 70, wherein a portion of the at least one moving belt 36 is submerged within the first fluid 58 held within the first reservoir 42, and an exposed position 76, wherein a portion of the at least one moving belt 36 is not submerged within the first fluid 58 held within the first reservoir 42. As a result, the portion of the at least one moving belt 36 that is not submerged within the first fluid 58 held within the first reservoir 42 is exposed to air (a $CO_2$-rich gaseous phase) 48 and light 50 (a "sunlight capture" part of the microorganism growing apparatus 12).

Belt

As provided above, the microorganism growing apparatus 12 may comprise, among other components, a mechanized harvesting system 34. The mechanized harvesting system 34 comprises at least one moving belt 36, among other components. The at least one moving belt 36 is formed of any suitable size, shape, and design. The at least one moving belt 36 may be formed of any material without departing from the scope of the disclosure. The at least one belt 36 may be formed of any type of material, including, but not limited to, plastic, metal, non-metal materials, rubber, polyvinyl chloride (PVC), or any other type of material. Furthermore, the at least one moving belt 36 may be referred to as a belt 36, at least one moving belt 36, at least one belt 36, etc. without departing from the disclosure.

In one arrangement, as one example, the at least one belt 36 is controlled by the motor 26, the gear system 30 and the at least one drive shaft 28 wherein the at least one drive shaft 28 rotates the at least one moving belt 36. The rotation of the at least one moving belt 36 allows the at least one moving belt 36 to move through the microorganism growing apparatus 12 wherein the at least one moving belt 36 is transitioned between a first submerged position 70 wherein a portion of the at least one moving belt 36 is submerged within the first fluid 58 held within the first reservoir 42, and then to an exposed position 76 wherein a portion of the at least one moving belt 36 is not submerged within the first fluid 58 held within the first reservoir 42. In another arrangement, the at least one moving belt 36 moves through the microorganism growing apparatus 12 wherein the at least one moving belt 36 is transitioned between a first submerged position 70 wherein a portion a portion of the at least one moving belt 36 is submerged within the first fluid 58 held within the first reservoir 42, then to an exposed position 76 wherein a portion of the at least one moving belt 36 is not submerged within the first fluid 58 held within the first reservoir 42, then the at least one moving belt 36 moves to a second submerged position 72 wherein a portion of the at least one moving belt 36 is submerged within the second fluid 60 held within the second reservoir 44, then the at least one moving belt 36 moves to a third submerged position 74 wherein a portion of the at least one moving belt 36 is submerged within the third fluid 62 held within the third reservoir 46.

The at least one moving belt 36 may move through the microorganism growing apparatus 12 in any type of configuration or movement without departing from the scope of the disclosure. In one arrangement, as one example, the at least one belt 36 moves through the microorganism growing apparatus 12 in a continuous manner or loop between the first submerged position 70, an exposed position 76, the second submerged position 72, an exposed position 76, and a third submerged position 74. In an alternative arrangement, the at least one belt 36 moves in a serpentine manner between a submerged position 70/72/74 and an exposed position 76. Furthermore, the at least one moving belt 36 may move through the microorganism growing apparatus 12 in any direction or configuration, including, but not limited to, horizontal, vertical, downward, upward, etc. without departing from the scope of the disclosure. In one arrangement, as shown, the at least one moving belt 36 moves through the microorganism growing apparatus 12 in a substantially vertical configuration.

Coating

As provided above, the microorganism growing apparatus 12 may comprise, among other components, a mechanized harvesting system 34. The mechanized harvesting system 34 comprises at least one moving belt 36, among other components. The at least one moving belt 36 may comprise a coating on the at least one moving belt 36 that is capable of binding pollutants 56. The coating may be comprised of any type of material, including, but not limited to, coatings that create temporary ionic, covalent, polar, or hydrogen bonds with a pollutant, or any other type of material. Furthermore, any amount of the coating may be utilized on the at least one moving belt 36 without departing from the disclosure.

In one arrangement, as one example, the at least one moving belt 36 comprises a coating that is capable of binding pollutants 56 as the at least one moving belt 36 cycles through the microorganism growing apparatus 12. In this arrangement, the at least one moving belt 36 moves to a first submerged position 70 wherein a portion of the at least one moving belt 36 is submerged within the first fluid 58 held within the first reservoir 42 exposing the coating to be exposed to the first condition 64 and causing the coating to uptake the pollutants 56; then the at least one moving belt 36 moves to a second submerged position 72 wherein a portion of the at least one moving belt 36 is submerged within the second fluid 60 held within the second reservoir 44 exposing the coating to the second condition 66 and causing the coating to release the pollutants 56.

Harvesting Blade

As the at least one moving belt 36 moves through the microorganism growing apparatus 12, microorganisms 84 grow on the at least one moving belt 36. The microorganisms 84 that are produced must be harvested or removed from the at least one moving belt 36. The microorganisms 84 may be removed from the at least one moving belt 36 by utilizing any method without departing from the scope of the disclosure. In one arrangement, as one example, the microorganisms 84 may be removed from the at least one moving belt 36 by spraying, scraping, vibration, use of a pneumatic tool or apparatus, a pneumatic process, and the like. One method of harvesting the microorganisms 84 that are produced is to scrape the microorganisms 84 off of the at least one moving belt 36. In one arrangement, the system 10 comprises the step of harvesting the microorganisms 84 by positioning a harvesting blade 38 along the at least one moving belt 36 in order to scrape the microorganisms 84 off of the at least one moving belt 36. Therefore, the mechanized harvesting system 34 comprises a harvesting blade 38.

In one arrangement, as one example, as the at least one moving belt 36 moves through the microorganism growing apparatus 12, algae 52 grows in a biofilm 54 which forms on the at least one moving belt 36. The algae 52 that is produced must be harvested or removed from the at least one moving belt 36. The algae 52 may be harvested or removed from the at least one moving belt 36 by utilizing any method without departing from the scope of the disclosure. One method of harvesting the algae 52 that is produced is to scrape the algae 52 off of the at least one moving belt 36. In one arrangement, the system 10 comprises the step of harvesting the algae 52 by positioning a harvesting blade 38 along the at least one moving belt 36 in order to scrape the algae 52 off of the at least one moving belt 36.

The harvesting blade 38 is formed of any suitable size, shape, and design. The harvesting blade 38 may be formed of any material that is suitable for harvesting or removing microorganisms 84 from the at least one moving belt 36, such as a squeegee, a piece of plastic, a piece of rubber, a piece of metal, or the like. The harvesting blade 38 may be formed of any material without departing from the scope of the disclosure.

Harvesting Reservoir

As stated above, the microorganism growing apparatus 12 may comprise, in addition to other components, a mechanized harvesting system 34. The mechanized harvesting system 34 may comprise, among other components, a harvesting reservoir 40. The harvesting reservoir 40 may be formed of any suitable size, shape, and design. Furthermore, the harvesting reservoir 40 may be formed of any material that is suitable for accepting and storing microorganisms 84. The harvesting reservoir 40 may be formed of any material without departing from the scope of the disclosure. The harvesting reservoir 40 may be connected to the harvesting blade 38 or positioned next to the harvesting blade 38 and is configured to receive the microorganisms 84 as the microorganisms 84 are harvested from the at least one moving belt 36.

Fluid

As stated above, the microorganism growing apparatus 12 comprises at least one fluid 58/60/62, among other components. The fluid 58/60/62 may be any type of fluid 58/60/62, including, but not limited to, water, wastewater, effluent, and the like. In one arrangement, the fluid 58/60/62 may be the fluid 58/60/62 utilized in a recirculating aquaculture system 86 which contains a high concentration of pollutants 56 including, but not limited to, N, P, K, C, ammonia (NH3), carbon dioxide (CO2), metals, salts, pharmaceuticals or hormones. In another arrangement, as one example, the fluid 58/60/62 is effluent from a feed manufacturer which contains a high concentration of pollutants 56 including, but not limited to, N, P, K, C, toxic metals, salts, pharmaceuticals or hormones. Furthermore, in another arrangement, as one example, the fluid 58/60/62 is municipal water which contains a high concentration of pollutants 56 including, but not limited to, N, P, K, C, toxic metals, salts, pharmaceuticals or hormones.

In one arrangement, as shown the microorganism growing apparatus 12 comprises a first reservoir 42, among other components, which contains a first fluid 58. In another arrangement, as shown, the microorganism growing apparatus 12 comprises a first reservoir 42 and a second reservoir 44, among other components, wherein the first reservoir 42 contains a first fluid 58 and the second reservoir 44 contains a second fluid 60. In another arrangement, as shown, the microorganism growing apparatus 12 comprises a first reservoir 42, a second reservoir 44, and a third reservoir 46, among other components, wherein the first reservoir 42 contains a first fluid 58, the second reservoir 44 contains a second fluid 60 and the third reservoir 46 contains a third fluid 62. Any number of reservoirs 42/44/46 may be utilized by the system 10 without departing from the scope of the disclosure. For example, the microorganism growing apparatus 12 may comprise one, two, three, four, five, six, seven, eight, nine, ten, or more reservoirs 42/44/46 without departing from the scope of the disclosure. As a result, any number of fluids 58/60/62 may be utilized by the system 10 without departing from the scope of the disclosure. Throughout the disclosure, reference to a fluid 58/60/62 refers to a first fluid 58, a second fluid 60, or a third fluid 62, unless the disclosure specifically states that it is referring to only a specific fluid 58/60/62.

In one arrangement, as one example, the microorganism growing apparatus 12 comprises a first reservoir 42 and a second reservoir 44 wherein the first reservoir 42 is filled with a first fluid 58 that contains a pollutant 56 and the first fluid 58 is controlled to have a first condition 64. Furthermore, the second reservoir 44 is filled with a second fluid 60 wherein the second fluid 60 is controlled to have a second condition 66. In this arrangement, microorganisms 84 are grown using the microorganism growing apparatus 12 wherein the microorganisms 84 are exposed to the first fluid 58 within the first reservoir 42 wherein the microorganisms 84 are exposed to the first condition 64 and the microorganisms 84 uptake the pollutant 56 from the first fluid 58. Furthermore, the microorganisms 84 are exposed to light 50 and air 48 and then the microorganisms 84 are exposed to the second fluid 60 wherein the microorganisms 84 are exposed to the second condition 66 and the microorganisms 84 are stimulated to release the pollutant 56. In this arrangement, the microorganisms 84 may be comprised of algae 52. Furthermore, in this arrangement, the algae 52 may grow in an algae biofilm 54 on the at least one moving belt 36 which moves through the microorganism growing apparatus 12.

In another arrangement, as one example, the microorganism growing apparatus 12 comprises a first reservoir 42, a second reservoir 44, and a third reservoir 46 wherein the first reservoir 42 is filled with a first fluid 58 that contains a pollutant 56 and the first fluid 58 is controlled to have a first condition 64. The second reservoir 44 is filled with a second fluid 60 wherein the second fluid 60 is controlled to have a second condition 66. The third reservoir 46 is filled with a third fluid 62 and the third fluid 62 is controlled to have a third condition 68. In this arrangement, microorganisms 84 are grown using the microorganism growing apparatus 12. In this arrangement, the microorganisms 84 are moved such that they are submerged within the first fluid 58 held within the first reservoir 42 exposing the microorganisms 84 to the first condition 64 wherein the microorganisms 84 uptake the pollutant 56 from the first fluid 58 held within the first reservoir 42; then the microorganisms 84 are moved such that it is in an exposed position 76 and it is exposed to air 48 and light 50; following the uptake of the pollutant 56, the microorganisms 84 are moved to a second submerged position 72 within the second fluid 60 held within the second reservoir 44 exposing the microorganisms 84 to the second condition 66 and stimulating the microorganisms 84 to release the pollutant 56. Then the microorganisms 84 are moved to a third submerged position 74 such that the microorganisms 84 are submerged within the third fluid 62 held within the third reservoir 46 exposing the microorganisms 84 to the third condition 68 and stimulating the microorganisms 84 to release the pollutant 56. In this arrangement, the microorganisms 84 may be comprised of algae 52. Furthermore, in this arrangement, the algae 52 may grow in an algae biofilm 54 on the at least one moving belt 36 which moves through the microorganism growing apparatus 12.

In one arrangement, as one example, the motor 26 includes a gear system 30 that is capable of driving the at least one drive shaft 28 wherein the at least one drive shaft 28 rotates the at least one moving belt 36. The rotation of the at least one moving belt 36 allows the at least one moving belt 36 to be in a submerged position 70/72/74 wherein a portion of the at least one moving belt 36 is submerged within a fluid 58/60/62 held within a reservoir 42/44/46. In one arrangement, as one example, microorganisms 84 are produced as the at least one moving belt 36 moves through the microorganism growing apparatus 12.

Conditions

As stated above, the microorganism growing apparatus 12 comprises at least one fluid 58/60/62, among other components, wherein the fluid 58/60/62 is controlled to have a condition 64/66/68. The condition 64/66/68 may be any type of condition 64/66/68 without departing from the scope of the disclosure. For example, the condition 64/66/68 may be an elevated temperature, an elevated temperature compared to another condition 64/66/68 used within the microorganism growing apparatus 12, an elevated temperature within the range of 30-90 degrees Celsius, an illumination using increased light intensity, exposure to a sorbent material, exposure to a phosphorous absorbing material, exposure to a fluid with a high concentration of biological oxygen demand, among other types of conditions 64/66/68 that stimulate algae 52 to release a pollutant 56. The microorganism growing apparatus 12 may comprise any number of reservoirs 42/44/46, fluids 58/60/62, and conditions 64/66/68 without departing from the scope of the disclosure. Therefore, the microorganism growing apparatus 12 may comprise one, two, three, four, five, six, seven, eight, nine, ten, or more reservoirs 42/44/46, fluids 58/60/62, and conditions 64/66/68 without departing from the scope of the disclosure.

In one arrangement, as one example, the microorganism growing apparatus 12 comprises a first reservoir 42 and a second reservoir 44 wherein the first reservoir 42 is filled with a first fluid 58 and the first fluid 58 is controlled to have a first condition 64 and the second reservoir 44 is filled with a second fluid 60 and the second fluid 60 is controlled to have a second condition 66. In another arrangement, as one example, the microorganism growing apparatus 12 comprises a first reservoir 42, a second reservoir 44, and a third reservoir 46 wherein the first reservoir 42 is filled with a first fluid 58 and the first fluid 58 is controlled to have a first condition 64, the second reservoir 44 is filled with a second fluid 60 and the second fluid 60 is controlled to have a second condition 66, and the third reservoir 46 is filled with a third fluid 62 and the third fluid 62 is controlled to have a third condition 68.

Any number of reservoirs 42/44/46 may be utilized by the microorganism growing apparatus 12 without departing from the scope of the disclosure. For example, the microorganism growing apparatus 12 may comprise one, two, three, four, five, six, seven, eight, nine, ten, or more reservoirs 42/44/46 without departing from the scope of the disclosure. As a result, any number of fluids 58/60/62 and conditions 64/66/68 may be utilized by the system 10 without departing from the scope of the disclosure. Throughout the disclosure, reference to a condition 64/66/68 refers to a first condition 64, a second condition 66, or a third condition 68, unless the disclosure specifically states that it is referring to only a specific condition 64/66/68.

In one arrangement, as shown the microorganism growing apparatus 12 comprises a first reservoir 42, among other components, which contains a first fluid 58 wherein the first fluid 58 is controlled to have a first condition 64. In another arrangement, as shown, the microorganism growing apparatus 12 comprises a first reservoir 42 and a second reservoir 44, among other components, wherein the first reservoir 42 contains a first fluid 58 and the second reservoir 44 contains a second fluid 60 wherein the first fluid 58 is controlled to have a first condition 64 and the second fluid 60 is controlled to have a second condition 66. In another arrangement, as shown, the microorganism growing apparatus 12 comprises a first reservoir 42, a second reservoir 44, and a third reservoir 46, among other components, wherein the first reservoir 42 contains a first fluid 58 and the first fluid 58 is controlled to have a first condition 64, the second reservoir 44 contains a second fluid 60 and the second fluid 60 is controlled to have a second condition 66, and the third reservoir 46 contains a third fluid 62 and the third fluid 62 is controlled to have a third condition 68.

In one arrangement, as one example, the microorganism growing apparatus 12 comprises a first reservoir 42 and a second reservoir 44 wherein the first reservoir 42 is filled with a first fluid 58 that contains a pollutant 56 and the first fluid 58 is controlled to have a first condition 64. Furthermore, the second reservoir 44 is filled with a second fluid 60 wherein the second fluid 60 is controlled to have a second condition 66. In this arrangement, microorganisms 84 are grown using the microorganism growing apparatus 12 wherein the microorganisms 84 are exposed to the first fluid 58 within the first reservoir 42 wherein the microorganisms 84 are exposed to the first condition 64 and the microorganisms 84 uptake the pollutant 56 from the first fluid 58. Furthermore, the microorganisms 84 are exposed to light 50 and air 48 and then the microorganisms 84 are exposed to the second fluid 60 wherein the microorganisms 84 are exposed to the second condition 66 and the microorganisms 84 are stimulated to release the pollutant 56. In this arrangement, the microorganisms 84 may be comprised of algae 52. Furthermore, in this arrangement, the algae 52 may grow in an algae biofilm 54.

In another arrangement, as one example, the microorganism growing apparatus 12 comprises a first reservoir 42, a second reservoir 44, and a third reservoir 46 wherein the first reservoir 42 is filled with a first fluid 58 that contains a pollutant 56 and the first fluid 58 is controlled to have a first condition 64. The second reservoir 44 is filled with a second fluid 60 wherein the second fluid 60 is controlled to have a second condition 66. The third reservoir 46 is filled with a third fluid 62 and the third fluid 62 is controlled to have a third condition 68. In this arrangement, microorganisms 84 are grown using the microorganism growing apparatus 12. In this arrangement, the microorganisms 84 are moved to a first submerged position 70 such that the microorganisms 84 are submerged within the first fluid 58 held within the first reservoir 42 exposing the microorganisms 84 to the first condition 64 wherein the microorganisms 84 uptake the pollutant 56 from the first fluid 58 held within the first reservoir 42; then the microorganisms 84 are moved such that it is in an exposed position 76 and it is exposed to air 48 and light 50; following the uptake of the pollutant 56, the microorganisms 84 are moved to a second submerged position 72 within the second fluid 60 held within the second reservoir 44 exposing the microorganisms 84 to the second condition 66 and stimulating the microorganisms 84 to release the pollutant 56. Then the microorganisms 84 are moved to a third submerged position 74 such that the microorganisms 84 are submerged within the third fluid 62 held within the third reservoir 46 exposing the microorganisms 84 to the third condition 68 and stimulating the microorganisms 84 to release the pollutant 56. In this arrangement, the microorganisms 84 may be comprised of algae 52. Furthermore, in this arrangement, the algae 52 may grow in an algae biofilm 54.

In one arrangement, as one example, the motor 26 includes a gear system 30 that is capable of driving the at least one drive shaft 28 wherein the at least one drive shaft 28 rotates the at least one moving belt 36. The rotation of the at least one moving belt 36 allows the at least one moving belt 36 to be in a submerged position 70/72/74 wherein a portion of the at least one moving belt 36 is submerged within the fluid 58/60/62 held within the reservoir 42/44/46. In one arrangement, as one example, microorganisms 84 are produced as the at least one moving belt 36 moves through the microorganism growing apparatus 12.

In Operation

In one arrangement, as one example, the system 10 comprises utilizing a microorganism growing apparatus 12 in a recirculating aquaculture system 10 in order to filter the fluid 58 utilized in the recirculating aquaculture system 10 to provide for rearing of aquatic animals and/or cultivation of aquatic plants. Here, the system 10 comprises the steps of: filing a plurality of tanks 88 with a fluid 58; moving the fluid 58 from the plurality of tanks 88 through either the center drain 92 or the sidewall drain 94 of each tank 88 to a first header tank 86 via a fluid recirculation system 110; moving the fluid 58 from the first header tank 86 to the drum filter 106; moving the fluid 58 from the drum filter 106 to the microorganism growing apparatus 12 via a waterfall 108;

utilizing the microorganism growing apparatus 12 to filter the fluid 58 wherein the microorganism growing apparatus 12 has a first reservoir 42 and a second reservoir 44, filling the first reservoir 42 with a first fluid 58 that contains a pollutant 56, controlling the first fluid 58 within the first reservoir 42 to have a first condition 64, filling the second reservoir 44 with a second fluid 60, controlling the second fluid 60 within the second reservoir 44 to have a second condition 66, growing microorganisms 84 using the microorganism growing apparatus 12, exposing the microorganisms 84 to light 50 and air 48, and exposing the microorganisms 84 to the second fluid 60 within the second reservoir 44 wherein the microorganisms 84 are exposed to the second condition 66 and the microorganisms 84 are stimulated to release the pollutant 56. In one arrangement, the system 10 further comprises the step of: following release of the pollutant 56, the microorganisms 84 are then brought back to the first reservoir 42 to uptake additional pollutants 56 and the process is repeated. Furthermore, in one arrangement, as one example, the system 10 further comprises the step of: starving the microorganisms 84 of the pollutant 56 by exposing the microorganisms 84 to the second condition 66 thereby causing the microorganisms 84 to consume increased amounts of the pollutant 56 from the first fluid 58 in the first reservoir 42. In one arrangement, as one example, the system 10 comprises concentrating the pollutant 56 within the second fluid 60 held within the second reservoir 44.

Furthermore, in one arrangement, as one example, the microorganism growing apparatus 12 may further comprise the steps of: providing a third reservoir 46, filling the third reservoir 46 with a third fluid 62, controlling the third fluid 62 within the third reservoir 46 to have a third condition 68, and submerging a portion of the belt 36 containing the microorganisms 84 within the third fluid 62 of the third reservoir 46 thereby exposing this portion of the microorganisms 84 to the third condition 68.

In one example, the system 10 further comprises the step of controlling the temperature of the air 48 within the microorganism growing apparatus 12, controlling the temperature of the second fluid 60 within the second reservoir 44, and/or controlling the light 50 within the microorganism growing apparatus 12 in order to facilitate growth of the microorganisms 84. Additionally, in one arrangement, as one example, the system 10 further comprises the step of harvesting the microorganisms 84 and using the harvested microorganisms 84 as a foodstuff for human or non-human animal consumption, a fertilizer, a bioplastic, and/or a biofuel.

In another arrangement, as one example, the system 10 comprises the steps of: providing a microorganism growing apparatus 12 having a first reservoir 42 and a second reservoir 44; filling the first reservoir 42 with a first fluid 58 that contains a pollutant 56; controlling the first fluid 58 within the first reservoir 42 to have a first condition 64; filling the second reservoir 44 with a second fluid 60; controlling the second fluid 60 within the second reservoir 44 to have a second condition 66; growing microorganisms 84 using the microorganism growing apparatus 12; moving the microorganisms 84 such that a portion of the microorganisms 84 are submerged within the first fluid 58 held within the first reservoir 42 exposing the microorganisms 84 to the first condition 64 wherein the microorganisms 84 uptake the pollutant 56 from the first fluid 58 held within the first reservoir 42; moving the microorganisms 84 such that a portion of the microorganisms 84 are exposed to air 48 and light 50; and following the uptake of the pollutant 56, moving the microorganisms 84 such that a portion of the microorganisms 84 are submerged within the second fluid 60 held within the second reservoir 44 exposing the microorganisms 84 to the second condition 66 and stimulating the microorganisms 84 to release the pollutant 56. In one arrangement, the microorganism growing apparatus 12 further comprises the step of: following release of the pollutant 56, the microorganisms 84 are then brought back to the first reservoir 42 to uptake additional pollutants 56 and the process is repeated. Furthermore, in one arrangement, as one example, the microorganism growing apparatus 12 further comprises the step of: starving the microorganisms 84 of the pollutant 56 by exposing the microorganisms 84 to the second condition 66 thereby causing the microorganisms 84 to consume increased amounts of the pollutant 56 from the first fluid 58 in the first reservoir 42. In one arrangement, as one example, the system 10 comprises concentrating the pollutant 56 within the second fluid 60 held within the second reservoir 44. In one example, the microorganism growing apparatus 12 grows the microorganisms 84 on a belt 36 wherein the belt 36 moves in a continuous manner through the reservoirs 42/44/46.

In one example, the system 10 further comprises the step of controlling the temperature of the air 48 within the microorganism growing apparatus 12, controlling the temperature of the second fluid 60 within the second reservoir 44, and/or controlling the light 50 within the microorganism growing apparatus 12 in order to facilitate growth of the microorganisms 84. Additionally, in one arrangement, as one example, the system 10 further comprises the step of harvesting the microorganisms 84 and using the harvested microorganisms 84 as a foodstuff for human or non-human animal consumption.

Furthermore, in one arrangement, as one example, the microorganism growing apparatus 12 may further comprise the steps of: providing a third reservoir 46, filling the third reservoir 46 with a third fluid 62, controlling the third fluid 62 within the third reservoir 46 to have a third condition 68, and submerging a portion of the microorganisms 84 within the third fluid 62 of the third reservoir 46 thereby exposing this portion of the microorganisms 84 to the third condition 68.

After the fluid 58 has moved throughout the microorganism growing apparatus 12 the fluid 58 transitions to the sump pump 104; then the fluid 58 moves to the foam fractionator 102 for additional filtering; then the fluid 58 moves to the LHO 100 for additional filtering; eventually the fluid 58 moves to the second header tank 98 and back to a tank 88 through the inlet 90 of the tank 88 where the cycle throughout the system 10 takes place again.

Additionally, the system 10 may further comprise a bacterial or chemical treatment of the fluid 58/60/62. The bacterial or chemical treatment of the fluid 58/60/62 may be any type of bacterial or chemical treatment including, but not limited to, chlorine, chlorine dioxide, algicide, and the like. However, any type of bacterial or chemical treatment of the fluid 58/60/62 may be utilized without departing from the disclosure.

Operation of the Microorganism Growing Apparatus 12 Comprising at Least One Belt 36

In another arrangement, as one example, the system 10 comprises utilizing a microorganism growing apparatus 12 in a recirculating aquaculture system 10 in order to filter the fluid 58 utilized in the recirculating aquaculture system 10 to provide for rearing of aquatic animals and/or cultivation of aquatic plants. Here, the system 10 comprises the steps of: filing a plurality of tanks 88 with a fluid 58; moving the fluid 58 from the plurality of tanks 88 through either the center drain 92 or the sidewall drain 94 of each tank 88 to a first header tank 86 via a fluid recirculation system 110; moving the fluid 58 from the first header tank 86 to the drum filter 106; moving the fluid 58 from the drum filter 106 to the microorganism growing apparatus 12 via a waterfall 108; utilizing the microorganism growing apparatus 12 to filter the fluid 58 wherein the microorganism growing apparatus 12 has a first reservoir 42, a second reservoir 44, and at least one moving belt 36; filling the first reservoir 42 with a first fluid 58 that has a high concentration of the pollutant 56; controlling the first fluid 58 within the first reservoir 42 to have a first condition 64; filling the second reservoir 44 with a second fluid 60; controlling the second fluid 60 within the second reservoir 44 to have a second condition 66; moving the at least one belt 36 between a first submerged position 70, wherein a portion of the at least one belt 36 is submerged within the first fluid 58 held within the first reservoir 42, and an exposed position 76, wherein a portion of the at least one belt 36 is not submerged within the first fluid 58 held within the first reservoir 42; exposing the portion of the at least one belt 36 in the exposed position 76 to air 48 and light 50; growing microorganisms 84 on the at least one belt 36 as the at least one belt 36 moves through the microorganism growing apparatus 12, wherein the microorganisms 84 consume the pollutant 56 from the first fluid 58 held within the first reservoir 42 during the growing process; submerging a portion of the at least one belt 36 within the second fluid 60 of the second reservoir 44 thereby exposing this portion of the at least one belt 36 to the second condition 66 thereby stimulating the microorganisms 84 contained on this portion of the belt 36 to release the pollutant 56. In one arrangement, the system 10 further comprises the step of: following release of the pollutant 56, the microorganisms 84 are then brought back to the first reservoir 42 to uptake additional pollutants 56 and the process is repeated. Furthermore, in one arrangement, as one example, the system 10 further comprises the step of: starving the microorganisms 84 of the pollutant 56 by exposing the microorganisms 84 to the second condition 66 thereby causing the microorganisms 84 to consume increased amounts of the pollutant 56 from the first fluid 58 in the first reservoir 42. In one arrangement, as one example, the system 10 comprises concentrating the pollutant 56 within the second fluid 60 held within the second reservoir 44. In one example, the system 10 grows the microorganisms 84 on a belt 36 wherein the belt 36 moves in a continuous manner through the reservoirs 42/44/46. Furthermore, in one arrangement, the belt 36 moves in a continuous loop between the first submerged position 70 and the second submerged position 72. In another arrangement, the belt 36 moves in a serpentine manner between the first submerged position 70 and the second submerged position 72. In one arrangement, the at least one belt 36 moves in a serpentine manner in a generally vertical manner thereby reducing the footprint of the microorganism growing apparatus 12. Additionally, in one arrangement, the at least one belt 36 continuously passes through the second reservoir 44. In another arrangement, the at least one belt 36 only periodically passes through the second reservoir 44.

In one example, the system 10 further comprises the step of controlling the temperature of the air 48 within the microorganism growing apparatus 12, controlling the temperature of the second fluid 60 within the second reservoir 44, and/or controlling the light 50 within the microorganism growing apparatus 12 in order to facilitate growth of the microorganisms 84. Additionally, in one arrangement, as one example, the system 10 further comprises the step of harvesting the microorganisms 84 and using the harvested microorganisms 84 as a foodstuff for human or non-human animal consumption, a fertilizer, a bioplastic, and/or a biofuel.

In one arrangement, as one example, the microorganism growing apparatus 12 may further comprise the steps of: providing a third reservoir 46, filling the third reservoir 46 with a third fluid 62, controlling the third fluid 62 within the third reservoir 46 to have a third condition 68, and submerging a portion of the microorganisms 84 within the third fluid 62 of the third reservoir 46 thereby exposing this portion of the microorganisms 84 to the third condition 68.

Furthermore, in one arrangement, as an example, the system 10 further comprises the step of harvesting the microorganisms 84 by scraping a blade 38 along the at least one belt 36. Also, in one arrangement, the system 10 further comprises the step of harvesting the microorganisms 84 and using the harvested microorganisms 84 as a foodstuff for human or non-human animal consumption.

After the fluid 58 has moved throughout the microorganism growing apparatus 12 the fluid 58 transitions to the sump pump 104; then the fluid 58 moves to the foam fractionator 102 for additional filtering; then the fluid 58 moves to the LHO 100 for additional filtering; eventually the fluid 58 moves to the second header tank 98 and back to one of the plurality of tanks 88 through the inlet 90 of the tank 88 where the cycle throughout the system 10 takes place again.

Additionally, the system 10 may further comprise a bacterial or chemical treatment of the fluid 58/60/62. The bacterial or chemical treatment of the fluid 58/60/62 may be any type of bacterial or chemical treatment including, but not limited to, chlorine, chlorine dioxide, algicide, and the like. However, any type of bacterial or chemical treatment of the fluid 58/60/62 may be utilized without departing from the disclosure.

Operation of the System 10 as Depicted in FIG. 2

In another arrangement, as depicted in FIG. 2, the system 10 comprises the steps of: filing a plurality of tanks 88 with a fluid 58; moving the fluid 58 from the plurality of tanks 88 through the sidewall drain 94 of each tank 88 to a water chiller 112 via a fluid recirculation system 110 (while solids, waste and debris moves from the center drain 92 of each tank 88 to one of the solids collection tanks 114); moving the fluid 58 from the water chiller 112 to the drum filter 106 to the microorganism growing apparatus 12; utilizing the microorganism growing apparatus 12 to filter the fluid 58 wherein the microorganism growing apparatus 12 has a first reservoir 42 and a second reservoir 44, filling the first reservoir 42 with a first fluid 58 that contains a pollutant 56, controlling the first fluid 58 within the first reservoir 42 to have a first condition 64, filling the second reservoir 44 with a second fluid 60, controlling the second fluid 60 within the second reservoir 44 to have a second condition 66, growing microorganisms 84 using the microorganism growing apparatus 12, exposing the microorganisms 84 to light 50 and air 48, and exposing the microorganisms 84 to the second fluid 60 within the second reservoir 44 wherein the microorganisms 84 are exposed to the second condition 66 and the microorganisms 84 are stimulated to release the pollutant 56. In one arrangement, the system 10 further comprises the step of: following release of the pollutant 56, the microorganisms 84 are then brought back to the first reservoir 42 to uptake additional pollutants 56 and the process is repeated. Furthermore, in one arrangement, as one example, the system 10 further comprises the step of: starving the microorganisms 84 of the pollutant 56 by exposing the microorganisms 84 to the second condition 66 thereby causing the microorganisms 84 to consume increased amounts of the pollutant 56 from the first fluid 58 in the first reservoir 42. In one arrangement, as one example, the system 10 comprises concentrating the pollutant 56 within the second fluid 60 held within the second reservoir 44. In one example, the microorganism growing apparatus 12 grows the microorganisms 84 on a belt 36 wherein the belt 36 moves in a continuous manner through the reservoirs 42/44/46.

Furthermore, in one arrangement, as one example, the microorganism growing apparatus 12 may further comprise the steps of: providing a third reservoir 46, filling the third reservoir 46 with a third fluid 62, controlling the third fluid 62 within the third reservoir 46 to have a third condition 68, and submerging a portion of the belt 36 containing the microorganisms 84 within the third fluid 62 of the third reservoir 46 thereby exposing this portion of the microorganisms 84 to the third condition 68.

In one example, the system 10 further comprises the step of controlling the temperature of the air 48 within the microorganism growing apparatus 12, controlling the temperature of the second fluid 60 within the second reservoir 44, and/or controlling the light 50 within the microorganism growing apparatus 12 in order to facilitate growth of the microorganisms 84. Additionally, in one arrangement, as one example, the system 10 further comprises the step of harvesting the microorganisms 84 and using the harvested microorganisms 84 as a foodstuff for human or non-human animal consumption, a fertilizer, a bioplastic, and/or a biofuel.

In another arrangement, as one example, the system 10 comprises the steps of: providing a microorganism growing apparatus 12 having a first reservoir 42 and a second reservoir 44; filling the first reservoir 42 with a first fluid 58 that contains a pollutant 56; controlling the first fluid 58 within the first reservoir 42 to have a first condition 64; filling the second reservoir 44 with a second fluid 60; controlling the second fluid 60 within the second reservoir 44 to have a second condition 66; growing microorganisms 84 using the microorganism growing apparatus 12; moving the microorganisms 84 such that a portion of the microorganisms 84 are submerged within the first fluid 58 held within the first reservoir 42 exposing the microorganisms 84 to the first condition 64 wherein the microorganisms 84 uptake the pollutant 56 from the first fluid 58 held within the first reservoir 42; moving the microorganisms 84 such that a portion of the microorganisms 84 are exposed to air 48 and light 50; and following the uptake of the pollutant 56, moving the microorganisms 84 such that a portion of the microorganisms 84 are submerged within the second fluid 60 held within the second reservoir 44 exposing the microorganisms 84 to the second condition 66 and stimulating the microorganisms 84 to release the pollutant 56. In one arrangement, the microorganism growing apparatus 12 further comprises the step of: following release of the pollutant 56, the microorganisms 84 are then brought back to the first reservoir 42 to uptake additional pollutants 56 and the process is repeated. Furthermore, in one arrangement, as one example, the microorganism growing apparatus 12 further comprises the step of: starving the microorganisms 84 of the pollutant 56 by exposing the microorganisms 84 to the second condition 66 thereby causing the microorganisms 84 to consume increased amounts of the pollutant 56 from the first fluid 58 in the first reservoir 42. In one arrangement, as one example, the system 10 comprises concentrating the pollutant 56 within the second fluid 60 held within the second reservoir 44. In one example, the microorganism growing apparatus 12 grows the microorganisms 84 on a belt 36 wherein the belt 36 moves in a continuous manner through the reservoirs 42/44/46.

In one example, the system 10 further comprises the step of controlling the temperature of the air 48 within the microorganism growing apparatus 12, controlling the temperature of the second fluid 60 within the second reservoir 44, and/or controlling the light 50 within the microorganism growing apparatus 12 in order to facilitate growth of the microorganisms 84. Additionally, in one arrangement, as one example, the system 10 further comprises the step of harvesting the microorganisms 84 and using the harvested microorganisms 84 as a foodstuff for human or non-human animal consumption.

Furthermore, in one arrangement, as one example, the microorganism growing apparatus 12 may further comprise the steps of: providing a third reservoir 46, filling the third reservoir 46 with a third fluid 62, controlling the third fluid 62 within the third reservoir 46 to have a third condition 68, and submerging a portion of the microorganisms 84 within the third fluid 62 of the third reservoir 46 thereby exposing this portion of the microorganisms 84 to the third condition 68.

Operation of the System 10 as Depicted in FIG. 3

In another arrangement, as depicted in FIG. 3, the system 10 comprises the steps of: filling a plurality of tanks 88 with a fluid 58; moving the fluid 58 from the plurality of tanks 88 through one of the sidewall drains 94 or one of the center drains 92 to a radial flow settler 96 via a fluid circulation system 110; moving the fluid 58 from the radial flow settler 96 to one of the microorganism biofilm growing apparatus 12 via a fluid recirculation system 110; utilizing the microorganism growing apparatus 12 to filter the fluid 58 wherein the microorganism growing apparatus 12 has a first reservoir 42 and a second reservoir 44, filling the first reservoir 42 with a first fluid 58 that contains a pollutant 56, controlling the first fluid 58 within the first reservoir 42 to have a first condition 64, filling the second reservoir 44 with a second fluid 60, controlling the second fluid 60 within the second reservoir 44 to have a second condition 66, growing microorganisms 84 using the microorganism growing apparatus 12, exposing the microorganisms 84 to light 50 and air 48, and exposing the microorganisms 84 to the second fluid 60 within the second reservoir 44 wherein the microorganisms 84 are exposed to the second condition 66 and the microorganisms 84 are stimulated to release the pollutant 56. In one arrangement, the system 10 further comprises the step of: following release of the pollutant 56, the microorganisms 84 are then brought back to the first reservoir 42 to uptake additional pollutants 56 and the process is repeated. Furthermore, in one arrangement, as one example, the system 10 further comprises the step of: starving the microorganisms 84 of the pollutant 56 by exposing the microorganisms 84 to the second condition 66 thereby causing the microorganisms 84 to consume increased amounts of the pollutant 56 from the first fluid 58 in the first reservoir 42. In one arrangement, as one example, the system 10 comprises concentrating the pollutant 56 within the second fluid 60 held within the second reservoir 44.

Furthermore, in one arrangement, as one example, the microorganism growing apparatus 12 may further comprise the steps of: providing a third reservoir 46, filling the third reservoir 46 with a third fluid 62, controlling the third fluid 62 within the third reservoir 46 to have a third condition 68, and submerging a portion of the belt 36 containing the microorganisms 84 within the third fluid 62 of the third reservoir 46 thereby exposing this portion of the microorganisms 84 to the third condition 68.

In one example, the system 10 further comprises the step of controlling the temperature of the air 48 within the microorganism growing apparatus 12, controlling the temperature of the second fluid 60 within the second reservoir 44, and/or controlling the light 50 within the microorganism growing apparatus 12 in order to facilitate growth of the microorganisms 84. Additionally, in one arrangement, as one example, the system 10 further comprises the step of harvesting the microorganisms 84 and using the harvested microorganisms 84 as a foodstuff for human or non-human animal consumption, a fertilizer, a bioplastic, and/or a biofuel.

In another arrangement, as one example, the system 10 comprises the steps of: providing a microorganism growing apparatus 12 having a first reservoir 42 and a second reservoir 44; filling the first reservoir 42 with a first fluid 58 that contains a pollutant 56; controlling the first fluid 58 within the first reservoir 42 to have a first condition 64; filling the second reservoir 44 with a second fluid 60; controlling the second fluid 60 within the second reservoir 44 to have a second condition 66; growing microorganisms 84 using the microorganism growing apparatus 12; moving the microorganisms 84 such that a portion of the microorganisms 84 are submerged within the first fluid 58 held within the first reservoir 42 exposing the microorganisms 84 to the first condition 64 wherein the microorganisms 84 uptake the pollutant 56 from the first fluid 58 held within the first reservoir 42; moving the microorganisms 84 such that a portion of the microorganisms 84 are exposed to air 48 and light 50; and following the uptake of the pollutant 56, moving the microorganisms 84 such that a portion of the microorganisms 84 are submerged within the second fluid 60 held within the second reservoir 44 exposing the microorganisms 84 to the second condition 66 and stimulating the microorganisms 84 to release the pollutant 56. In one arrangement, the microorganism growing apparatus 12 further comprises the step of: following release of the pollutant 56, the microorganisms 84 are then brought back to the first reservoir 42 to uptake additional pollutants 56 and the process is repeated. Furthermore, in one arrangement, as one example, the microorganism growing apparatus 12 further comprises the step of: starving the microorganisms 84 of the pollutant 56 by exposing the microorganisms 84 to the second condition 66 thereby causing the microorganisms 84 to consume increased amounts of the pollutant 56 from the first fluid 58 in the first reservoir 42. In one arrangement, as one example, the system 10 comprises concentrating the pollutant 56 within the second fluid 60 held within the second reservoir 44. In one example, the microorganism growing apparatus 12 grows the microorganisms 84 on a belt 36 wherein the belt 36 moves in a continuous manner through the reservoirs 42/44/46.

In one example, the system 10 further comprises the step of controlling the temperature of the air 48 within the microorganism growing apparatus 12, controlling the temperature of the second fluid 60 within the second reservoir 44, and/or controlling the light 50 within the microorganism growing apparatus 12 in order to facilitate growth of the microorganisms 84. Additionally, in one arrangement, as one example, the system 10 further comprises the step of harvesting the microorganisms 84 and using the harvested microorganisms 84 as a foodstuff for human or non-human animal consumption.

Furthermore, in one arrangement, as one example, the microorganism growing apparatus 12 may further comprise the steps of: providing a third reservoir 46, filling the third reservoir 46 with a third fluid 62, controlling the third fluid 62 within the third reservoir 46 to have a third condition 68, and submerging a portion of the microorganisms 84 within the third fluid 62 of the third reservoir 46 thereby exposing this portion of the microorganisms 84 to the third condition 68. It should be noted, this recirculation of fluid 58 takes place throughout the system 10 again and again.

Additionally, the system 10 may further comprise a bacterial or chemical treatment of the fluid 58/60/62. The bacterial or chemical treatment of the fluid 58/60/62 may be any type of bacterial or chemical treatment without departing from the disclosure.

Benefits of System

The system 10 has many benefits and advantages including, but not limited to, providing a method of using a microorganism 84 to remove a pollutant 56 from a fluid 58 that is efficient; providing a method of using a microorganism 84 to remove a pollutant 56 from a fluid 58 that is simple in design; providing a method of using a microorganism 84 to remove a pollutant 56 from a fluid 58 that is inexpensive; providing a method of using a microorganism 84 to remove a pollutant 56 from a fluid 58, harvesting the microorganism 84, and using the microorganism 84 as a foodstuff for human consumption; providing a method of using a microorganism 84 to remove a pollutant 56 from a fluid 58, harvesting the microorganism 84, and using the microorganism 84 as a foodstuff for animal consumption; providing a method of using a microorganism 84 to remove a pollutant 56 from a fluid 58 that is capable of meeting current pollutant 56 discharge limits; providing a method of using a microorganism 84 to remove a pollutant 56 from a fluid 58 that has a smaller footprint than other biological systems; providing a method of using a microorganism 84 to efficiently and effectively remove a pollutant 56 from effluent; providing a method of using a microorganism 84 to remove a pollutant 56 from a fluid 58 that has a high pollutant 56 removal rate.

Furthermore, the system 10 provides a method to maximize production of aquatic animals and/or aquatic plants on a limited supply of water; providing a method to maximize production of aquatic animals and/or aquatic plants on a limited supply of land; providing a method to achieve disease control; providing a method to control the environment in order to maximize growth of aquatic animals and/or aquatic plants. These and other benefits and advantages of the system 10 are apparent from the specification and claims.

REFERENCE NUMERALS

10—A recirculating aquaculture system using microorganisms to remove pollutants from a fluid ("a system")
12—Microorganism biofilm growing apparatus
14—A front (of the microorganism biofilm growing apparatus)
16—A back (of the microorganism biofilm growing apparatus)
18—Opposing sides (of the microorganism biofilm growing apparatus)
20—A top (of the microorganism biofilm growing apparatus)
22—A bottom (of the microorganism biofilm growing apparatus)
24—A frame
26—A motor (of the microorganism biofilm growing apparatus)
28—At least one drive shaft (of the microorganism biofilm growing apparatus)
30—A gear system (of the microorganism biofilm growing apparatus)
32—A plurality of rollers (of the microorganism biofilm growing apparatus)
34—A mechanized harvesting system
36—At least one moving belt (of the harvesting system)
38—A harvesting blade (of the harvesting system)
40—A harvesting reservoir (of the harvesting system)
42—A first reservoir
44—A second reservoir
46—A third reservoir
48—Air (a $CO_2$-rich gaseous phase or an $O_2$-rich gaseous phase)
50—Light (a "sunlight capture" part)
52—Algae
54—A microorganism biofilm (a "biofilm"; a "microbial biofilm"; or a "harvestable microbial biofilm")
56—A pollutant
58—A first fluid
60—A second fluid
62—A third fluid
64—A first condition
66—A second condition
68—A third condition
70—A first submerged position
72—A second submerged position
74—A third submerged position
76—An exposed position
78—*Chlorella* algae
80—*Spirulina* algae
82—A pump
84—Microorganism(s)
86—A first header tank
88—Plurality of tanks
90—Inlet (of tank)
92—Center drain (of tank)
94—Sidewall drain (of tank)
96—Radial flow settler
98—A second header tank
100—Low Head Oxygenator (LHO)
102—Foam Fractionator
104—Sump pump
106—Drum filter 108—Waterfall
110—A fluid recirculation system (also referred to as "a fluid recirculation system")
112—Water chiller
114—Solids Collection Tank

What is claimed:

1. A recirculating aquaculture system for rearing aquatic animals comprising:
a first tank:
the first tank configured to hold a first fluid and aquatic animals;
a microorganism biofilm growing apparatus configured to remove pollutants from the first fluid through the growth of a microorganism biofilm;
wherein the microorganism biofilm comprises algae;
wherein the microorganism biofilm adds oxygen to the first fluid;
wherein the microorganism biofilm growing apparatus comprises at least one moving belt;
a second tank;
the second tank configured to hold a second fluid; and
wherein the microorganism biofilm growing apparatus facilitates removal of the pollutants through moving the moving belt from a submerged position in the first fluid to a submerged position in the second fluid wherein exposure to the second fluid stimulates the microorganism biofilm to release the pollutants.

2. The system of claim 1 wherein the pollutants are selected from N, P, K, C, ammonia ($NH_3$), carbon dioxide ($CO_2$), metals, salts, pharmaceuticals or hormones.

3. The system of claim 1 wherein the microorganism biofilm further comprises bacteria.

4. The system of claim 1 wherein harvesting of the microorganism biofilm occurs by scraping the microorganism biofilm off the at least one moving belt.

5. The system of claim 1 further comprising a bacterial or chemical treatment of the first and second fluids.

6. The system of claim 1 wherein the microorganism biofilm growing apparatus is fluidly connected to at least one of the first or second tanks.

7. A recirculating aquaculture system for rearing aquatic animals comprising:
a first tank;
the first tank configured to hold a first fluid and aquatic animals;
a microorganism biofilm growing apparatus configured to remove pollutants from the first fluid through the growth of a microorganism biofilm;
wherein the microorganism biofilm comprises algae and the microorganism biofilm adds oxygen to the first fluid;
a second tank;
the second tank configured to hold a second fluid; and
wherein the microorganism biofilm growing apparatus facilitates moving the microorganism biofilm from a submerged position in the first fluid to a submerged position in the second fluid wherein exposure to the second fluid stimulates the microorganism biofilm to release the pollutants.

8. The system of claim 7 wherein the pollutants are selected from N, P, K, C, ammonia ($NH_3$), carbon dioxide ($CO_2$), metals, salts, pharmaceuticals or hormones.

9. The system of claim 7 wherein the microorganism biofilm further comprises bacteria.

10. The system of claim 7 wherein the microorganism biofilm growing apparatus includes at least one moving belt.

11. The system of claim 7 wherein the microorganism biofilm growing apparatus includes at least one moving belt and harvesting of the microorganism biofilm occurs by scraping the microorganism biofilm off the at least one moving belt.

12. The system of claim 7 further comprising a bacterial or chemical treatment of the first and second fluids.

13. The system of claim 7 wherein the microorganism biofilm growing apparatus is fluidly connected to at least one of the first or second tanks.

14. A method of rearing aquatic animals the steps comprising:
providing a fluid recirculation system;
providing a first tank configured to hold a first fluid and aquatic animals;
providing a microorganism biofilm growing apparatus;
recirculating the first fluid between the first tank and the microorganism biofilm growing apparatus;
removing pollutants from the first fluid by growth of a microorganism biofilm of the microorganism biofilm growing apparatus;
wherein the microorganism biofilm comprises algae and the microorganism biofilm adds oxygen to the first fluid;
providing a second tank configured to hold a second fluid;
moving the microorganism biofilm from a submerged position in the first fluid to a submerged position in the second fluid wherein exposure to the second fluid stimulates the microorganism biofilm to release the pollutants.

15. The method of claim 14 wherein the pollutants are selected from N, P, K, C, ammonia (NH3), carbon dioxide (CO2), metals, salts, pharmaceuticals or hormones.

16. The method of claim 14 wherein the microorganism biofilm comprises bacteria.

17. The method of claim 14 wherein the microorganism biofilm growing apparatus comprises at least one moving belt.

18. The method of claim 14 wherein the microorganism biofilm growing apparatus comprises at least one moving belt and harvesting of the microorganism biofilm occurs by scraping the microorganism biofilm off the at least one moving belt.

19. The method of claim 14 further comprising a bacterial or chemical treatment of the first and second fluids.

20. The method of claim 14 wherein the microorganism biofilm growing apparatus is fluidly connected to at least one of the first or second tanks.

* * * * *